(12) United States Patent
Yaskin et al.

(10) Patent No.: US 8,326,659 B2
(45) Date of Patent: Dec. 4, 2012

(54) METHOD AND SYSTEM FOR ASSESSMENT WITHIN A MULTI-LEVEL ORGANIZATION

(75) Inventors: David Yaskin, Arlington, VA (US); Greg Ritter, Washington, DC (US)

(73) Assignee: Blackboard Inc., Washington, DC (US)

( * ) Notice: Subject to any disclaimer, the term of this patent is extended or adjusted under 35 U.S.C. 154(b) by 1425 days.

(21) Appl. No.: 11/363,868

(22) Filed: Feb. 27, 2006

(65) Prior Publication Data

US 2006/0259351 A1 Nov. 16, 2006

Related U.S. Application Data

(60) Provisional application No. 60/670,963, filed on Apr. 12, 2005.

(51) Int. Cl.
*G06Q 10/00* (2012.01)
(52) U.S. Cl. .................... 705/7.11; 705/1.1
(58) Field of Classification Search ............ 705/7.11, 705/1.1
See application file for complete search history.

(56) References Cited

U.S. PATENT DOCUMENTS

| | | | | |
|---|---|---|---|---|
| 5,321,610 | A * | 6/1994 | Breslin ................. | 705/7.17 |
| 6,496,681 | B1 * | 12/2002 | Linton .................. | 434/350 |
| 6,868,409 | B2 | 3/2005 | Matsui et al. | |
| 6,868,413 | B1 | 3/2005 | Grindrod et al. | |
| 6,871,197 | B1 | 3/2005 | Johnson | |
| 6,916,180 | B1 * | 7/2005 | Price et al. ............ | 434/219 |
| 7,062,500 | B1 * | 6/2006 | Hall et al. ............. | 1/1 |
| 7,095,854 | B1 | 8/2006 | Ginter et al. | |
| 7,266,340 | B2 * | 9/2007 | Bresciani .............. | 434/350 |
| 7,457,581 | B2 | 11/2008 | Stout et al. | |
| 2002/0184072 | A1 | 12/2002 | Linde et al. | |
| 2002/0194100 | A1 * | 12/2002 | Choban et al. ........ | 705/36 |
| 2004/0153508 | A1 | 8/2004 | Alcorn et al. | |
| 2004/0185423 | A1 | 9/2004 | Pearson et al. | |
| 2004/0229199 | A1 | 11/2004 | Ashley et al. | |
| 2005/0086257 | A1 | 4/2005 | Wright | |
| 2005/0172269 | A1 | 8/2005 | Johnson et al. | |
| 2006/0003306 | A1 | 1/2006 | McGinley et al. | |
| 2006/0229896 | A1 * | 10/2006 | Rosen et al. .......... | 705/1 |

OTHER PUBLICATIONS

Carbonell et al, "Vision Statement to Guide Research in Question & Answering (Q&A) and Test Summarization", Language Technologies Institute, Carnegie Mellon University, Pittsburg, PA, Apr. 20, 2000.*
TaskStream Tours, 1 page from Web site.
CampusTools HigherEd, 1 page from Web site.
Building a Rubric, 1 page from Web site.
Site Map, 1 page from Chalk & Wire Web site.

(Continued)

*Primary Examiner* — Thomas Mansfield
(74) *Attorney, Agent, or Firm* — McDermott Will & Emery LLP

(57) ABSTRACT

A system of hardware and software provides a systematic and systemic method for performing assessment the effectiveness of different levels within an institution. The system includes template driven definitions that span multiple tiers of hierarchically arranged operating units within the institution thereby providing flexibility and customization to handle a user-definable model of the institution's organization. In particular, a model is stored of a plurality of organizational levels of the institution, wherein each organizational level includes at least one respective, associated node. For any node, at least one customizable assessment project associated with that node is created and presented to a user; then, the at least one customizable assessment project is completed based, at least in part, on first input received from the user.

60 Claims, 57 Drawing Sheets

OTHER PUBLICATIONS ePortfolio with RubricMarker Features by Category, guide.
Katherine I. Edwards, Eugenia Fernandez, Tracey M. Milionis, David M. Williamson, Indiana University, East: Developing an Electronic Assessment and Storage Tool, document.
Craig J. Cleland, Two Years Using Livetext: Applications Discovered and Lessons Learned, PowerPoint.
Blackboard vs. LifeText, 2 pages from University of North Carolina Web site.
Eugene F. Provenzo, Jr., University of Miami, Electronic Portfolois and Teacher Education, PowerPoint, Jul. 31, 2003, Chicago.
Getting Started with LiveText, PowerPoint.
LiveText Basics for Faculty, Web site of Towson University, 4 pages.
College LifeText edu solutions New Member Basics, PowerPoint Orientation Guide.
LiveText edu solutions, User Guide version 2.2.1, Fall 2004.
LiveText Help Center, Web pp. 3.
LiveText edu solutions, User Guide version 2.0.1, Fall 2004.
Appendix G, document, 4 pages.
Draft GCC Assessment Architecture, Mar. 11, 2003, 1 page.
Dave Choban, TracDat Assessment Plans and Documentation, PowerPoint presentation.
IWebfolio Portfolio Owener Training, instruction guide.
Committee on College Assessment, Third Annual Institutional Assessment Report Guam Community College Academic year 2002-2003, report.
Dave Choban, TracDat Upgrade 3.0 Department Training, PowerPoint.
TracDat Version 3.0 Manual Version 3.01, Manual.
TracDat Demo, pages from Web site.
Functional Requirements and Specifications, Manual, Apr. 26, 2005, Version 2.5.
Question Mark Perception Authoring Manual, Oct. 2000, Version 2.2.
Question Mark Perception—Authoring, Mar. 5, 2003, 4 pages, version 3.4.
Niall Sclater, Boon Low, IMS Question and Test Interoperability: An Idiot's Guide, Mar. 2002, Version 0.5.
Authoring Guide for Perception Version 3, Manual, Oct. 2001, Version 3.1.
Windows Deployment Guide for Preception Version 3, Manual, Dec. 2001, Version 3.1.
SchoolNet Solutions, 13 pages from Web site.
David K. Moldoff, SCT's Enterprise Information Access Initiative, (Feb. 2004).
Business Intelligence on Campus: Optimizing the Value of Your Institutional Data, Sungard brochure (Mar. 2004).
SCT Enterprise Data Warehouse, Sungard brochure (Sep. 2004).
SCT Operational Data Store, Sungard brochure (Sep. 2004).
Faculty Beginner's Guide, Copyright 2004 TaskStream, Version 4.3.
University/College Student: Beginner's Guide, Copyright 2004 TaskStream.
Contents, Educators Guide, Copyright 2002 TaskStream.
Folio Assessment System: Author's Guide, Copyright 2004 TaskStream, Version 4.0.
TS Student's Guide, Copyright 2003 TaskStream, Version 3.5.
Helen C. Barrett, Ph.D., Researching Electronic Portfolios and Learner Engagement, White Paper, 2005.
William Drake, Ph.D., Lyle McCurdy, Ph.D., Douglas Walcerz, Ph.D., A Web-Based Approach for Outcomes Assessment, Proceedings 2001 American Society for Engineering Education.
Student's Guide for submitting assignments, TrueOutcomes instruction manual.
Notes from Call w/VCUre: WEAVE, Jul. 28, 2004.
Omar M. Alzubi, BlackBoard and TrueOutcomes Integration Software.
Weave, A Quality Enhancement Guide for Academic Programs and Administrative and Education Support Units, Apr. 2002.
WEAVEonline, Online Assessmenet Management, Manual from Website.
Bill Curtis, et al., "Overview of the People Capability Maturity Model$^{SM}$", Software Engineering Institute, Maturity Model, CMU/SEI-95-MM-01, Sep. 1995.
Mexican Patent Application No. MX/A/2007/012776 Official Letter dated Jun. 4, 2010.
Curtis, B, et al., "Overview of the People Capability Maturity Model (SM)", Software Engineering Institute, Sep. 1995, pp. 1-77.
Office Action and English Language Synopsis in Mexican Application No. MX/A/2007/012776 dated Aug. 11, 2011 in 11 pages.

* cited by examiner

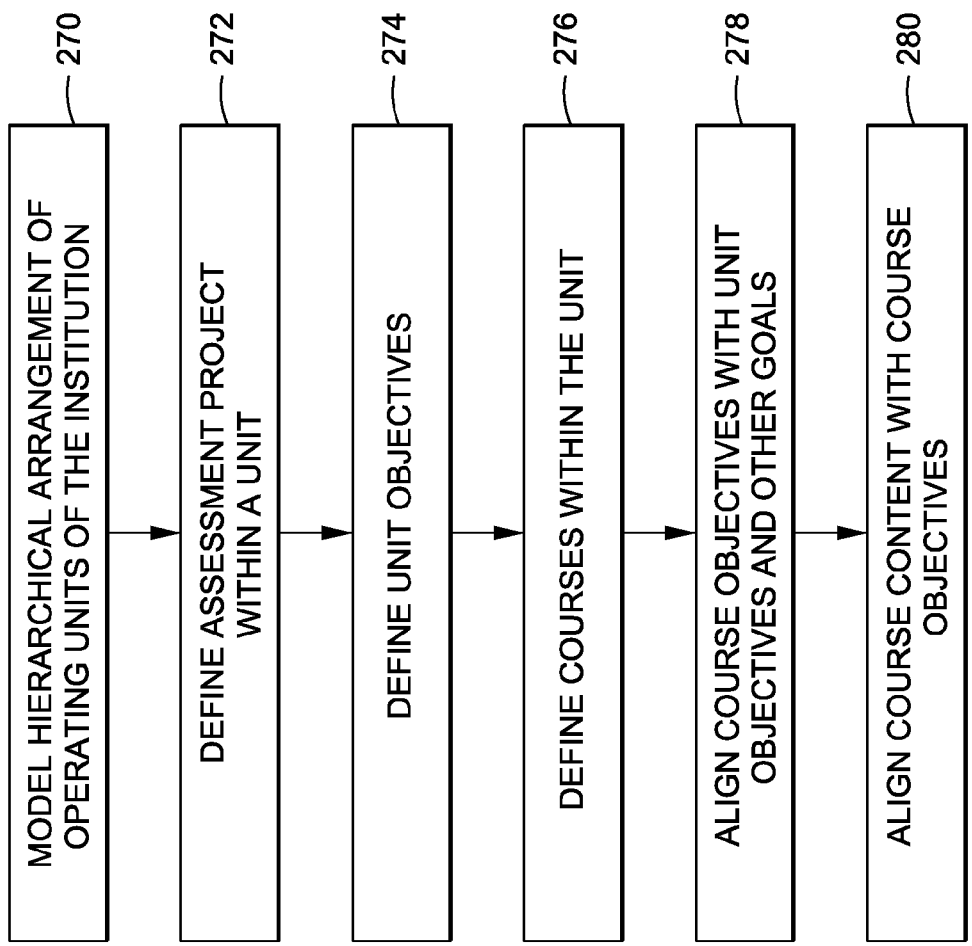

FIG. 3D

Goals for Division of Business & Finance

Add and manage goals for this academic department

| | Goal Label | Goal | Status | Comments | |
|---|---|---|---|---|---|
| ☐ | Efficiency | Implement the University Planning Council's Efficiency... | Active | 3 | Manage |
| ☐ | Quality Staff | Recruit develop, retain quality staff in an environment... | Active | 1 | Manage |
| ☐ | Quality of service | Improve the quality of services by conducting ongoing... | Active | 3 | Manage |
| ☐ | Five Star | Implement the "Five Star" imaging recommendations... | Active | 1 | Manage |
| ☐ | Risk Management | Enhance the risk management processes in each... | Active | 0 | Manage |

Add A Column...
- Category
- Created
- Keyword
- Last Modified
- Priority
- Related Goals
- Related Objectives

OK 325, 324, 326, 327

Navigation:
- Home
- Goals & Assessment Planning
  - Goal Manager
  - Assessment Projects
  - Unit Manager
  - Membership Manager
- Curriculum Planning
- Instrument Creation & Management
- Student Outcomes
- Reporting
- Committee Space
- Tools
- Admin ☐ Unit Map
☐ Advanced Find Search

FIG. 3I

| Blackboard Academic Suite™ Microsoft Internet Explorer | | | | | |
|---|---|---|---|---|---|
| File Edit View Favorites Tools Help | | | | | |

DIVISION OF ART > ART 221 - INTRO TO GRAPHIC DESIGN > SP'M ART 221-A > CURRICULUM PLANNING > LESSON PLANT MANAGER

Home
Goals & Assessment Planning
Curriculum Planning
• Second Objectives
▨ Lesson Planning
• Content Alignment
• Rubric Builder
Instrument Creation & Management
Student Outcomes
Reporting
Committee Space
Tools
Admin

☐ Lesson Plan Manager for SP05 ART 221 - Intro to Graphic Design — 416

| | | Name | Defined In | Number of Student Resources | Number of Faculty Resources | Number of Assessments | Permissions |
|---|---|---|---|---|---|---|---|
| 📝 Add Lesson Plan | | 📋 Copy | ❌ Remove | | | | |
| | ☐ | Intro to color theory | Division of Art | 4 | 5 | 2 | ⬇ |
| | ☐ | Complimentary colors | Division of Art | 3 | 3 | 2 | ⬇ |
| | ☐ | Emotional Effects of color | ART221 | 1 | 2 | 1 | ⬇ |
| | ☐ | Tension Lines | ART221 | 1 | 4 | 2 | ⬇ Manage |
| | ☐ | Tension line illustration | ART221-A Intro to Graphic Design | 2 | 3 | 1 | ⬇ |
| | ☐ | Composition with a grid | Division of Art | 4 | 7 | 1 | ⬇ |
| | ☐ | History of type faces | ART221 | 7 | 15 | 2 | ⬇ |
| | ☐ | Typographic style | ART221 | 8 | 12 | 2 | ⬇ |
| | ☐ | Using color and text | ART221 | 3 | 6 | 1 | ⬇ |
| | ☐ | Composing text on a grid | ART221-A Intro to Graphic Design | 2 | 4 | 1 | ⬇ Manage |

🔄 Refresh | Items per page: 25 ▼ Go

417 ─ ☐ Unit Map
      ☐ Advanced Find
      [      ] Search 418     420    422    424    426   428

| Courses Name | Tests | Collections | Assignments | Activities Discussion Board threads | Collaboration | |
|---|---|---|---|---|---|---|
| Engl 110 General Composition | 2 | 2 | 5 | - | - | Manage |
| Engl 209 Intro to Linguistic | 1 | 1 | - | 1 | - | Manage |
| Engl 211 Intro to Creative Writing | - | 3 | 3 | - | - | Manage |
| Engl 220 Intro to Literature | - | 1 | 2 | 1 | - | Manage |
| Engl 232 Mythology | 2 | 1 | 1 | 3 | 1 | Manage |
| Engl 251 British Lit 1 | 3 | - | 3 | 4 | 2 | Manage |
| Engl 270 Intro to Literary Studies | - | 2 | 4 | 1 | - | Manage |
| Engl 305 Advanced Grammar | 4 | - | 6 | - | - | Manage |
| Engl 310 Advanced Composition | 1 | - | 4 | 1 | 1 | Manage |
| Engl 315 Professional Writing | - | 2 | 4 | - | - | Manage |
| Engl 317 Teaching Writing | - | 4 | 3 | 2 | - | Manage |

Blackboard Academic Suite™ - Microsoft Internet Explorer

File Edit View Favorites Tools Help

- Home
- Goals & Assessment Planning
- Curriculum Planning
- Instrument Creation & Management
- Student Outcomes
- Reporting
  - Standard Reports
  - Dashboards
  - Scorecards
  - Ad-Hoc Reporting
  - Usage Tracking
- Committee Space
- Tools
- Admin ☐ Unit Map
☐ Advanced Find
[ ] [Search]

STATE U > REPORTING > STANDARD REPORTS > COURSE EVALUATION COMPLETION PERCENTAGE

☐ Report "Course Evaluation Completion Percentage" | Report Options | Report

⇪ Export to Desktop  ⇪ Export to Collection  🖨 Print  ⇪ Export  ⇨ Run Report  ⇨ Email Benchmark for departments is a 65% response rate.

| ☐ | Department Name | Number Sent Out | Percent Complete | Overall Rating | -Add A Column-<br>-Add A Column-<br>High Score<br>Low Score |
|---|---|---|---|---|---|
| ☐ | Communication Studies Department | 324 | 33% | 3.1 | |
| ☐ | Department of International Studies | 196 | 56% | 3.9 | |
| ☐ | Department of Psychology | 220 | 67% | 3.7 | |
| ☐ | Department of Social Work | 125 | 60% | 3.8 | |
| ☐ | Department of Sociology / Anthropology | 338 | 58% | 3.2 | |
| ☐ | English Department | 687 | 42% | 4.2 | |
| ☐ | Foreign Language Department | 245 | 51% | 3.3 | |
| ☐ | Philosophy Department | 212 | 55% | 2.9 | |
| ☐ | Political Science Department | 364 | 49% | 3.1 | |

⟲ Refresh | Row per page: [10 ▼] [Go]

710

Scorecard Manager for State U

Add and manage the scorecards in the list below. Click on the name to display the scorecard □ + Add Scorecard    |    ☒ Remove

| | Name | Description | |
|---|---|---|---|
| ☐ | Learner Successes | Improving the retention of students is evidence... | Manage |
| ☐ | Satisfaction | The overall quality of critical components of the... | Manage |
| ☐ | Stewardship | This represents our success in generating.... | Manage |
| ☐ | Strategic Agenda for 2010 | The scorecards align effort with vision to monitor... | Manage |

720 — Scorecard "Strategic Agenda 2040" — 720

| | Fall 2001 to Fall 2002 | Fall 2002 to Fall 2003 | Fall 2003 to Fall 2004 | Fall 2001 to Fall 2005 |
|---|---|---|---|---|
| Student | | | | |
| Student Satisfaction | 2.78 [Results from Student Satisfaction Survey (e.g., excellent, 3rd good, 2nd fail, 1st poor)] | 2.43 | 2.51 | 2.78 |
| SAT Scores | 1,117 | 1,023 | 989 | 1,095 |
| Year-to-Year Retention Rates | 76% | 72% | 69% | 75% |
| Faculty | | | | |
| Named Professorships | 117 | 102 | 115 | 123 |
| Minority Faculty | 22% | 21% | 18% | 24% |
| Service | | | | |
| In-State Graduate Retention | 10% | 11% | 13% | 13% |
| Student Community Service | 59,934 | 75,231 | 85,680 | 82,347 |
| Research | | | | |
| Research Expenditures | $1,243,650 | $950,560 | $1,043,650 | $1,443,650 |

Left navigation:
- Home
- Goals & Assessment Planning
- Curriculum Planning
- Instrument Creation & Management
- Student Outcomes
- Reporting
  - Standard Reports
  - Dashboards
  - Scorecards
  - Ad-Hoc Reporting
  - Usage Tracking
- Committee Space
- Tools
- Admin ☐ Unit Map
☐ Advanced Find    [Search]

Blackboard Academic Suite™ — Microsoft Internet Explorer

File   Edit   View   Favorites   Tools   Help

ENGLISH DEPARTMENT > TOOLS > PERSONAL INFORMATION

Personal Information "cchu"    Personal Info    Privacy    Preferences    Student Info    English Department Info

① General Information

- Home
- Goals & Assessment Planning
- Curriculum Planning
- Instrument Creation & Management
- Student Outcomes
- Reporting
- Committee Space
- Tools
  - Calendar
  - Tasks
  - Email
  - Discussion Board
  - Personal Information
  - File Collections
- Admin ☐ Unit Map
⊟ Advanced Find
[ Search ]

| Field | Value |
|---|---|
| Gender | Female ▼ |
| Race | Not Disclosed ▼ |
| Primary Language | English |
| Other Languages | French / German / Italian / Japanese |
| Parent's Language | English |
| High School Attended | Preston High School |
| High School GPA | 3:45 |
| SAT Score | 1250 |
| Housing | ○ Off Campus  ● On Campus  [Lyon Hall ▼] |
| Residence | ● In State  ○ Out of State |
| Financial Aid | ☑ Received financial aid this term  Amount $4,500.00 |
| Major | Creative Writing |
| Minor | Communication Studies |

② Submit

METHOD AND SYSTEM FOR ASSESSMENT WITHIN A MULTI-LEVEL ORGANIZATION

RELATED APPLICATIONS

The present application claims priority to U.S. Provisional Patent Application Ser. No. 60/670,963, filed Apr. 12, 2005, entitled "Transaction, Commerce, Community, Content, Learning, and Evaluation Systems", the disclosure of which is incorporated herein by reference in its entirety.

BACKGROUND

1. Field

The present disclosure relates generally to computer software and hardware systems, and more particularly, to such a system for providing assessment of multiple levels of effectiveness.

2. Background

As part of providing quality educational opportunities, many academic institutions are interested in assessing and evaluating their performance and efforts as well as the performance of units and individuals within the institution. These institutions can include, for example, on-line institutions, K-12 schools, colleges, universities and even multi-campus university systems. One purpose of assessment involves collecting and documenting the necessary evidence needed for satisfying the requirements of regional or national accreditation bodies. Another purpose is to allow the institution to make informed and objective decisions about, for example, curriculum content, course offerings, and educational effectiveness.

In the past, assessment efforts have been disjointed and performed in relative isolation at the different levels of the academic institution. For example, the assessment process at the classroom level was performed separate from any assessment (if ever performed) at a department level or higher (e.g., institutional level). This approach lead to redundancy of information and efforts, as well as disparate results that would need to be combined in some manner and evaluated if an overall assessment result is desired.

Furthermore, identifying and collecting information needed to meet accreditation requirements may be performed on an ad-hoc basis when needed. These processes are then repeated the next time accreditation is reviewed. Such an approach relies heavily on repeatedly reviewing the same information and generating the necessary documentation each time accreditation is reviewed.

Accordingly, there exists a need for an assessment system for institutions that is able to consider and connect multiple organizational tiers of the institution and to provide systematic and systemic data collection, organization, and retrieval components to support institutional assessment efforts.

SUMMARY

Accordingly, one aspect of the present invention relates to a method for performing assessment within a multi-level institution. In accordance with this aspect, a model is stored of a plurality of organizational levels of the institution, wherein each organizational level includes at least one respective, associated node. For any node, at least one customizable assessment project associated with that node is created and presented to a user. Then, the at least one customizable assessment project is completed based, at least in part, on first input received from the user.

Another aspect of the present invention relates to a system for performing assessment within a multi-level institution. Such a system includes a computer-based model of a plurality of organizational levels of the institution, wherein each organizational level includes at least one respective, associated node and a programmable computer, having access to the computer-based model. This programmable computer is configured to a) receive first input indicative of a particular node within the model; b) present to a user at least one customizable assessment project associated with that particular node; and c) complete the at least one customizable assessment project based, at least in part, on second input received from the user.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of an institutional assessment system are illustrated by way of example, and not by way of limitation, in the accompanying drawings, wherein:

FIG. 2C depicts an exemplary assessment process.

FIGS. 3B-3I depict a series of screen shots of a user interface that allows a user to perform Goal and Planning Assessment within an assessment system in accordance with the principles of the present invention.

FIG. 4A-4C depict a series of screen shots of a user interface that allows a user to perform curriculum planning in accordance with the principles of the present invention.

FIGS. 5B-5J depict a series of screen shots of a user interface that allows a user to manage and create instruments within an assessment system in accordance with the principles of the present invention.

FIGS. 7A-7K depict a series of screen shots of a user interface that allows selective reporting of data and content from within an assessment system.

FIGS. 8A-8L depict a series of screen shots of a user interface of an assessment system that provides a number of auxiliary tools.

Figure 1:
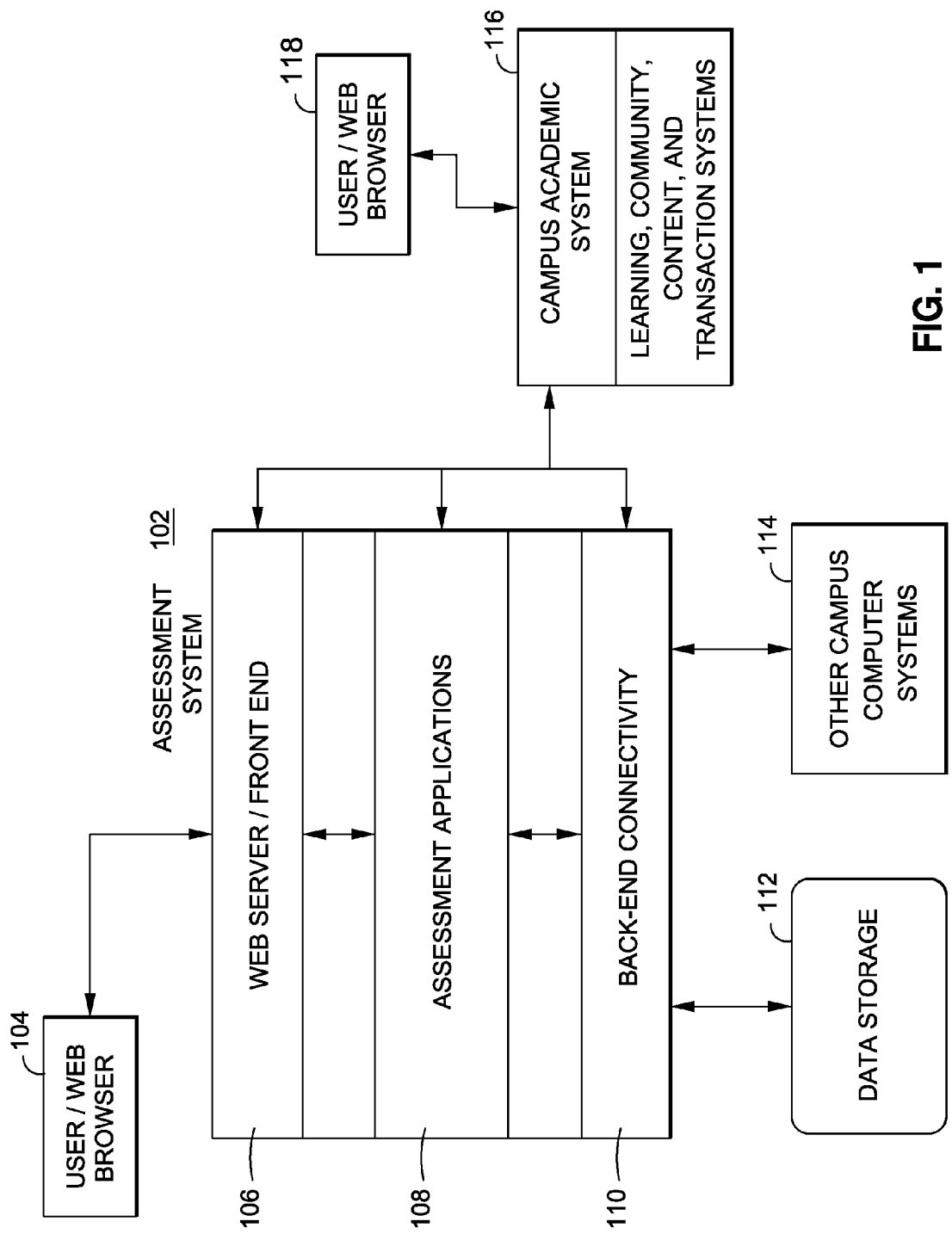
FIG. 1 illustrates a block-level diagram of an institutional environment in which an assessment system is implemented in accordance with the principles of the present invention.

The figures include a number of different screen shots of an exemplary user interface. One of ordinary skill will appreciate that the depicted interface is provided by way of example and that the layout, options and items on each screen shot may be altered or augmented without departing from the scope of the present invention.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention. Additionally, the term "automatic" may be used herein to describe one or more process steps that may be performed in an automated manner using various types of programmable processors or computers. However, one of ordinary skill will recognize that the performance of these steps may also be accomplished manually or via a combination of manual and automated processes.

Terminology

In general, as used herein, "assessment" means a repeating or cyclic improvement process that involves measuring outcomes versus stated objectives or goals and identifying corrective action. The term "evaluation" has more of a connotation of a point in time measurement of one or more outcomes versus stated objectives without necessarily having a built-in improvement step. For example, a program may have the goal of developing students' critical thinking abilities and might annually determine whether, as a program, that goal has been achieved. Therefore, one might wish to annually assess this by looking at the aggregate performance of the program's students on a senior capstone project.

Other terms that are used consistently herein include:

Mission: A broad statement that describes the over-arching purpose of an organization. Mission statements typically are not measurable because of the scope that they encompass and because they are not time-constrained.

Goal: Missions are frequently broken down further into a series of goals. Though more specific than a mission, goals are still broad statements and may not be easily measurable. Goals provide guidance on areas that should be addressed through specific, measurable objectives.

Objective: An objective is an expression of the intended result or consequence of some activity (e.g. instruction or some other performance). It differs from an outcome, which is the achieved result, although the two are sometimes used interchangeably. The activities described by an objective should be measurable within a defined timeframe. Frequently, the term is used with a modifier to clarify the activity, e.g. a learning objective or a performance objective.

Standard: In educational assessment, for example, a standard is a statement of what a learner should know or be able to do. A standard is more specific than a goal and should be measurable. In that sense, a standard is much closer to an objective than a goal. However, unlike an objective, a standard may not be related to a specific activity, instruction, performance, etc. or timeframe. Also, standards are frequently generated by organizations external to the academic institution (e.g. state governments, accrediting agencies) as a means to standardize measurement of performance or learning across multiple organizations.

Outcome: An outcome is the achieved result or consequence of some activity (e.g. instruction or some other performance). It differs from an objective, which is the intended result, although the two are sometimes used interchangeably. Frequently, the term is used with a modifier to clarify the activity, e.g. a learning outcome or a performance outcome.

A "template" is a means of defining the structure of various data in the system and the instruments used to collect that data. A template may define one or more customizable forms and the attributes that are present on each form. A "form" is a customizable page within a template consisting of one or more attributes. An "attribute" is a piece of data that defines an entity (such as the name of a user) which may be represented on a form as a field. Certain attribute fields may be required by the system. The level of customization (e.g. the ability to change labels on an attribute versus the ability to add new attributes to a form) may be dependent on the type of template that the form is a part of.

For example, a template for collecting data about a user might consist of one form. On that form are specific attributes, such as "name" "social security number" and "type." The "name" and "social security number" attributes might allow for entry of text information, while the "type" attribute might offer a selection of 'faculty,' 'staff,' or 'student.' The "name" and "social security number" attributes might be required, meaning that any person completing the form must enter data for those attributes, while the "type" attribute might be optional. One of ordinary skill will recognize that there are numerous different and varying attributes that can be defined for each form using standard available web-based interfaces. For example, the information related to an operating unit will vary for a "College" operating unit and a "Department" operating unit. A College operating unit may have fields to designate Dean, while a Department would have fields to identify the current Chair of the department. Beyond such labeling distinctions, different operating units may even have different types of data. For example, an operating unit representing a Center for Media Students may need to store, as part of the operating unit, information about the grant that funds the Center, the grant's initiation and expiration dates, and who manages the Grant, while a Department, funded out of the university budget, may only need to store university budget codes assigned to the Department. Based on their purpose and level within the organization, different operating units will have different informational needs.

Figure 2A:
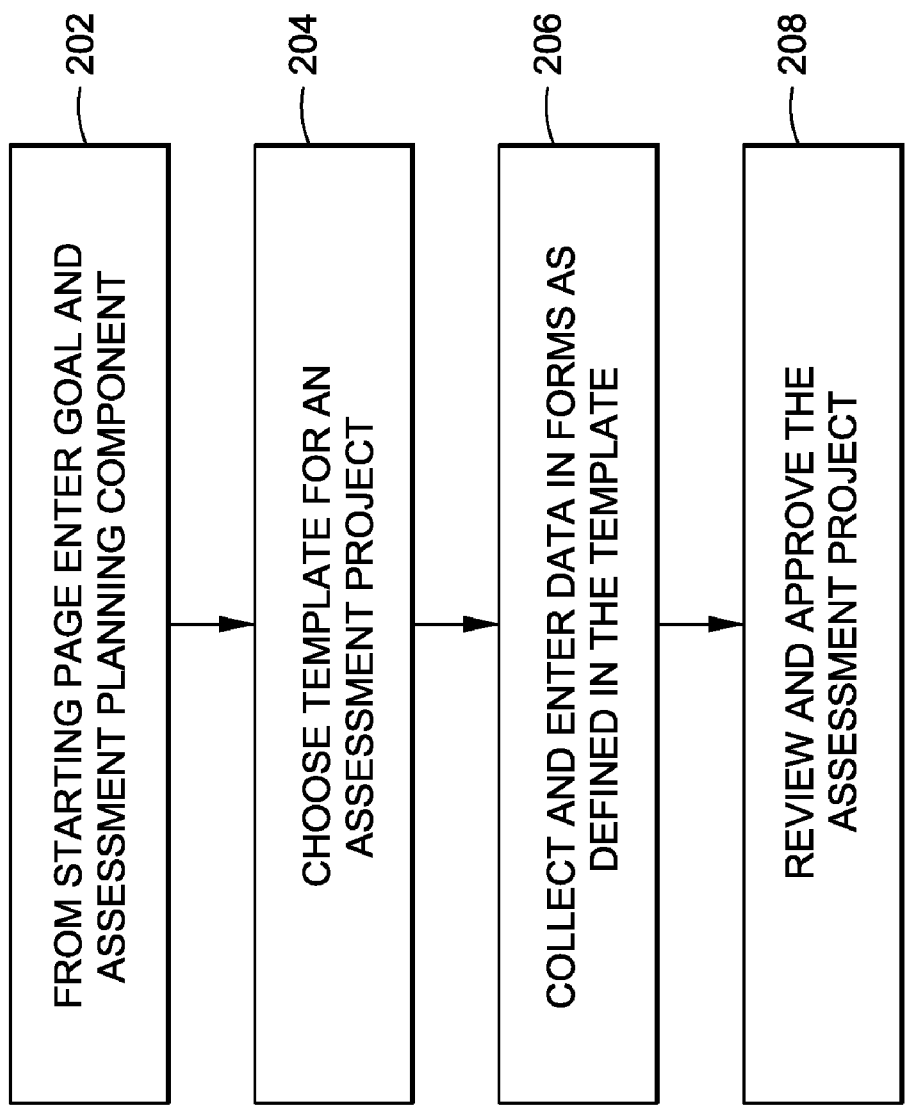
FIG. 2A depicts a flowchart of an exemplary method for using an assessment plan for a multi-tier organization using a template driven model.
Figure 2B:
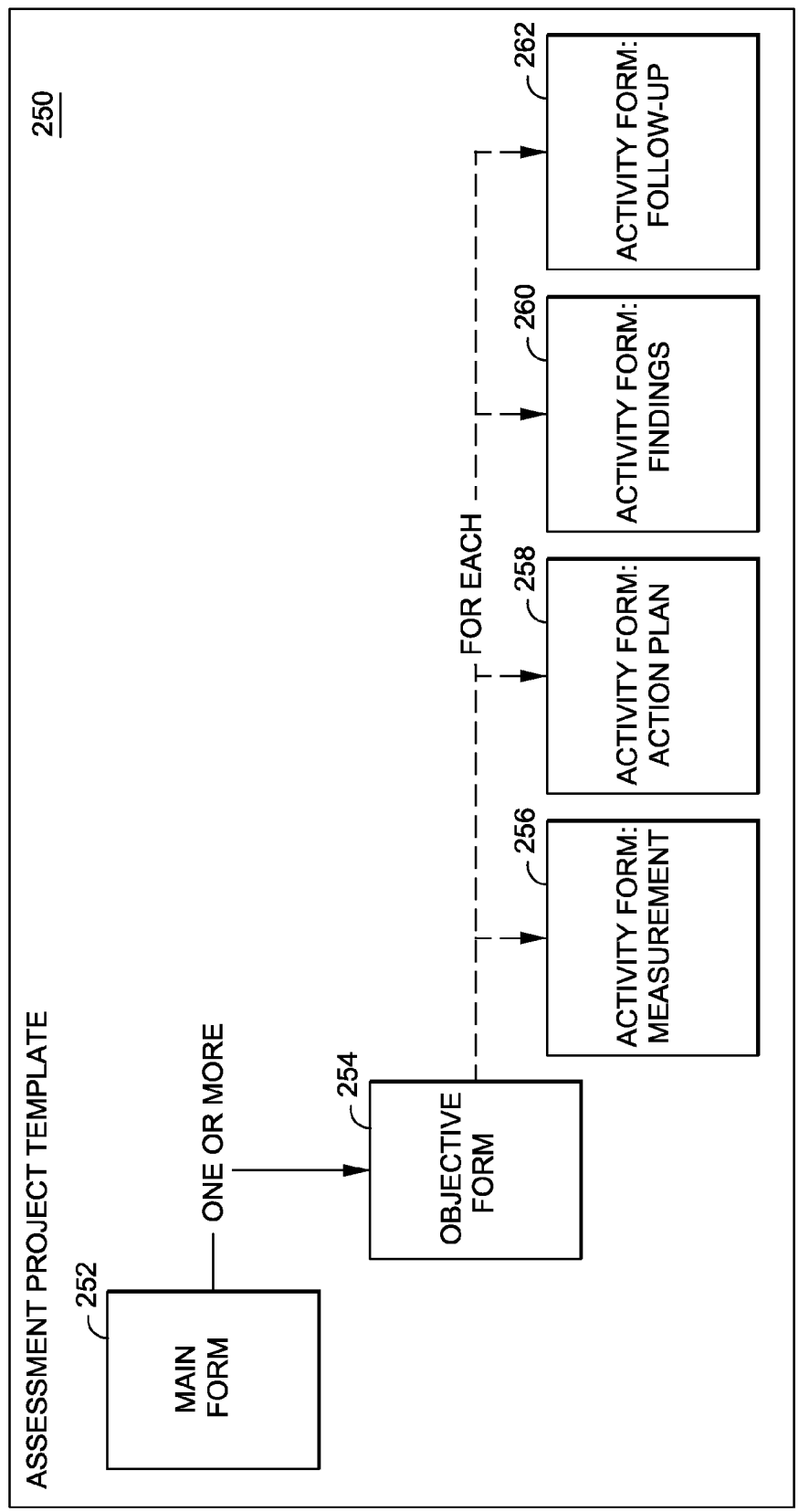
FIG. 2B illustrates an exemplary template having hierarchically arranged forms.

Templates may also consist of more than one form; this is particularly useful for the representation of a data collection process that consists of multiple steps. For example, an Assessment Project template might consist of a "properties form" to collect data about the properties of the project itself, one or more "objective forms" to collect data about each objective being measured, and four "activity forms" per objective to collect data about the different steps of assessing the performance of the objective. Each form would have specific attributes defined. This exemplar template is illustrated in FIG. 2B. One of ordinary skill will recognize that there could be many different ways to configure a multiple-form template to represent a variety of different processes for different purposes.

While many examples are provided herein that specifically include a higher-education institution, the principles of the present invention contemplate other types of institutions as well. For example, corporations, governmental entities, and K-12 institutions are all considered within the scope of the present invention. An institution may also be a consortium of schools and/or campuses. In general terms, an institution is an operating unit and is, itself, made up of different operating units that may correspond to campuses, colleges, departments, sub-departments, etc. The systems and methods described herein do not require any particular arrangement of operating units but, instead, allow the institution to model its organization into a hierarchy of operating units for purposes of management, planning, and reporting of assessment efforts. The terms "unit", "operating unit", and "operational unit" are often used interchangeably herein. However, there are unique aspects of operating units related to their respective level in the organizational hierarchy that allow customization and flexibility based on these unique aspects.

In the higher education example, operating units offer programs of study, or simply "programs", with different courses and sections. Thus, assessment can occur, for example, at or across an institutional level, a departmental level, a program level, an individual level, a course level and at the section level. Programs may also include courses offered by different operating units. For example, a particular program of study may require both an introductory Engineering course and a computer science course. Within the institutional level assessment, different varieties of assessment may also be performed on different levels of operating units as well. For example, the institution may be organized according to operating units that represent department levels, college levels, etc. Thus, a framework is described herein, in which a hierarchically arranged group of organizational units and activities are defined and assessed against various criteria and objectives.

FIG. 1 depicts a functional block diagram of an exemplary environment for an assessment system 102 in accordance with the principles of the present invention. As described in more detail herein, the assessment system 102 provides a framework for performing various types of assessments of an institution such as, for example, a higher education institution. A user 104 of the system 102 typically uses a web browser or similar interface to communicate with an appropriately configured front-end 106 of the system 102. For example, the front-end 106 may be a web server hosting a number of applications 108 that the user 104 may access. The applications 108 are one or more software components or programs that execute on a programmable computer platform to provide functionality related to performing institution-related assessment activities. Such applications 108 may include components for modeling the institution or organization, defining assessment projects, identifying users (e.g., students), defining objectives and goals, and collecting and reporting data.

The applications 108 may also access data storage facilities 112 and other computer systems 114. For example, the data facilities 112 may be one or more databases having assessment project data stored and arranged in a convenient and appropriate manner for easy manipulation and retrieval. The other computer systems 114 may be a variety of third-party systems that contain data or resources that are useful for the assessment system 102. In the exemplary higher education environment, the systems 114 may include a student information system (SIS) that maintains student demographic information as would be appreciated by one of ordinary skill. The systems 114 may also include an electronically maintained class, or course, schedule for the institution that includes information about the courses such as section numbers, professors, class size, department, college, the students enrolled, etc. Other campus-related systems such as financial aid and the bursar's office may be included in the systems 114 of FIG. 1. The back-end 110 is appropriately configured software and hardware that interface between the applications 108 and the various resources 112, 114.

Another resource to which the back end 110 may provide connectivity is a campus (or institutional) academic system 116. An example of such a system is provided by the present Assignee under the name Academic Suite™ with many features thereof described in U.S. Pat. No. 6,998,138 entitled "Internet-Based Education Support System and Methods", the disclosure of which is incorporated herein in its entirety. As described in that patent, the campus academic system 116, in an academic environment, provides a platform that allows students and teachers to interact in a virtual environment based on the courses for which the student is enrolled. This system may be logically separated into different components such as a learning system, a content system, a community system, and a transaction system. An example of such a student is the user 118 that can access the academic system 116 via a web browser or similar interface. The user 118 may also be faculty, staff or an administrative officer. An example of these separate components of the system 116 are described in detail in pending patent applications "Method and System for Conducting Online Transactions (Ser. No. 10/373,924 filed Feb. 25, 2003), "Content and Portal Systems and Associated Methods" (Ser. No. 11/142,965 filed Jun. 2, 2005), and "Content System and Associated Methods" (Ser. No. 10/918, 016 filed Aug. 13, 2004), all of which are incorporated herein by reference in their entirety.

Of particular usefulness to the assessment system 102, the academic system 116 provides a virtual space that the user 118 may visit to receive information and to provide information. One exemplary arrangement provides the user 118 with a home page where general information may be located and that has links to access course-specific pages where course-specific information is located. As explained in the incorporated patent and patent applications, electronic messaging, electronic drop boxes, and executable modules may be provided within the user's virtual space on the academic system 116. Thus, with respect to the assessment system 102, one of the applications 108 may be used to generate information that is to be deployed to one or more users of the academic system 116. Via the back-end 110, the information may be sent to the academic system 116 where it is made available to the user 118 just as any other information is made available. Similarly, from within the academic system 116, the user may enter and submit data that is routed through the back end 110 to one of the applications 108. One of ordinary skill will recognize that the academic system 116 and the assessment system 102 may be more closely integrated so that the connectivity between the applications 108 and the system 116 is achieved without a network connection or special back end software 110.

Although the front end 106, applications 108, and back end 110 of the assessment system 102 are each depicted as a single block in FIG. 1, one of ordinary skill will appreciate that each may also be implemented using a number of discrete, interconnected components. As for the communication pathways between the various blocks of FIG. 1, a variety of functionally equivalent arrangements may be utilized. For example, some pathways may be via the Internet or other wide-area network, while other pathways may be via a local-area network or even a wireless interface. Also, although only a single user 104 of the assessment system 102 is explicitly shown, multiple users are not only contemplated but are very likely within the environment of FIG. 1. The structure of FIG. 1 is logical in nature and does not necessarily reflect the physical structure of such a system. For example, the assessment system 102 may be distributed across multiple computer platforms as can the data storage 108. Furthermore, the three components 106, 108, 110 are separate in the figure to simplify explanation of their respective operation. However, these functions may be performed by a number of different, individual components, or a more monolithically arranged component. Additionally, any of the three logical components 106, 108, 110 may directly communicate with the academic system 116 without an intermediary. Also, although the users 104, 118 are depicted as separate entities in FIG. 1, they may, in fact, be the same user or a single web browser instance concurrently accessing both the assessment system 102 and the academic system 116.

Assessment within an institution such as a higher-education academic institution is a complex undertaking that encompasses many different levels of evaluation, data collection, and correction. For example, at the institutional level, a university may be focused on assessing accreditation requirements and strategic planning initiatives. At the program level, the relevant managers may be focused on assessing program effectiveness and discipline-specific accreditation requirements. At the classroom level, the instructors may be interested in assessing course design and curriculum coverage. Thus, some of the diverse questions that one or more assessment processes may try to address are decisions on faculty promotion and tenure, determining an effective mix of full-time and adjunct faculty, determining an effective mix of traditional and remote courses, and assessing whether the needs of specific student populations (e.g., commuters, transferees, minorities) are being met.

Assessment Projects and Initiatives

In general the phrase "assessment project" is used herein to describe efforts of an institution, an operating unit, a program or a course to assess and evaluate different aspects of its operation and effectiveness. One or more assessment projects may be ongoing at any time for the same operating unit or different operating units. An "assessment initiative" may encompass a number of different assessment projects that are related to a common theme. For example, an assessment initiative for Accreditation Board of Engineering and Technology (ABET) accreditation may be defined by the College of Engineering such that the ABET assessment project of each of the individual departments within the College (e.g. Department of Electrical Engineering, Department of Civil Engineering, Department of Mechanical Engineering, etc.) may connect to the College-level assessment initiative to enable College-level reporting on status and outcomes. By explicitly connecting, or associating, a number of assessment projects with an assessment initiative, a user of the present system is able to aggregate and organize data from among the different projects so that assessment and analysis can occur from both an individual project perspective as well as from the assessment initiative's cross-project perspective. Exemplary assessment projects might be:

a) internal to the program, such as a curriculum planning project or a program review;

b) internal to the institution, such as fulfilling institutional strategic planning requirements; or c) for external review or accreditation, such as completing an institutional accreditation report or a discipline-specific accreditation report.

Assessment projects may be initiated at different times and will span different time frames. For example, while a project supporting the unit's responsibilities for institutional accreditation may actually take place over several years, strategic planning assessment projects may only last eight months and happen with more regularity than accreditation.

Even though the assessment process can be highly complex, there are some general provisions of the assessment system 102 of FIG. 1 that allow a user 104 to systematically and automatically initiate assessment projects. The general method of FIG. 2A is utilized, regardless of whether the user is defining an assessment project for an institution operating unit, some lower-level operating unit, or a program or course.

From a starting page, the user makes a selection, in step 202, via a user interface to enter a goal and planning component of the assessment system 102. After activating such a component, the user is prompted to define an assessment project. To simplify this process, the system 102 may provide the user with a default template or form that has some predefined fields and information. Alternatively, the user may be presented with a number of different types of templates and asked to make a selection. For example, the user may be asked whether the assessment project involves a program, a department, a college, an institution, or a course. Based on the user's response, an appropriate template may be provided to the user. For example, at the course level, the user would likely not be interested in defining strategic planning goals. Similarly, at the institutional level, the user would likely not be interested in specifying a course objective. Thus, the templates provided to the user may have their initial content dependent on what type of assessment project is being defined. In one particular embodiment, the assessment system 102 may be initially provided with a number of predefined templates. As part of the initialization process (before assessment projects are defined) a user or other administrator may customize these templates in accordance with the institution and its programs, departments, courses, etc. The customization of templates is not a necessary step before an assessment project is begun but it advantageously provides flexible customization geared towards each respective institution and their hierarchical organization.

As a result, in step 204, the user selects a template for the type of assessment project being generated. Then, in step 206, the user collects and enters data required by the forms as defined in the selected template. For example, the collection and entering of data may include metadata about the assessment project, the specific objectives of the assessment project, and activities related to each objective. Once the form is completed, then it can be presented to other users for review and approval in step 208. For example, a department chair may have responsibility for creating an assessment project but there may be a committee that may modify and approve the assessment project before it can be implemented.

In the above description, it is assumed that the user has adequate access rights within the assessment system 102 to perform the desired tasks. As known to one of ordinary skill, user identities and user roles may be employed to restrict user activities so that certain users have more access privileges to data resources than other users. These access privileges may be relatively static or may be more dynamic in nature as various users are placed in different roles or committees. Certain users may be allowed no access to an assessment project, read-only access to the project, edit-access to the assessment project, or create-access to the assessment project. Additionally, within an assessment project, the individual components of the project may have controlled access based on user roles as well. Furthermore, an assessment project manager role may be employed, and assigned to a user, to help with administering and managing the project and its implementation. Thus, different resources within the present assessment system may be protected through the application of access privileges that allow each resource to be available to one or more identified users or shared by all users.

FIG. 2B depicts an exemplary template structure that may be used to implement the default templates that are presented to the user. In assessment projects, templates are used to define the set of forms that are employed to collect the information that makes up the assessment project. An assessment project template 250 may include one or more of several types of forms:

a) a main form 252 is used to collect information about the project itself. Additional fields can be added to a project form in new templates by the user, but certain fields may be required on an assessment project template's project form in order to standardize data collection. While not absolutely necessary, it is advantageous to permit only one project form per assessment project template 250.

b) An objective form 254 is used to collect information about the objectives of the assessment project. An assessment project typically has one or more objectives, so at least one objective form is present. Many assessment projects have multiple objectives, however.

c) Objective forms can have one or more activity forms 256-262 associated with them in the template 250. These activity forms 256-262 collect information about various activities related to conducting the assessment of the objective. Each activity form may have a different set of fields on it. Addition of an objective (e.g. addition of an objective form 254) to a template 250, also generates the associated activity forms 256-262.

The template 250 of FIG. 2B may be fully customizable and definable by a user. However, in some instances, an institution may enforce requirements that all assessment projects include certain base information. Such a requirement may be helpful, for example, in ensuring that institution-wide reporting can be performed at least on the base set of assessment project attributes.

In one example, the template 250 of FIG. 2B includes:

Summary Statement: This provides an area to enter a general description or summary of the whole assessment project. This summary can also be used as part of a report generated for the assessment project. For example, the summary statement could include an overview of the project, names and titles of the university faculty and staff involved, and a summary of the findings. This might appear as the first page of a report.

Start/End Dates: Projects to evaluate learning outcomes or reviews of programs at an institution may have specific time periods which they span (e.g. an accreditation project may last several years, but a program review may happen annually.) A user initiating an assessment project can specify start and end dates for the assessment project. The default start date would be the project's date of creation. The default end date would not be set (i.e. no end date) as some assessment projects could be continuous and ongoing.

Phase Summaries. For each phase that is defined for the assessment project by the template, the user (or manager) is able to enter summary information for that phase.

Recurrence: The assessment process is cyclical, so frequently the same (or similar) assessment project may be run on a regular basis. For example, a departmental program review may occur every year, or the department's discipline-specific accreditation may need to be re-confirmed every three years. It is therefore useful to track if an assessment project is a re-occurrence of some previous assessment project.

Workflow: Workflow status can be used to control the state of the template and to determine what action or activity is next in the process flow.

The flowchart of FIG. 2C provides one example of one way to define a process of initiating the assessment process that is also further described later with reference to FIGS. 3A-3I. More particularly, the flowchart depicts a specific sequence of events that do not necessarily have to occur in that order. For example, the step of modeling (step 270) does not necessarily have to occur before an assessment project (step 272). Thus, the steps of the flowchart may occur in an order other than depicted in FIG. 2C. There are events that may advantageously be performed in a particular order for logical reasons. For example, aligning course content (step 280) will usually be performed after defining unit objectives (step 274). Additionally, one or more steps of the flowchart of FIG. 2C may be added or omitted without departing from the scope of the present invention.

Figure 2D:
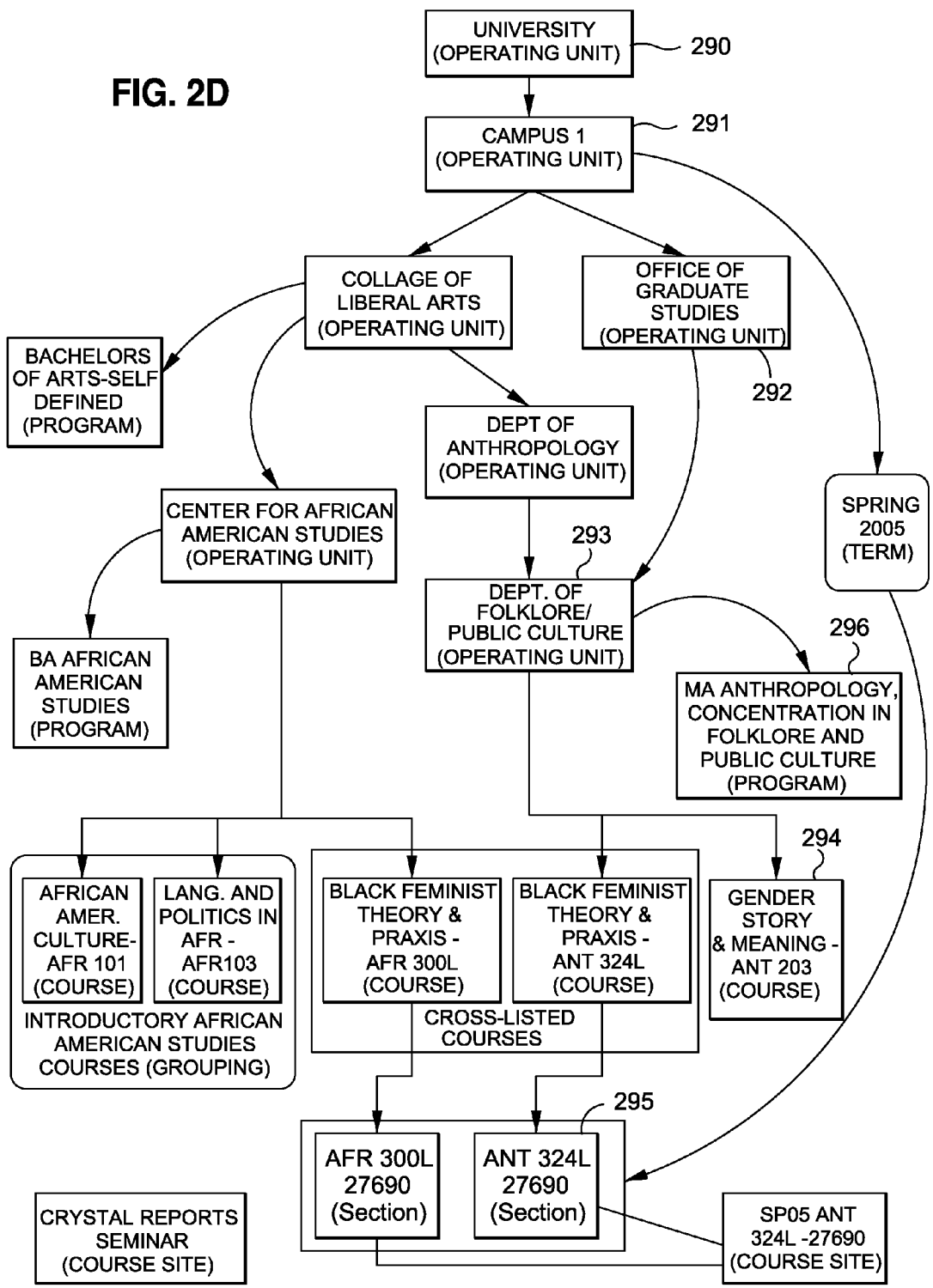
FIG. 2D depicts an exemplary model for a higher education institution within which assessments can be performed in accordance with the principles of the present invention.

Before beginning the definition of an assessment project, the institution itself may be modeled. FIG. 2D is a sample of only a part of a model that may apply to an institution such as, for example, a university with multiple campuses. As illustrated, the model captures details about various hierarchically arranged operating units 290-293, as well as programs 296, courses 294, and sections 295. Other equivalent terminology that may also be used herein to describe the organization of the institution may specify "nodes" within different "organizational levels" of the institution. For example, the institution itself may be a node at the organizational level of "institution". Additionally, at the organizational level of "campus", there may be multiple nodes with each node representing a different campus (e.g., Campus1 291 of FIG. 2D). Other organizational levels, as already mentioned, may include many different types of operating units and entities within the institution such as, for example, colleges, departments, programs, colleges, sections, courses, etc. all of which can be considered a node. The model of FIG. 2D is provided merely by way of example to show the flexibility and customization provided by the present assessment system. The modeling of the institution may be approached in a variety of ways. For example, an academic institution may be comprised of a number of hierarchically arranged organizational levels. The institution may have a number of different colleges that each have different departments that offer various courses having individual sections. Also, within this organizational structure, there may be programs of study such as, for example, different degree programs (B.S., M.S., PhD) or concentrations of study. One of ordinary skill will recognize that the institution may be organized in a variety of different ways and that implementations of the present invention are able to model those various structures as different operating units that are used within an assessment project or initiative. Because of the hierarchical nature of the model, operating units may have lower-level operating units that are sometimes referred to herein as sub-operating units or lower-level operating units. The actual mechanics of modeling the institution may be accomplished in a variety of ways without departing from the scope of the present invention. For example, as part of the initial set-up of the assessment system described herein, an administrator may manually define the hierarchical arrangement of the institution in a manual step-by-step process. Alternatively, the model definition may take place such that a list of the organizational levels is processed as a batch to create the model. Still yet another alternative may involve integration with the campus academic system 116 (or other existing system) through an automated process to define the model. In one particular example, the common attributes for each node within an organizational level may be captured in the form of a editable template. When an instance of a particular node is to be modeled within that organizational level, a user can select the appropriate template and then modify it in accordance with the particular characteristics of that node.

Thus, in step 270, initiation of an assessment project may begin by modeling the hierarchical structure of the institution. Once this is accomplished, definition of an assessment project may begin, in step 272. The assessment project within an operating unit (e.g., a college, a department) may be related to a higher-level operating unit for which goals and objectives have already been defined. In an educational institution, for example, the sub-units may be academic departments, administrative or other departments. Underneath these units may be courses or course sections. When creating other assessment projects, the previous modeling of the institution (step 270) does not need to be re-accomplished but may be re-utilized.

For the sub-operating units, their own objectives are defined in step 274. These objectives may be aligned with the top-level goals and objectives to create a link between the multiple hierarchical levels of operating units. Within a sub-operating unit, one or more courses are defined in step 276. As part of defining a course, the course objectives are aligned with higher-level goals and objectives, in step 278, so that a link between courses and the meeting of certain goals and objectives can be established. In addition to the course having its own objectives, the course can also include a definition of its content (e.g., assignments, tests, reading material, collaboration exercises, etc.). A description of the various content for a course may include which course or unit objective it is aligned with. Thus, in step 280, course content is aligned with course objectives and, possible, higher-level goals and objectives. As a result, top-level managers can establish which specific resources satisfy strategic goals and objectives, while low-level managers can identify deficiencies in course offerings and content when compared to desired curriculum objectives. One advantageous benefit of the present system, described below, is that at each level of the process an appropriate form can be presented to the user to direct the definition of the assessment project.

Goals, Objectives, Standards, and Assessment Planning

FIGS. 3A-3I provide a series of screenshots of one exemplary user interface that allows a user or project manager to create an assessment project. One of ordinary skill will appreciate that not all steps depicted in the screen shots are necessary nor are all the features within the user interface.

Figure 3A:
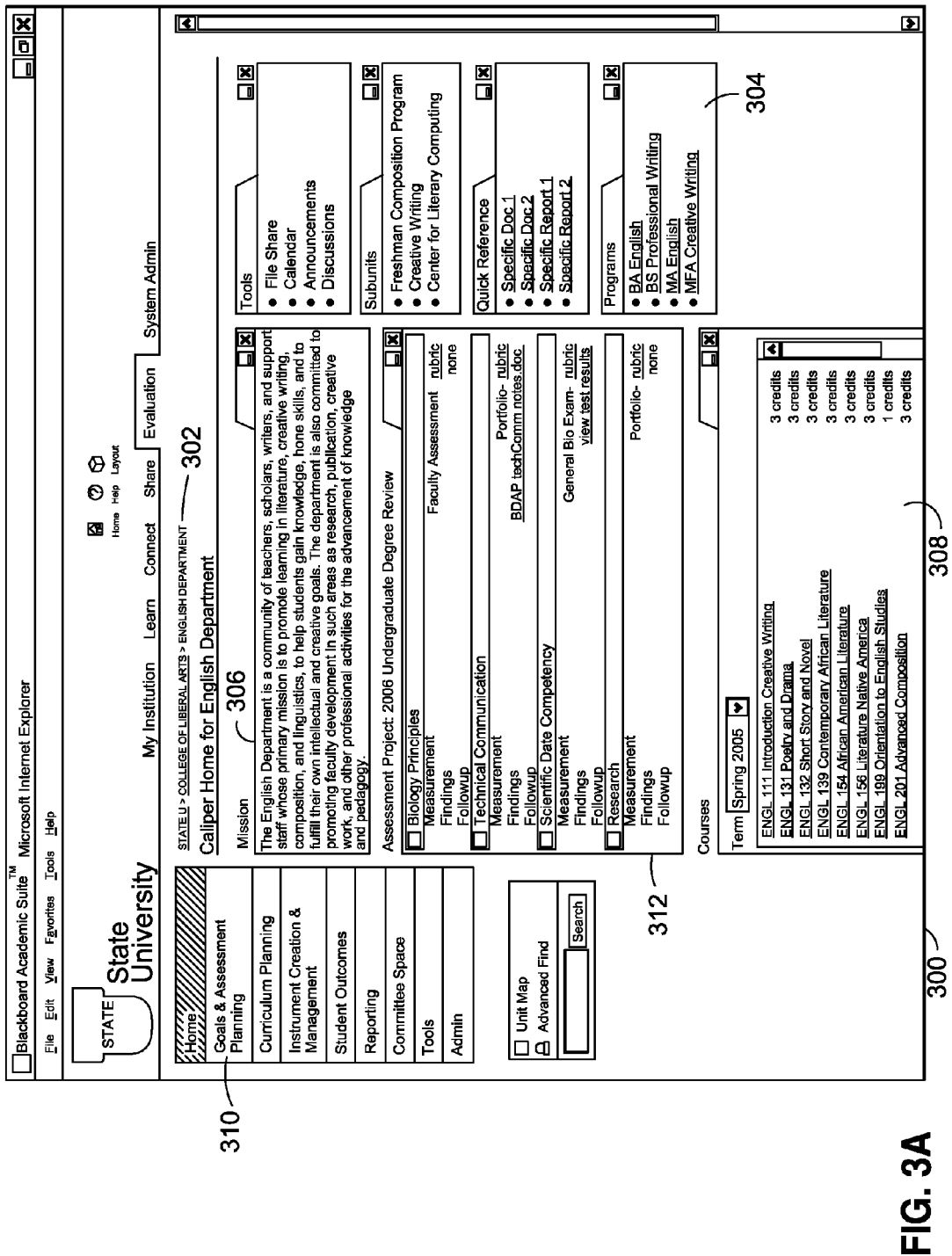
FIG. 3A depicts a screen shot of a home page from which a user may elect to perform functions within an assessment system.

FIG. 3A depicts a screen shot of an opening window 300 for an English department of a university. This window would typically be presented to a user once that user logs into the assessment system and would be based on the user's identity (e.g., an Engineering professor or department head would be presented with a different, appropriate window). The title bar 302 shows the example hierarchy of:

University
    College of Liberal Arts
        English Department that has been originally defined for this institution or changed through subsequent modification. Such a hierarchy can, for example, be defined by the institution when initially configuring the assessment system or modified during a later update of that definition. From this "home page" a user may start a new assessment project or interact within a current assessment project.

A number of sub-windows may be provided within the opening window 300. Some exemplary windows, as shown in FIG. 3A, include a mission statement window 306, a list of available assessment projects 312, and a list of courses 308 within the English Department. As shown, the available courses 308 can be filtered according to the term in which they are offered. Another possible sub-window lists the different programs 304 offered by the English Department. From the Home window 300, the user can opt to manage the assessment process by selecting to open the "Goals & Assessment Planning" tab 310. The tabs located in the left of the window 300 allow a user to select the different functions available within the system.

Figure 3B:
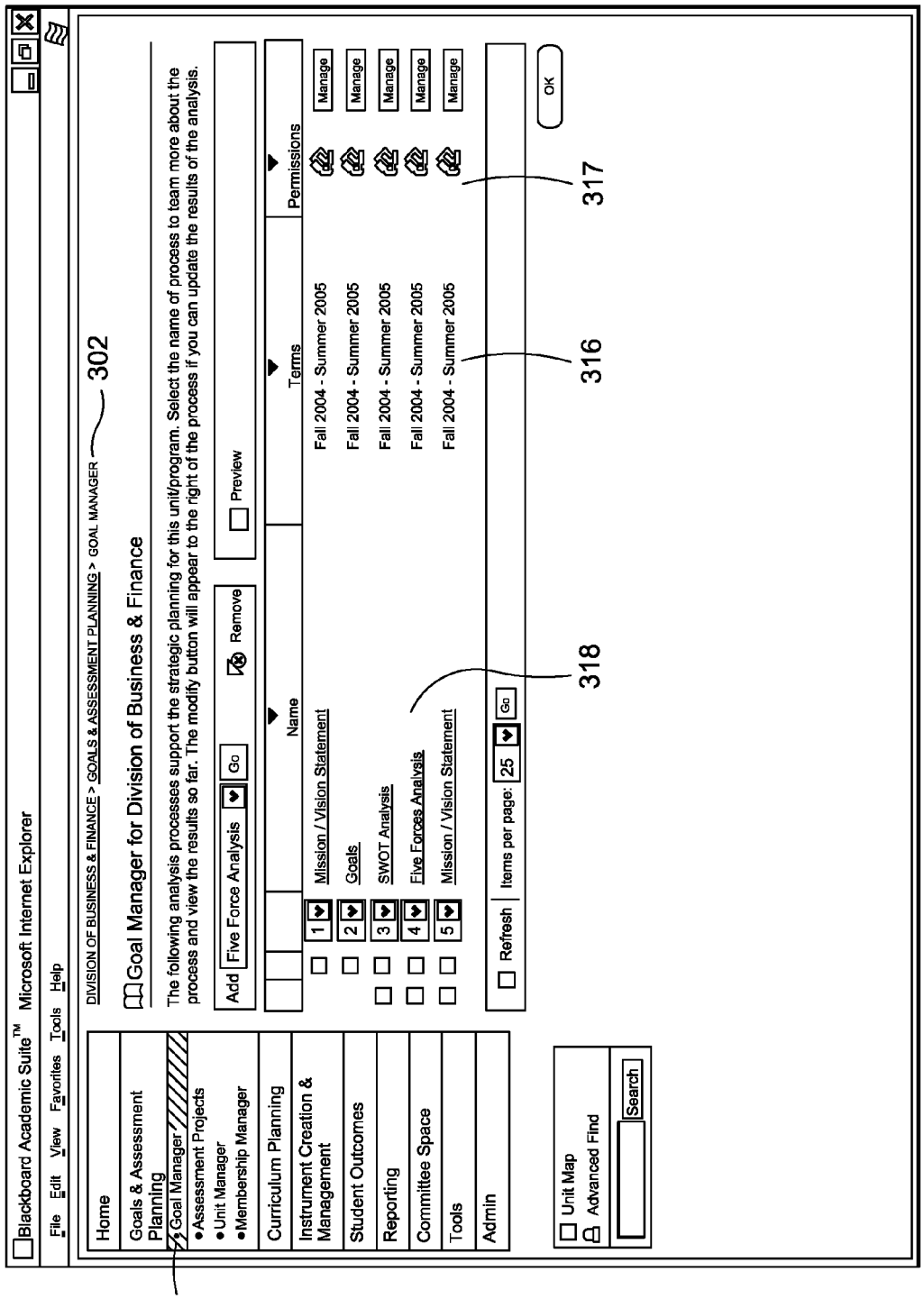

The "Goal Manager" window of FIG. 3B is identified by its title bar 302 and the tab 314. (This exemplary window is for a hypothetical Business & Finance Department unlike the previous window which related to an English Department). From within this interface, a user is presented with a list of analysis processes 318 that are available to support strategic planning of a particular unit or program (e.g., institution, campus, department, Graduate program, etc.) These processes can include, for example, "Goals" or "Mission Statement", "Vision Statement", and other widely used analysis processes that are known within the area of strategic planning. As used herein, a mission statement generally relates to what a institution plans to do while a vision statement relates to the institution's principles or what it believes in.

This list of processes may also include an identification of an appropriate term 316 to which each process relates. For example, this allows historical mission/vision statements to be maintained even as new ones are developed. The current user is also provided with a respective icon 317 that is associated with each process that indicates that user's access privileges for the particular process.

Figure 3C:
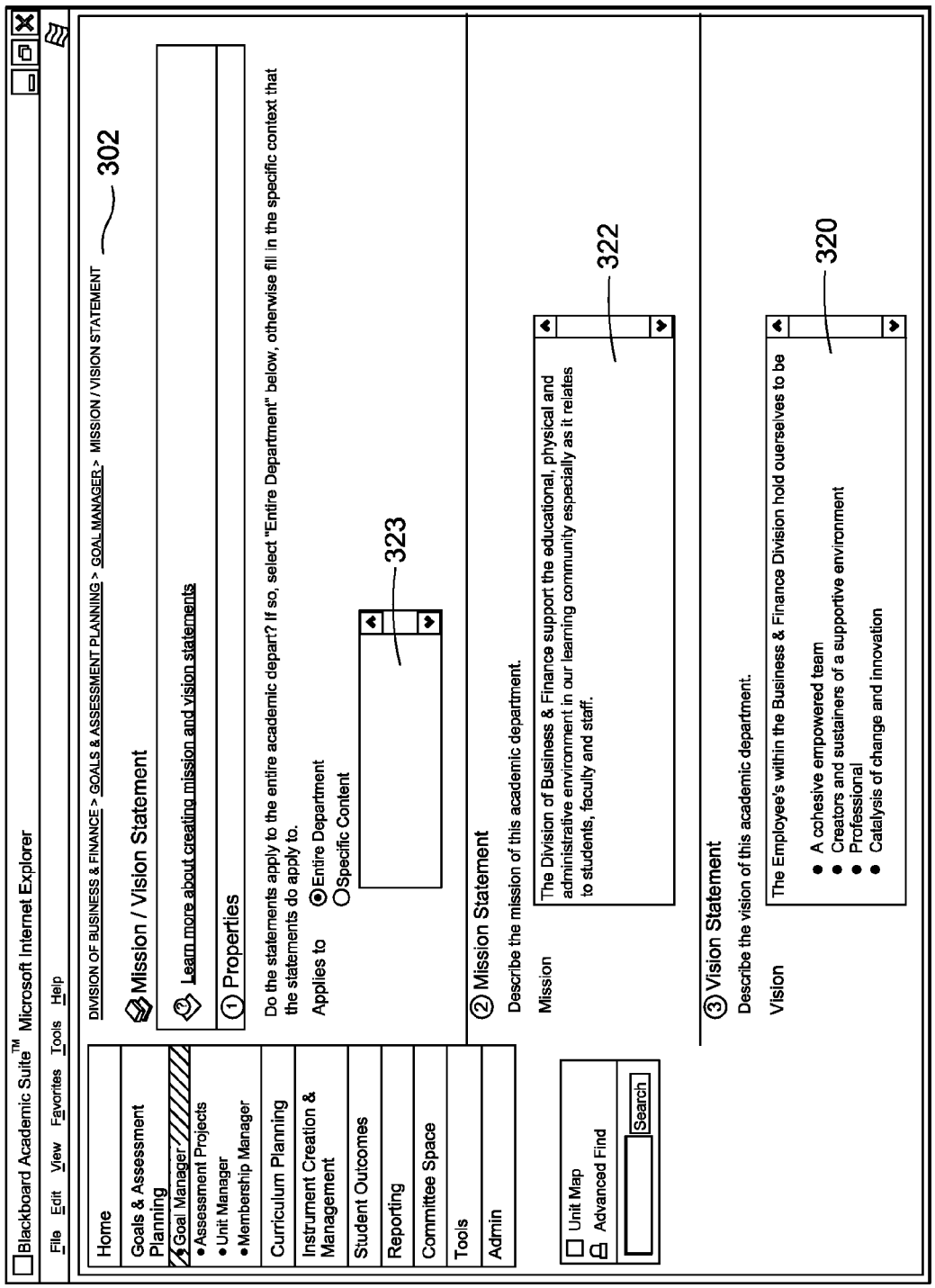

From the list 318, a user may choose to define or edit a mission/vision statement for the operating unit or program. As seen in FIG. 3C, the user is presented in the area labeled "1 Properties" with a mechanism for specifying whether the statement applies to the entire academic department or some specific context (e.g., program, resource center, etc.) within the department. The text box 323 allows the user to enter the specific context if appropriate. This box 323 may also be populated with predetermined contexts from which the user can select as well. The term "department" is used generically and can apply in general to whatever level operating unit the user has selected. In this example, the title bar 302 indicates that the "department" is the "Division of Business & Finance".

The text box 322 allows the user to enter the language of the mission statement. In this instance, the vision statement is something different than the mission statement and so a separate text box 320 allows the user to enter the vision statement for the department. Once the mission and vision statements are created, the goals for the department can be defined using an interface such as the one shown in FIG. 3D.

This interface screen provides a list of the department goals that includes a label 324 for each goal and a portion of the text 326 of each goal. To add a new goal, an "Add" button 325 is provided. Although not shown, the add process would typically include defining a label for the new goal, a textual description of the goal, and some additional meta-data such as its priority, a category identifier, a keyword (to assist with searching or customized reports), and an identifier of related goal or objectives. These additional meta-data may also be included in the list via a user-controlled selection process 327. In many instances, entering the mission and vision statements for the department, as well as the goals, may already have been performed and the user may bypass such steps and move directly to defining a new assessment project.

Figure 3E:
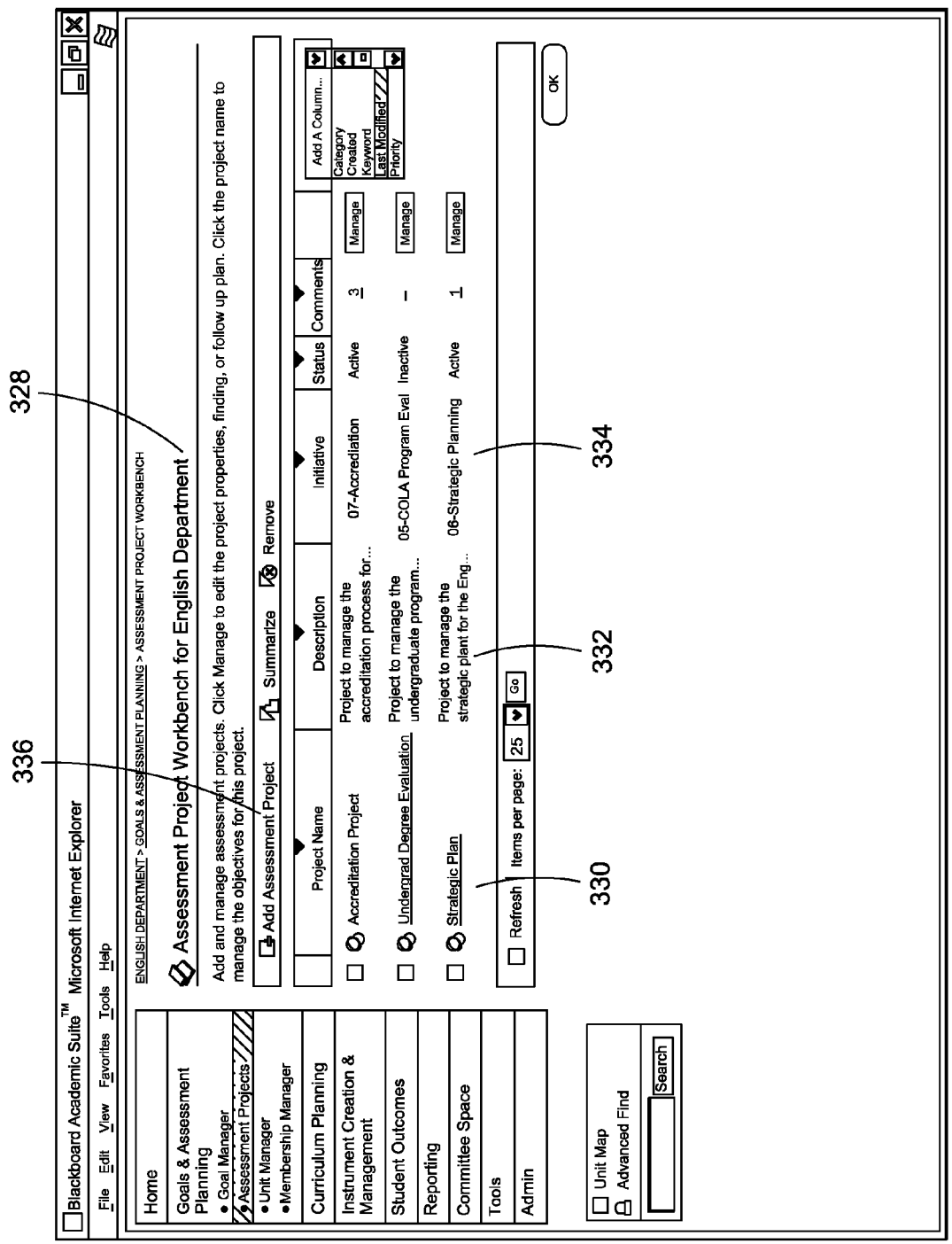

The screen of FIG. 3E includes a title bar 328 indicating to the user that the screen pertains to assessment projects of the English Department. The list of currently defined assessment projects can include a identification of the project 330, its description 332, the name of the initiative to which it relates 334, as well as other meta-data. However, some of these columns may be eliminated as well. By selecting a project name 330, the user can open that assessment project and read or edit the particular data pertaining to that assessment project (assuming they have the proper access privileges). Also, using the "Add" button 336, a user can begin the process of defining a new assessment project. The defining of a new assessment project may take place as described above with the use of templates to assist in the process.

Figure 3F:
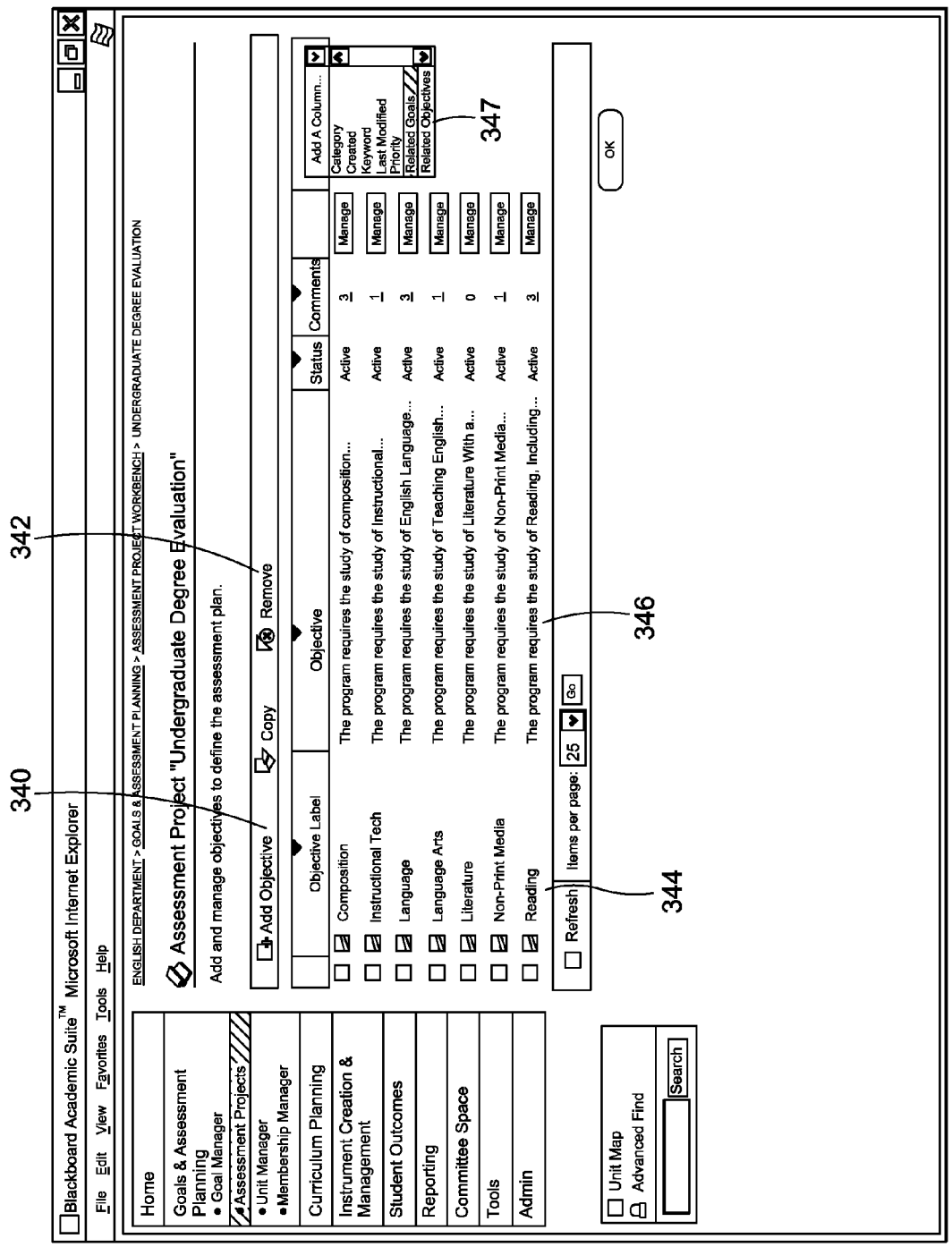

FIG. 3F depicts a partially defined assessment project related to "undergraduate Degree Evaluation". In this window, the user is presented with the already defined objectives for the project. For example, a list of objective labels 344 and associated descriptive text 346 are shown. Furthermore, the selection window 347 allows a user to add additional columns to the depicted list. Particular objectives may be added or removed from the list by use of the "Add" button 340 and the "Remove" button 342.

Figure 3G:
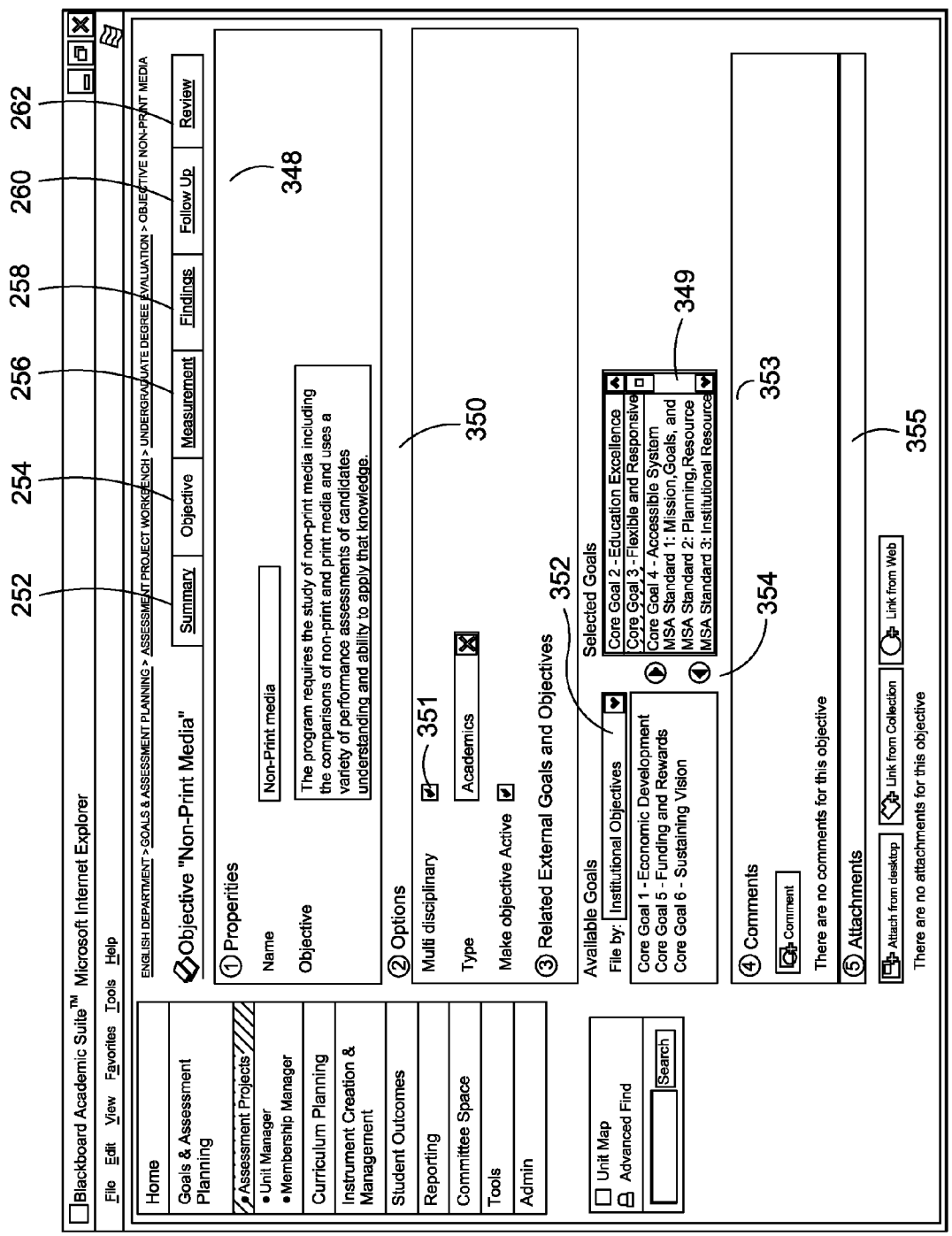

There are many possible customizable attributes or meta-data that can be associated with an objective within an assessment project; these attributes are defined in the various templates for an Objective from (see FIG. 2B). The interface screen of FIG. 3G depicts some exemplary attributes for an objective. This particular objective is labeled "Non-Print Media" and relates to the study and comparison of non-print media. In the "Properties" area 348, a label and a description of the objective is entered by the user. The description explains the purpose of the objective. The "options" area 350 allows the user to specify other attributes about the objective. Such as whether it is an academic objective rather than an administrative objective. This particular interface screen is related to the template 250 of FIG. 2B in that the screen, or web page, is presented to a user with a number of forms to be completed in which each form is defined within the template Thus, the web page displays the objective form 254 and by selecting different tabs, the user can select different forms 256-262 to complete or edit. In other words, an Assessment Project template may be thought of as a complete process (e.g., summary, objective, measurement, findings, follow-up, review) accomplished with a set of interrelated forms.

The alignment of objectives with other goals and objectives is one advantageous benefit of the present system. The selection box 352 allows the user to select various available objectives and goals that have been defined. For example, departmental goals, institutional goals, and other operating unit goals and objectives can all be selected using the drop down box 352. Once the particular level of goals is selected, the specific goals can be selected using the arrow button 354. The selected goals and objectives are shown in the box 349. This process allows the user to identify other goals, objectives, or standards are aligned with the present objective being defined. Thus, an association can be created between the goals of any of the different hierarchical levels of operating units defined within the assessment project and a newly defined objective. One result is that a user at the institutional level (or some other level) can identify which lower level objectives relate to which of the strategic goals and objectives of the institution. In general, the result is that associations or alignments may be accomplished between goals and objectives of higher, lower, and parallel hierarchical levels within the organization or institution.

Within the window 349, an external standard is shown as one of the selected goals. External standards are not necessarily defined by the institution but may be defined by a regulatory body or other third party such as an accreditation council. In such a case, the drop down selection window 352 would also allow the user to select from among available external standards and have the standard's goals listed for possible selection. These standards may change over time and, therefore, can be imported into predetermined storage locations so that the interface screen of FIG. 3G can populate the selection windows with the latest information as it is provided by the standard's authors.

Other areas 353, 355 of the interface screen allow the user to provide comments or attachments that are related to the objective. Such areas 353, 355 may be particularly helpful when the objective is being reviewed by a committee or other party.

Operating Units

Figure 3H:
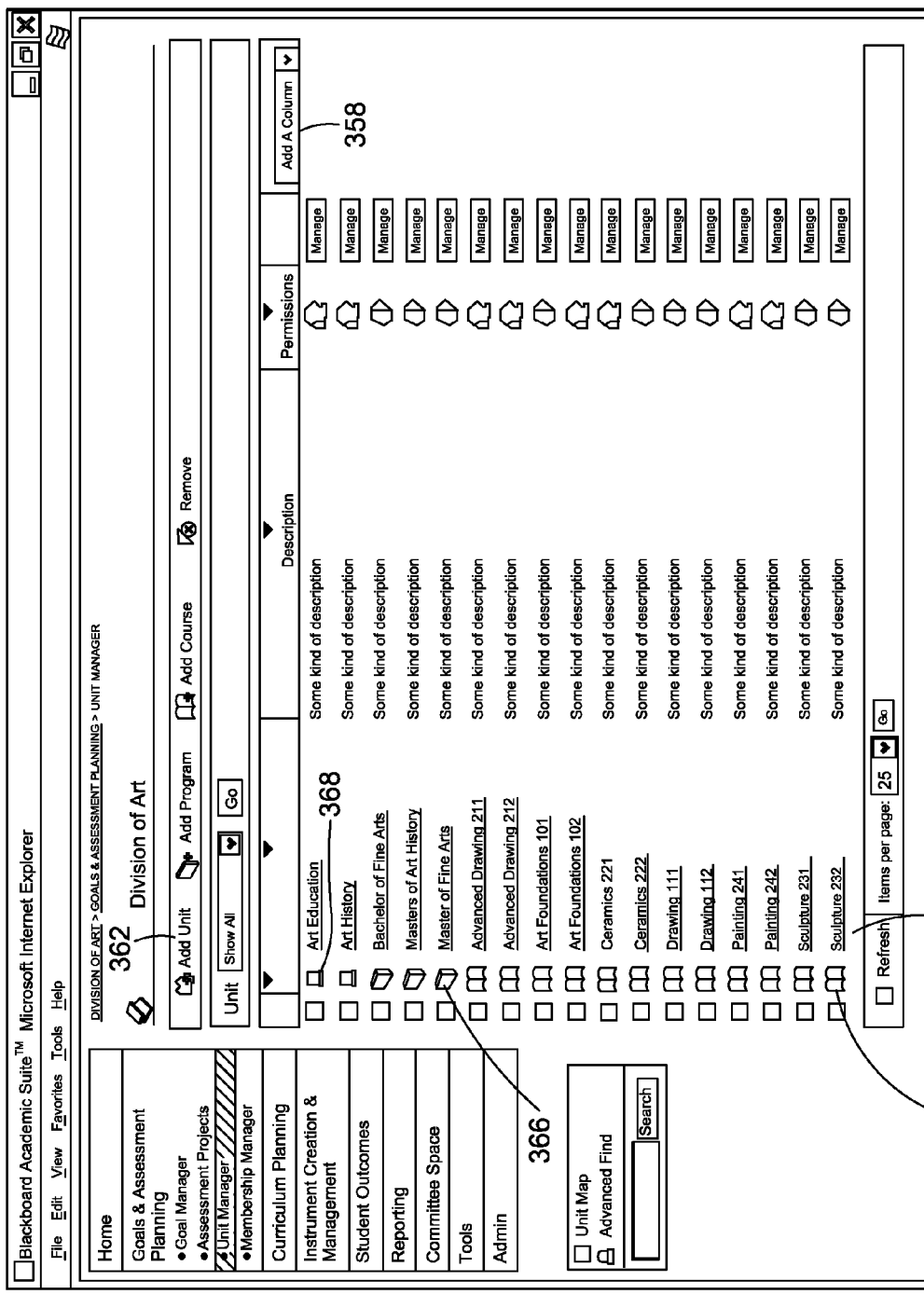

The above-described defining of goals, assessment projects, and objectives relies on the defining of operating units. The present system and methods provide techniques for defining operating units in a flexible manner that allows an institution to model whatever its organizational hierarchy structure looks like. The interface screen of FIG. 3H depicts one exemplary method for a user to define operating units, programs, and courses within the "Division of Art". Using such an interface allows campuses, colleges, departments, and sub-departments to define their own hierarchy.

The screen of FIG. 3H presents a list of available, or defined, units, programs, courses, and sections 360 that exist for the Division of Art. Optionally, visual cues such as icons 364, 366, 368, may be provided so that the user can determine whether an item in the list is a course, a program or a unit. From the tool bar 362, a user can elect to add a "unit", a "program" or a "course" at the particular hierarchical position (e.g., Division of Art). To move to a different level, the user would select an appropriate choice from the lists of units that are presented. Further details of these items are described later.

Figure 3I:
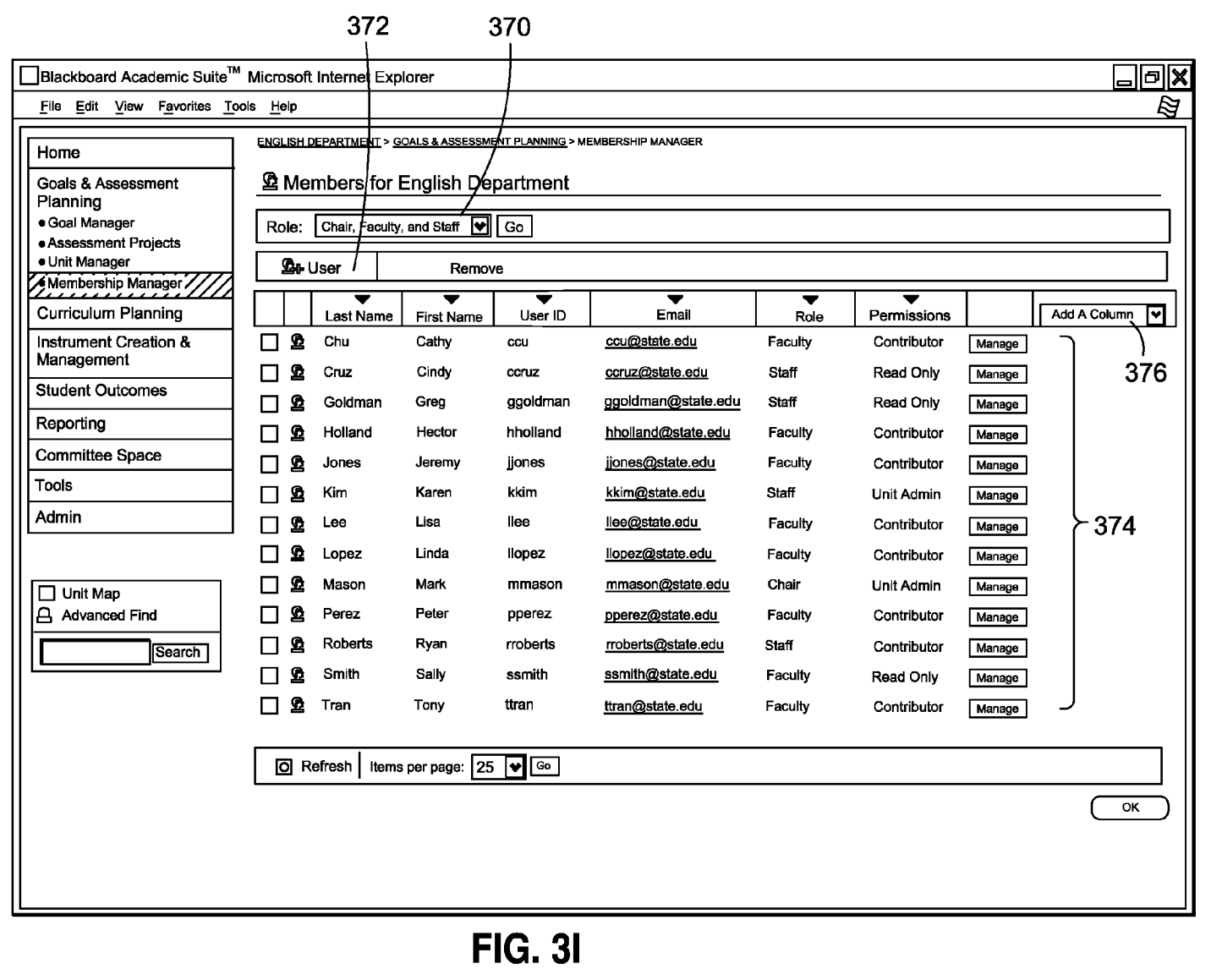

The identification and assignment of roles to different users is important to determining the access privileges to various data resources previously described. The screen of FIG. 3I depicts one exemplary way to manage users within a department. For example, the "user" button 372 allows a user to elect to add a new user to the department. In this process, information about the user would be provided. Such information can include, for example, name, email address, user ID, role, access privileges, etc. Additional columns can be used as well via a user-selection process such as window 376.

The screen of FIG. 3I shows a list 374 of existing users and their associated meta-data. This list 374 can be manipulated so that all users can be listed or only certain, selected users can be listed. Thus, using the drop-down window 370, a user can elect to display within the list 374 only those users satisfying a particular role.

Curriculum Planning and Mapping

The previously described interface screens relate to the general category of goals and assessment planning for an operating unit. Such planning usually takes place at the relatively higher layers of the institution and relate to the strategic goals and objectives of the institution. As shown, however, lower-level operating units can define objectives and goals as well. Finally, at the lowest hierarchical levels, the objectives which are defined relate back, or are aligned to, the previously defined goals. At a higher education institution, for example, the levels can be categorized as institutional level, program level, and classroom level. For example, within a program, a number of courses or sections may defined that are designed to satisfy the objectives of the program, the department and the institution. The following figures in FIGS. 4A-4C depict exemplary techniques for curriculum planning within a program.

Retuning quickly, to FIG. 3H, a user is presented a list with a number of courses. From this list, a particular course can be selected for further definition. FIG. 4A depicts a user interface screen that allows a user to define course-specific objectives for a course or course section within a program. Examples of a course objective, may include such items as critical thinking, on-line research, portrait drawing, etc. The left set of tabs 400 identify for the user that the general functionality relates to curriculum planning and, more particularly, to defining section objectives.

Figure 4A:
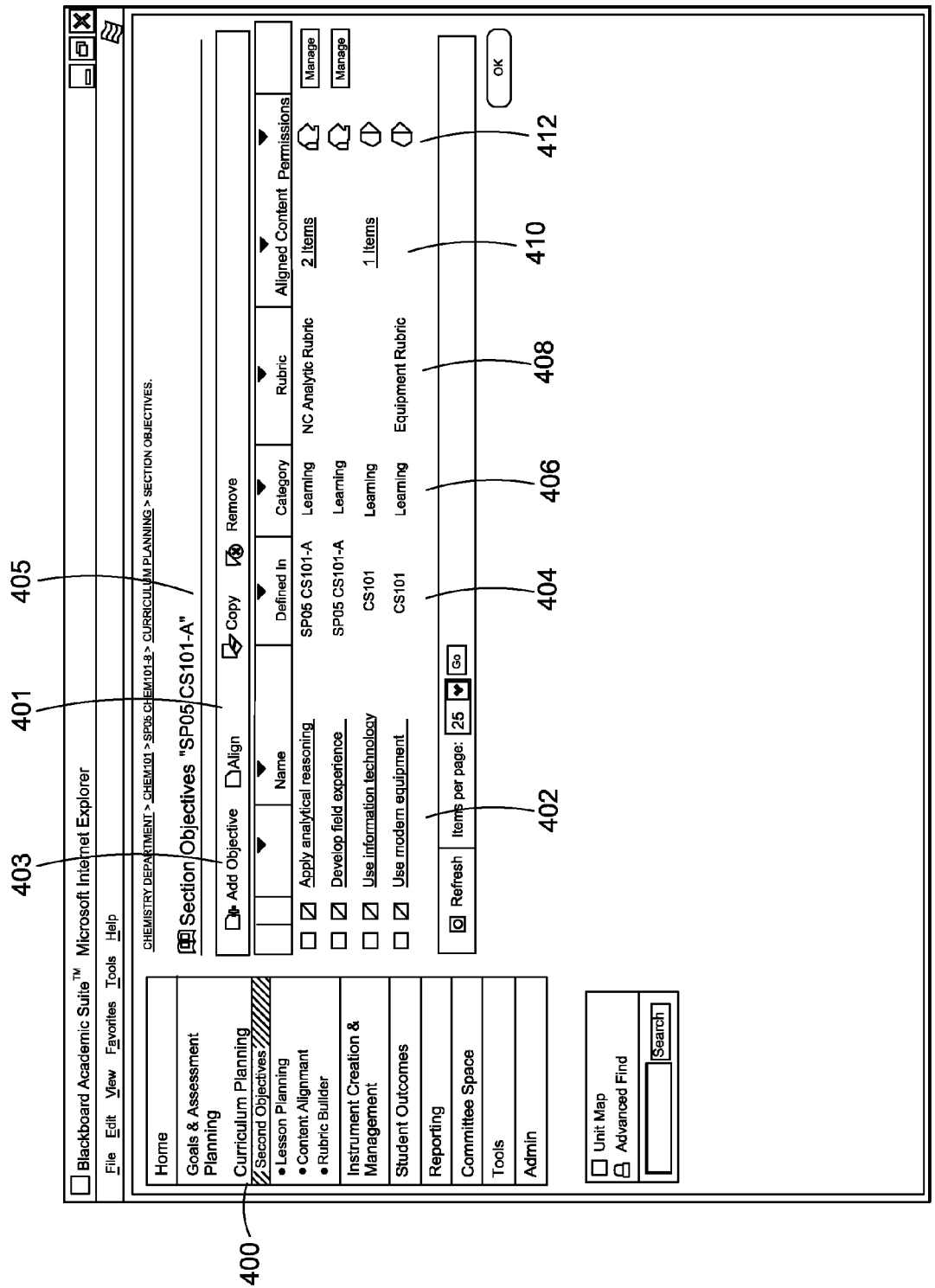

The interface screen of FIG. 4A includes a table that lists the already-defined objectives of this course 405. The attributes which are defined for a course may include, but are not limited to, an objective name 402, the location of its definition 404, the category of the objective 406, the rubric 408, by which the objective is measured and user access privileges for each objective. There is also a column 410 that indicates how many content items have been aligned to the particular objective of that row. Thus, when the user elects to add an objective, using the button 403, a definition screen is presented to the user that allows the user to enter information relating to these attributes. For example, a form can be presented to the user with these fields 402, 404, 406, 408, 410, 412 (or other fields as defined by the associated template) and the user can enter data or select from pre-populated data in order to define the objective. Other attributes (not shown) may include a textual description of the objective, a summary of the objective, and key-words related to the concept of the objective.

The "definition" attribute 404 allows a course objective to be defined in an efficient manner. For example, a particular objective may be defined for a course (e.g., CS101) that will also be an objective for every section of that course irrespective of the specific instructor for the section. When the section-specific objectives are defined for a section, there is no need to re-define the particular course objective but rather simply select it from all the available objectives presented on a template during the definition process. In addition, a default, or pre-selected, objective may be presented to the user as well. By selecting an already defined objective, all the attributes can be re-used and, optionally, changed by the user if desired. This functionality also allows objectives defined for one course to be selected for inclusion in an entirely different course without repeating the entire objective definition process.

An objective may be aligned with any previously defined objective or goal regardless of the operating unit in which that objective or goal was defined (for example, see FIG. 3G and the description accompanying that figure). For example, a goal at one operating unit may be aligned with an objective at an immediately lower-level operating unit which, itself, is aligned with an objective of an even lower-level operating unit. When defining a course objective, the goals and objectives to which it is aligned can be identified in a number of ways. A course objective may, for example, be aligned with a program objective which itself is aligned with an institutional or department-level objective or goal. In this way, there is a linking between goal an objectives from different hierarchical levels of operating units. In one example, course content may be aligned with a course objective which itself is aligned with a program objective. In this way, the course content is indirectly aligned with program objectives (and possibly even higher-level goals and objectives). Because goals and objectives may change over time, the "align" button 401 is provided to allow a user to update the alignment information of an objective even after it has been initially defined.

The rubric attribute 408 identifies the rubric used to measure the findings related to the objective. The present system includes functionality for building rubrics related to course objectives and for other uses within an assessment project. One of ordinary skill will recognize that a variety of techniques and methods can be used to identify the subject matter of the rubric and arrange and define its structure. Once created, these rubrics are managed and stored by the present system to be available for various uses in their respective operating units. Also, assuming proper access privileges are defined, rubrics may be shared between different operating units and assessment projects as well. The rubrics may be general in nature such as a "writing assignment" rubric that can be applied to any writing assignments. The objectives for a particular writing assignment may include, for example, "utilize research material" and "critical thinking". The rubric used will have a result that measures attainment of these objectives.

Another level of assessment planning that can occur is at the lesson level. In other words, the lessons are identified within a course and aligned with the course or section objectives. Thus, FIG. 4B depicts an interface screen that relates to lesson planning within a course. Within a course (e.g., Intro to Graphic design) 416, a user can define a number of lesson plans that are meant to achieve the course objectives identified earlier. The table of FIG. 4B depicts a number of already-defined lesson plans and includes attributes of each lesson plan such as its name 418, where it is defined 420, the number of student resources, 422, number of faculty resources 424, the number of associated assessments 426, and access privileges 428. Additional attributes may be added and some of the attributes deleted from the table of FIG. 4B without departing from the scope of the present invention. Similar to methods described earlier, the user can elect to add a new lesson plan (using the button 417) and be provided a template appropriate for its creation. In particular, the user can be offered a template that allows the user to identify the attributes shown in the table of FIG. 4B as well as the course objectives to which the lesson plan aligns. During creation of a lesson plan, the user can specify such attributes as where, if at all, the lesson plan may already be defined, the number of course resources (e.g., books, papers, digital files, etc.) that are used within the lesson plan and the number of faculty resources used.

Within the definition of a lesson plan, there can also be the identification of the number, names, and types of assessments that are included. These assessments can include tests, quizzes, papers, collaborative assignments, on-line surveys, etc.

Once the course objectives and the lesson plans have been defined, a variety of curriculum planning and curriculum mapping investigations can be performed. Returning briefly to FIG. 4A, the column 410 identifies a number of curriculum items or content for a course have been aligned to a particular objective of that course. Turning now to FIG. 4C, one example of a curriculum-related report about a operating unit is depicted. In this report, a list of the courses 430 offered by an operating unit (e.g., English Department) is shown. This list also includes an indication 432 of the type of curriculum activities within the course aligned with various objectives and goals. Thus, the columns of the list identify the activities within a course such as tests, collaboration, discussion threads, assignments, collections, etc. For each course in the list 430, the corresponding number of aligned items of each type are identified under each activity type. Thus, the report summarizes what types of activities in each course are aligned with various objectives. By selecting one of the displayed numbers 433, the user can be presented with a detailed list of exactly which objectives with which that particular activity is aligned. The identified objectives may be limited to merely course objectives but may also include objectives and goals from all levels (e.g., higher, lower, and parallel.)

Figure 4D:
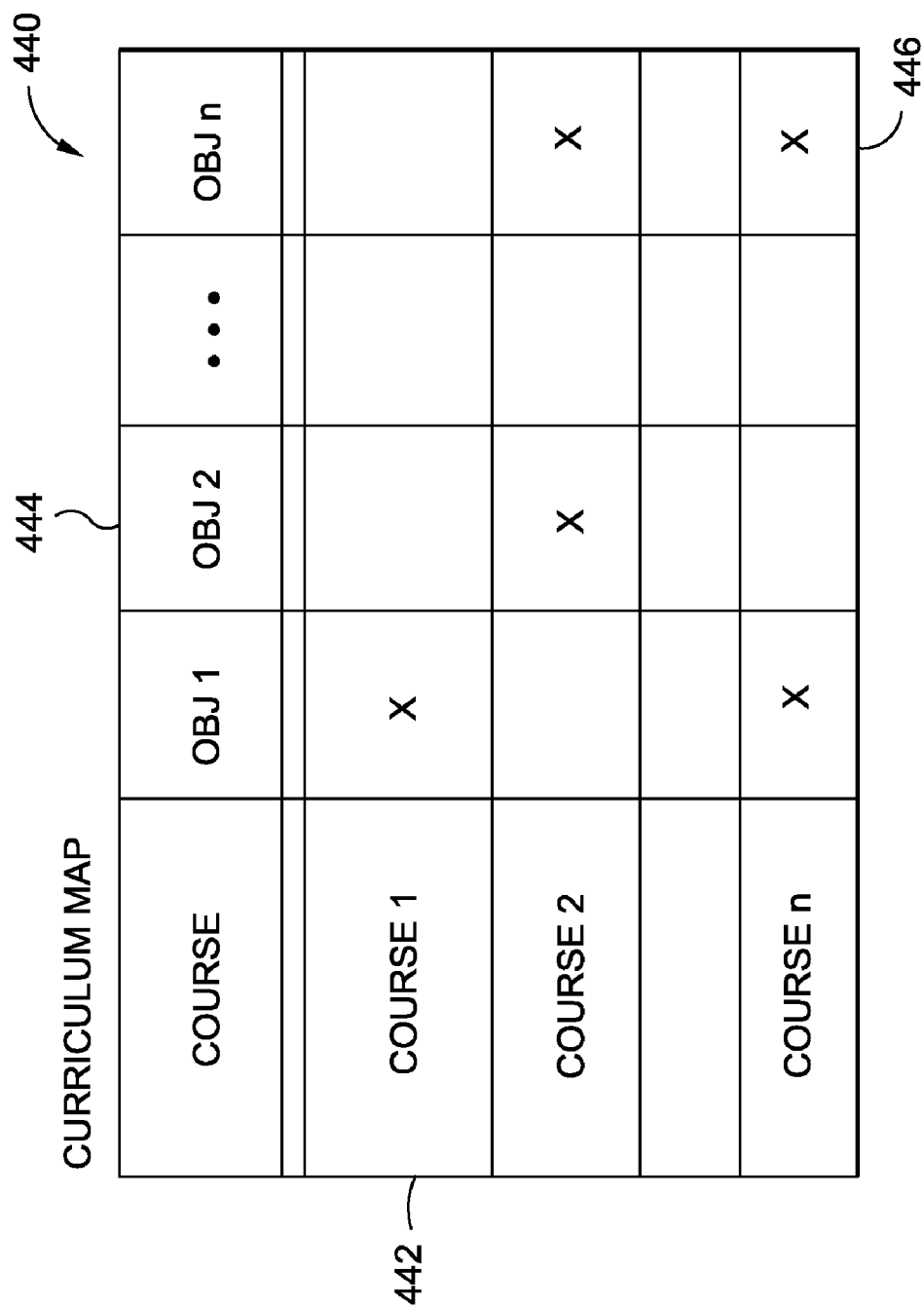
FIG. 4D illustrates an exemplary curriculum map indicating the alignment between courses and objectives.

More advanced curriculum planning and mapping may be performed as well using the information that the user has entered about goals, objectives, courses and lessons. For example, FIG. 4D depicts an exemplary curriculum map 440 that graphically displays a mapping of program objectives to course offerings. Each column 444 of the table 440 relates to a particular program objective and each row 442 relates to a course within the program. The cells of the table include an indicator 446 of whether or not a particular course is aligned with a particular program objective. The indicator 446 may be a binary indicator (e.g., "yes" or "no") or may be multi-valued. Alternative measures can be the level at which the objective is met (e.g., introduction, re-enforcement, mastery, etc). Thus, a user can quickly realize which objectives may not have many courses aligned therewith or where there is a high-degree of redundancy. As a result, curriculum planning decision can be made about what new courses might be added and what their content should be. The objectives just described have been identified as "program" objectives merely as a practical example. However, one of ordinary skill will recognize that these objectives may also be goals and objectives from higher, lower, and parallel levels in the institution hierarchy.

Another possible curriculum mapping function can include a different view of courses and aligned objectives. For example, an operating unit that "owns" a course (e.g., the Computer Science Department) can use the information described above to identify all other units that have aligned program objectives to that course. Thus, the curriculum plan can be viewed from both a top-down approach as well as a bottom-up approach. Potential for new courses or changes to existing courses within a program can be determined by identifying which goals and objectives are being ignored by the offerings within a program. Furthermore, within the courses themselves, lesson plans can be modified or augmented to more closely align with the course objectives (which indirectly align to the other levels of the hierarchy). From the top level of the institution, evidence can be automatically gathered from across the various operating units of how the institution's goals and objectives are being met. This evidence is collected automatically, systematically, and objectively during the performance of the assessment projects and is readily available for internal evaluation by the institution as well as by external accreditation boards.

Instrument Creation and Management

Figure 5A:
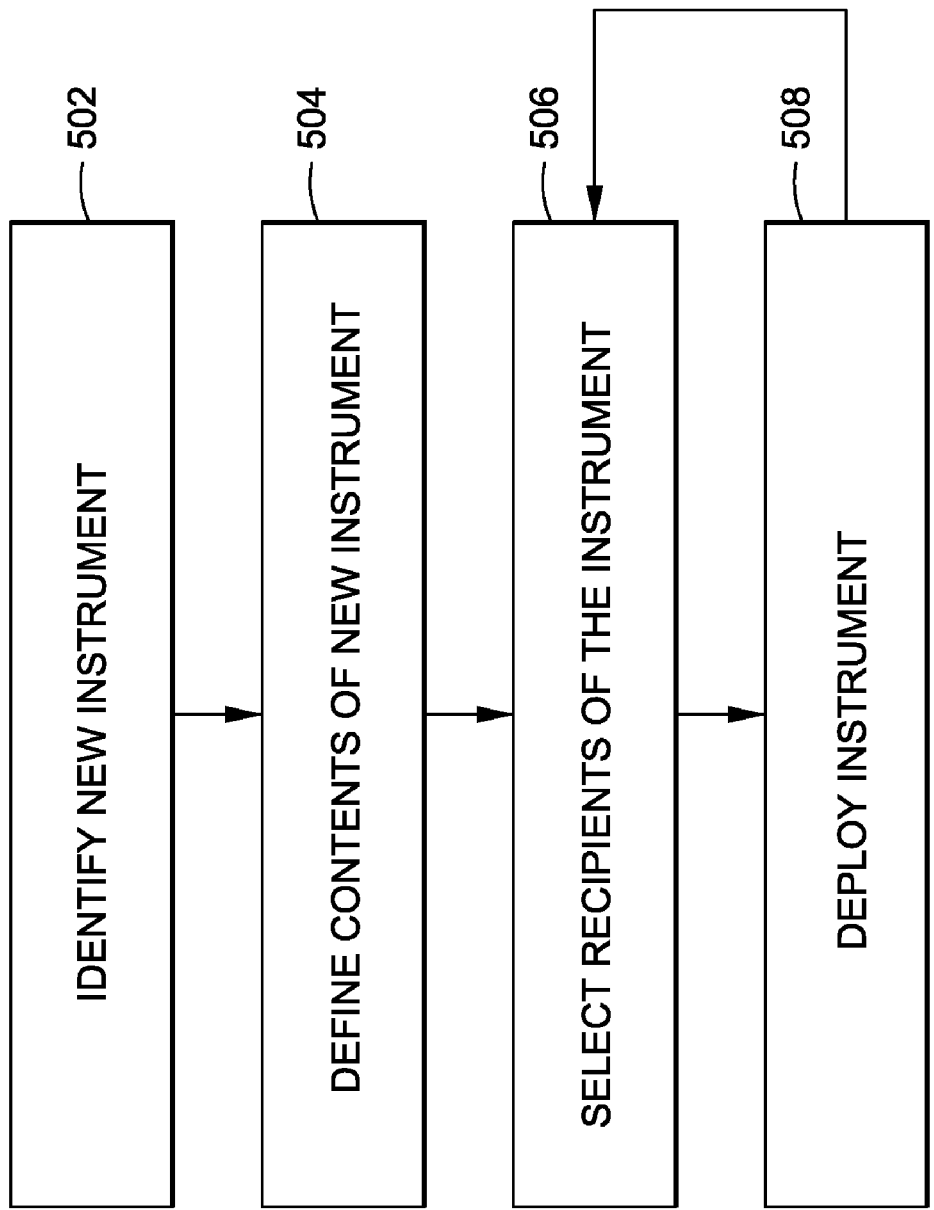
FIG. 5A depicts a flowchart of an exemplary method for selective deployment of instruments in an assessment management system in accordance with the principles of the present invention.

FIG. 5A depicts a flowchart of an exemplary method for deploying instruments within the assessment system 102 described herein in accordance with the principles of the present invention. In general, an instrument is a data collection tool that can include, for example, surveys, quizzes, portfolios, assignments, assignment binders, papers, tests. These instruments are used to collect data that is used for various purposes within an assessment project. Some data may have rubrics applied to it, other data may be used to measure achievement of a goal or objective, and other data may be used to quantify values being assessed within the project. For purposes of explaining FIG. 5A, the specific example of a test as the instrument will be used without an intent to limit instruments to only tests.

In step 502, a user identifies a new test instrument through the user interface. This is typically performed by making a selection to create a new test or to edit an existing test. The user continues, in step 504, by defining the contents of the test, or instrument, itself. Because of the hierarchical arrangement of some of the operating units within the present system, it is advantageous that a test can incorporate default information required by a department or the institution. For example, every test may require the student to sign a "honor" clause or to answer certain demographic information. Thus, when a new test is defined, it will automatically include such information. In the example where the instrument is a survey, the institution may have certain required questions and each department may have its own auxiliary questions. Thus, the starting "canvas" for a survey instrument may initially have a variety of default questions depending on the unit under which the instrument is created.

In step 506, the recipient list for the instrument is selected. This list may be generated based on data about user, units or courses. The list might be generated dynamically at the time of deployment or have been generated previously and saved as a static list. For example, the recipient list may be defined as all 400-level sections taught by a tenured professor. If generated dynamically, that list would show all 400-level sections taught by a tenured professor at the time of deployment, therefore the dynamically generated list might be different when used the Fall of 2006 and the Fall of 2007, as the sections taught by tenured faculty will have changed. However, if generated statically in the Fall of 2006, it will store all 400-level sections taught by a tenured professor at the time of the list creation. That list would be the same in Fall of 2007 as it was in Fall of 2006, because it represents a static view of the data as it was at the time of list-generation. Furthermore, an instrument may be copied and then modified such that the modified copy is deployed to an earlier population or a different population altogether. Accordingly, both the original instrument and the changed copy are available for deployment in the future.

Deployment of an instrument can occur in a variety of ways, some of which rely on the academic system 116 of FIG. 1, in particular, the community system portion of the academic system 116. As mentioned briefly, and described in more detail in the incorporated patent application, the academic system and community system include a virtual space that each student may visit to send and receive information and deployment of an instrument is often accomplished within this environment. In one particular implementation, the academic system may include logical components such as a learning system, a content system, and a transaction system such as those offered commercially by the present Assignee. Typically, there is a home page that a user is presented after logging in to the academic system 116. From the home page, the user can navigate to a "My Courses" area, an "E-Mail" area, a "Financial" area, etc. and from the "My Courses" area, the user can open respective windows specific to each course in which the student is enrolled. Thus, deployment of an instrument can entail sending an executable web module that displays on the student's home page or within the appropriate course area. The deployment could also be accomplished through a simple HTML link, or an e-mail message. The deployment (for example, in the case of employer surveys of recent graduates) may also include sending information to parties external to both the assessment system 102 and the academic system 116. Advantageously, the instrument can be deployed in more than a single media (e.g., off-line via bubble sheets) as well depending on the recipients preferences or some other setting within the assessment system 102.

Figure 5B:
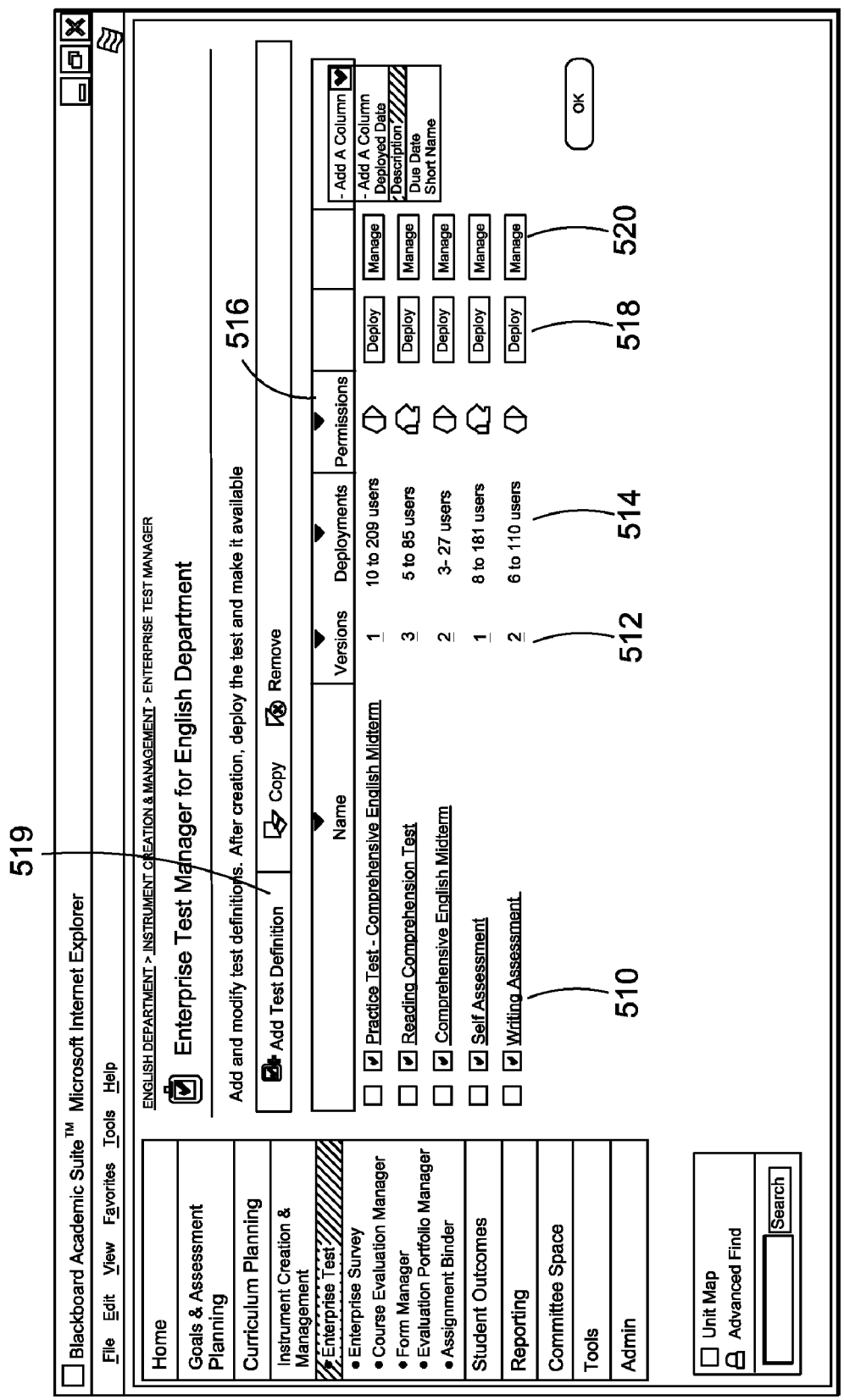

FIG. 5B depicts a screenshot of a user interface for defining test instruments for an English department. The exemplary attributes of the instrument that are explicitly shown include the instrument name 510, the number of available versions 512, information about previous deployments 514, and access privileges 516. Other attributes may include the deployed date, the due date, and a textual description of the instrument. Each instrument has a selection link that allows the user to select the instrument for further action (e.g., remove) and a "Manage" button 520 for editing and management. Additionally, there is a "deploy" button for when the user wants to actually deploy a previously defined instrument. If multiple versions of an instrument are available, the "deploy" button may cause an intermediary window to inquire of the user as to which version to deploy. As part of the deployment, the user is presented with an interface screen (not shown) that allows selection of the desired recipients.

Adding a new test instrument is initiated by selecting the "Add" button 519. Doing so causes a new test creation page to be presented to the user for modification and editing. From this from a user can define such items as the questions of the test, how it is scored, the instructions for completing the test, and similar test characteristics.

Figure 5C:
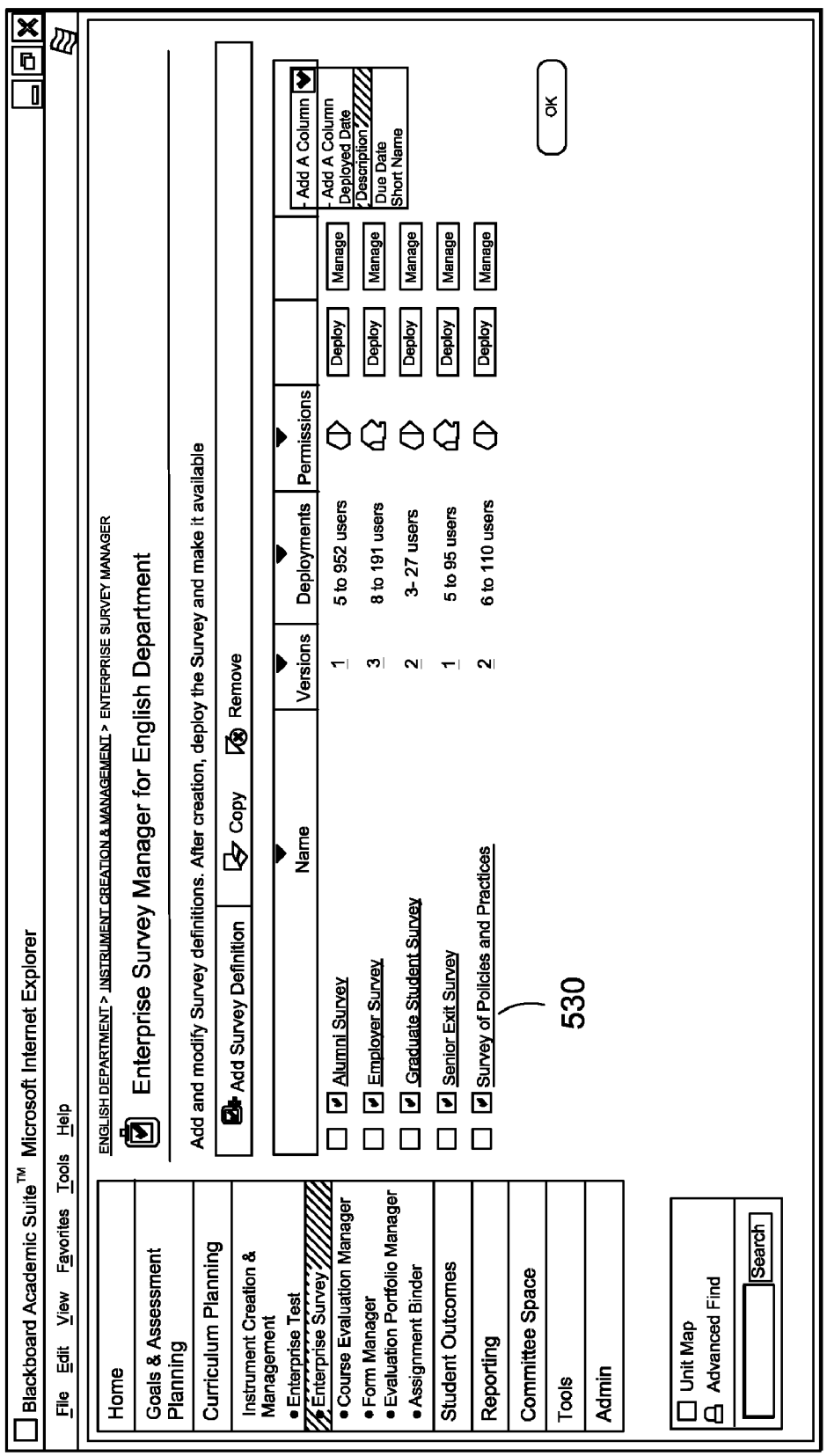
Figure 5D:
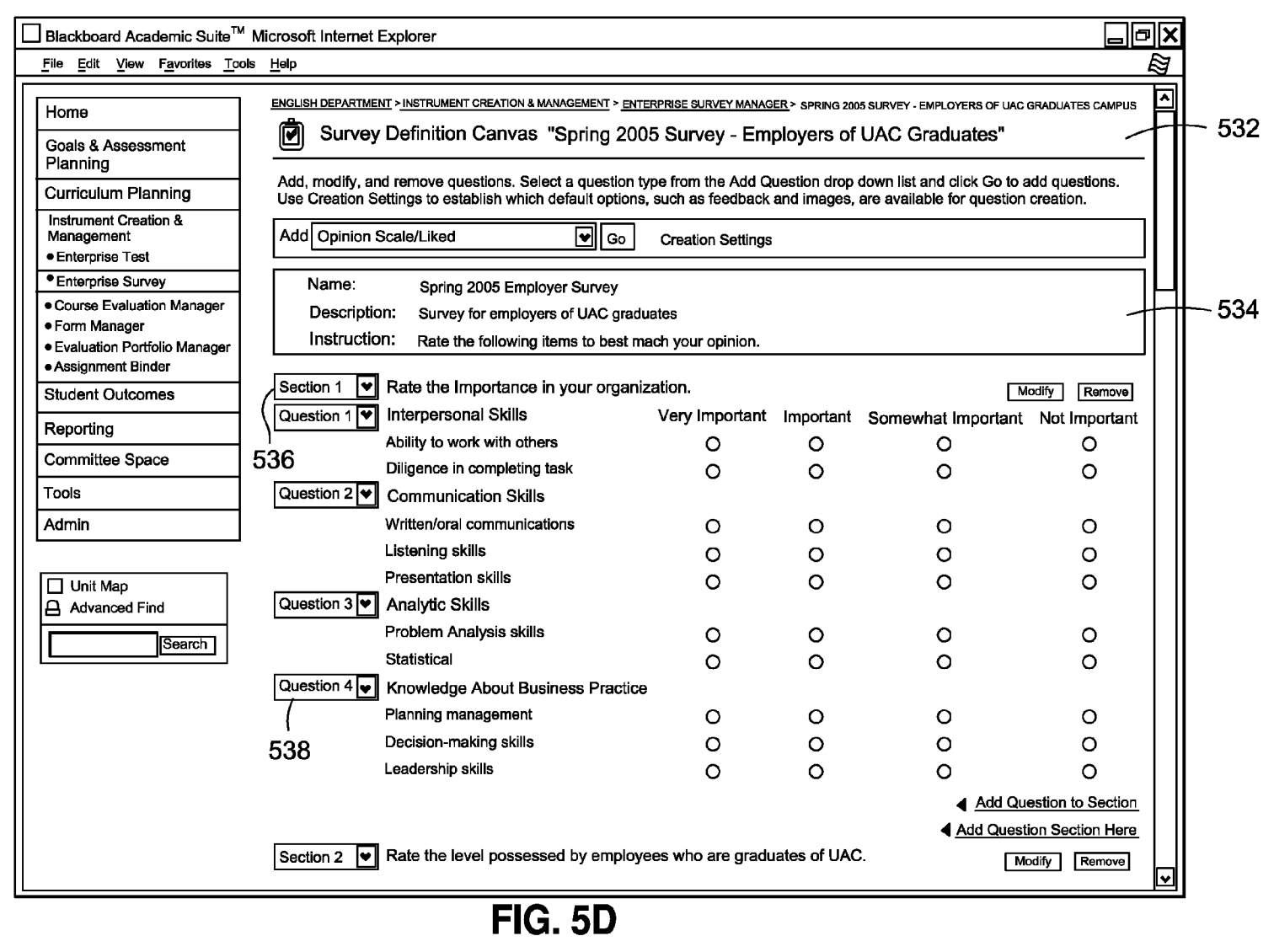

FIG. 5C is similar to FIG. 5B except that the items in column 530 refer to survey instruments rather than test instruments. FIG. 5D depicts an exemplary form defining a survey instrument that might be offered to a user when that user elects to define a new survey. For example, the form identifies the survey name 532 and includes a brief summary area 534 about the survey itself. The particular example of FIG. 5D includes a technique 536 for breaking the survey into sections in which different questions 538 can be entered. As shown, the questions can be relatively complex with multiple scoring criteria. The depicted survey form is exemplary in nature and one of ordinary skill will recognize that many other types and forms of questions may be used without departing from the scope of the present invention.

Figure 5E:
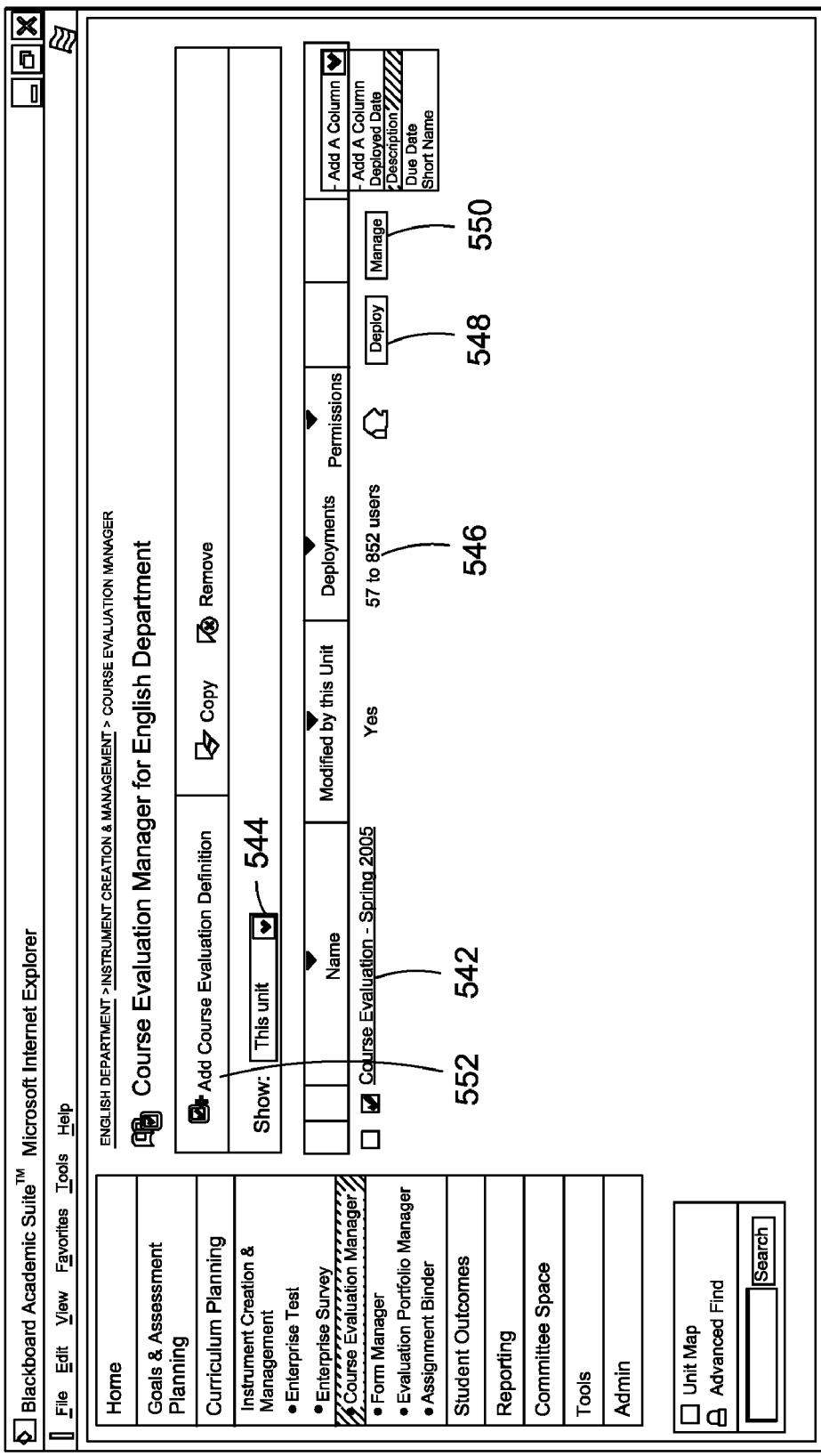

The present assessment system 102 also provides, via its user interface, methods for managing course evaluation instruments for a particular operating unit. For example, the interface screen 540 of FIG. 5E provides a list 542 of course evaluations available to the English Department. The displayed list of available evaluations can be modified by selecting the appropriate level of detail from the window 544. Thus, a user may select (if access privileges allow) evaluations from other units and even from higher-level operating units. From within the management screen 540, the user can select options to manage 550 the evaluation or to deploy 548 the evaluation. Because multiple deployments of the same evaluation are possible, the screen 540 includes deployment statistics 546 about this particular evaluation.

Figure 5F:
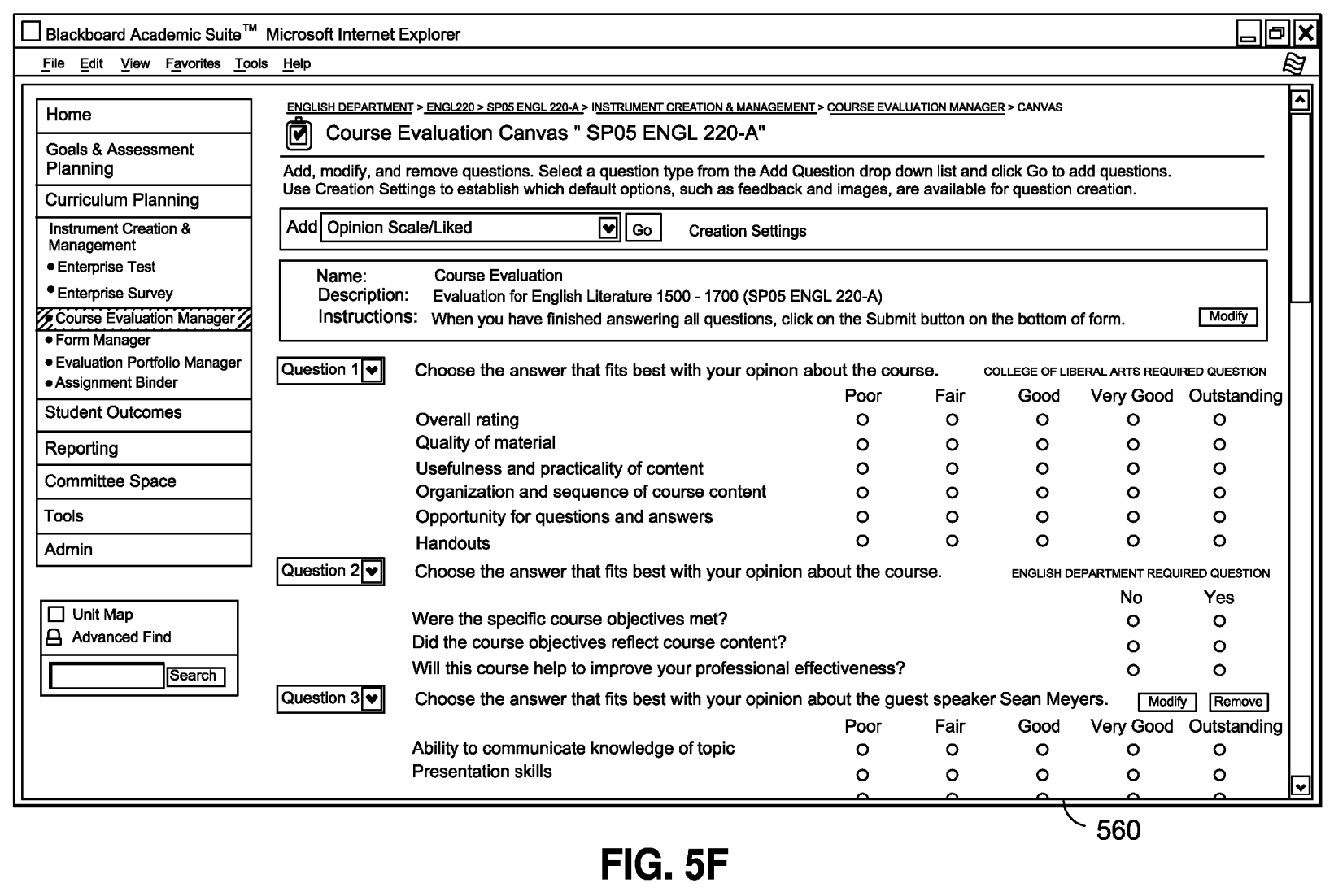

The user can elect to create a new course evaluation by selecting the "Add" button 552. Similar to techniques already described, an appropriate authoring form is provided to the user in order to define the new evaluation. An exemplary authoring form is depicted in the interface screen 560 of FIG. 5F. The authorship of an evaluation can be distributed among various authors because some questions may be from the institution, others may be from the department, still others may be from the program, some may be course specific and still others may be instructor specific. As explained earlier, the selection of recipients of an instrument (e.g., an evaluation) can be based on user demographic information, course attribute information, or a combination of both. Additionally, course evaluations may be delivered such that a recipient is presented with an aggregation of questions that is determined dynamically by the recipient's context (e.g., institution, college, department, course, section, sex, ethnicity, residence status, etc.).

Figure 5G:
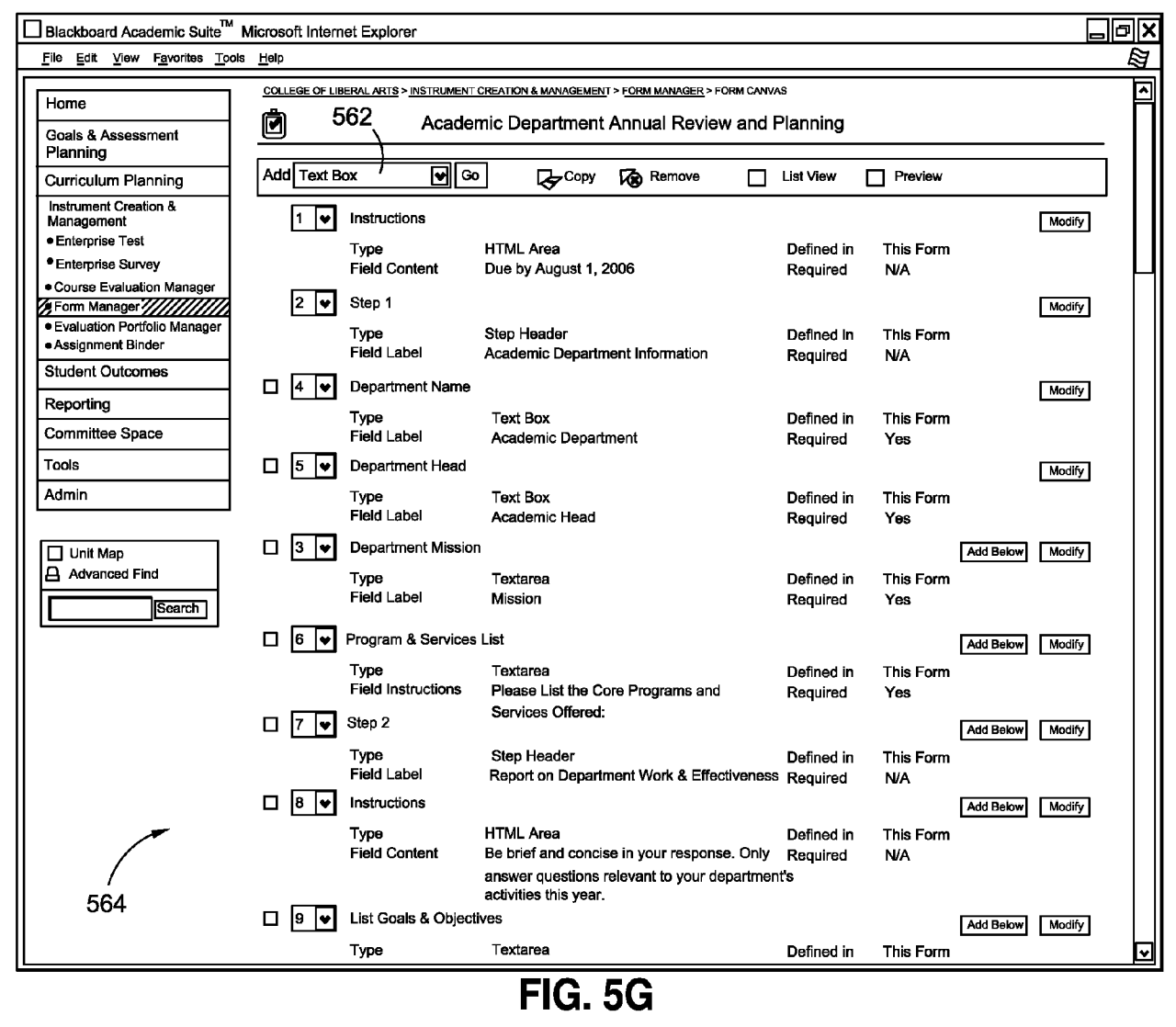

Because the assessment system 102 already includes a variety of information and data that is typically used to perform questionnaire functions within the institution, a questionnaire manager may be provided that defines standard questionnaires and their contents. Thus, when a user desires to generate a questionnaire, it can be initially created within the assessment system 102 using the templates maintained by the questionnaire manager. The benefits of such a system include the advantageous result that a department, for example, will receive similarly formatted reports and content from each of its separate programs. The exemplary interface screen of FIG. 5G depicts a questionnaire generator that provides a selection window 562 that permits a user to define new fields of the questionnaire. When a new field is added, then its label, instructions and other attributes can be defined as well. The screen view of FIG. 5G shows a list 564 of all the defined fields for the current questionnaire. A preview mode (not shown) is available to show how the questionnaire layout looks for presentation to a user.

One of ordinary skill will recognize that there are similarities between a survey and other instruments for collecting data. Unlike a survey, some data collection instruments are not delivered to a specific set of users and may be open for anyone to complete. For example, a satisfaction survey would be sent to a specific set of users typically all at the same time and users would only be able to submit once. However, a curriculum change request form would be available for a user to complete at any time, as determined by the user's need to request a change in the curriculum (e.g., a faculty requesting a new course be added to the curriculum), and the user may submit it multiple times as the need to provide the data may arises on multiple occasions. The data collection capabilities of the survey and course evaluation tools can be used for such general purpose data collection instruments as well, with a change to the deployment model. Instead of being deployed to a specific set of users, such a general purpose data collection instrument could be made accessible to a set of users for submission at the discretion of the user based on the user's needs. The exemplary interface screen of FIG. 5G depicts a generator of such a general purpose data collection instrument that provides a selection window 562 that permits a user to define new fields of the instrument. When a new field is added, then its label, instructions and other attributes can be defined as well. The screen view of FIG. 5G shows a list 564 of all the defined fields for the current instrument. A preview mode (not shown) is available to show how the layout looks for presentation to a user.

The availability of data across a wide variety of units, courses, and users raises concerns of uniform consistent and efficient evaluation of the data. Thus, an evaluation portfolio manager is provided for an operating unit that lists evaluation templates available to users within the operating unit. Typically, within a higher-education institution, for example, the evaluation template manager would be at a relatively high level such as at the college or department level. An evaluation portfolio relates to a particular portion of an assessment project. For example, a college may have to satisfy three different accreditation boards to be "accredited". A different portfolio could be created for each of the different accreditation boards. Each portfolio would have identified, therein, a series of objectives (as outlined by the accreditation board). Drilling down into each objective would be an identification of how "satisfaction" of each objective is measured (a survey, a rubric for writing samples, and a test). The next step then is to collect the artifacts that pertain to each of these measures. Thus, a portfolio includes a label, a number of objectives, one or more ways to measure instruments related to each objective, and the artifacts themselves. At least three different types of assessment capabilities are provided in conjunction with evaluation portfolios. For example, a student or faculty may perform self-assessment. Additionally, a faculty member, for example, may use an evaluation portfolio to perform assessment of an individual (e.g., a student) with respect to a course objective, one or more program objectives, an institutional goal etc. Furthermore, the evaluation portfolios may aggregate results from many entities within the institution to provide assessment of institutional or program-level objectives such as, for example, accreditation criteria.

Figure 5H:
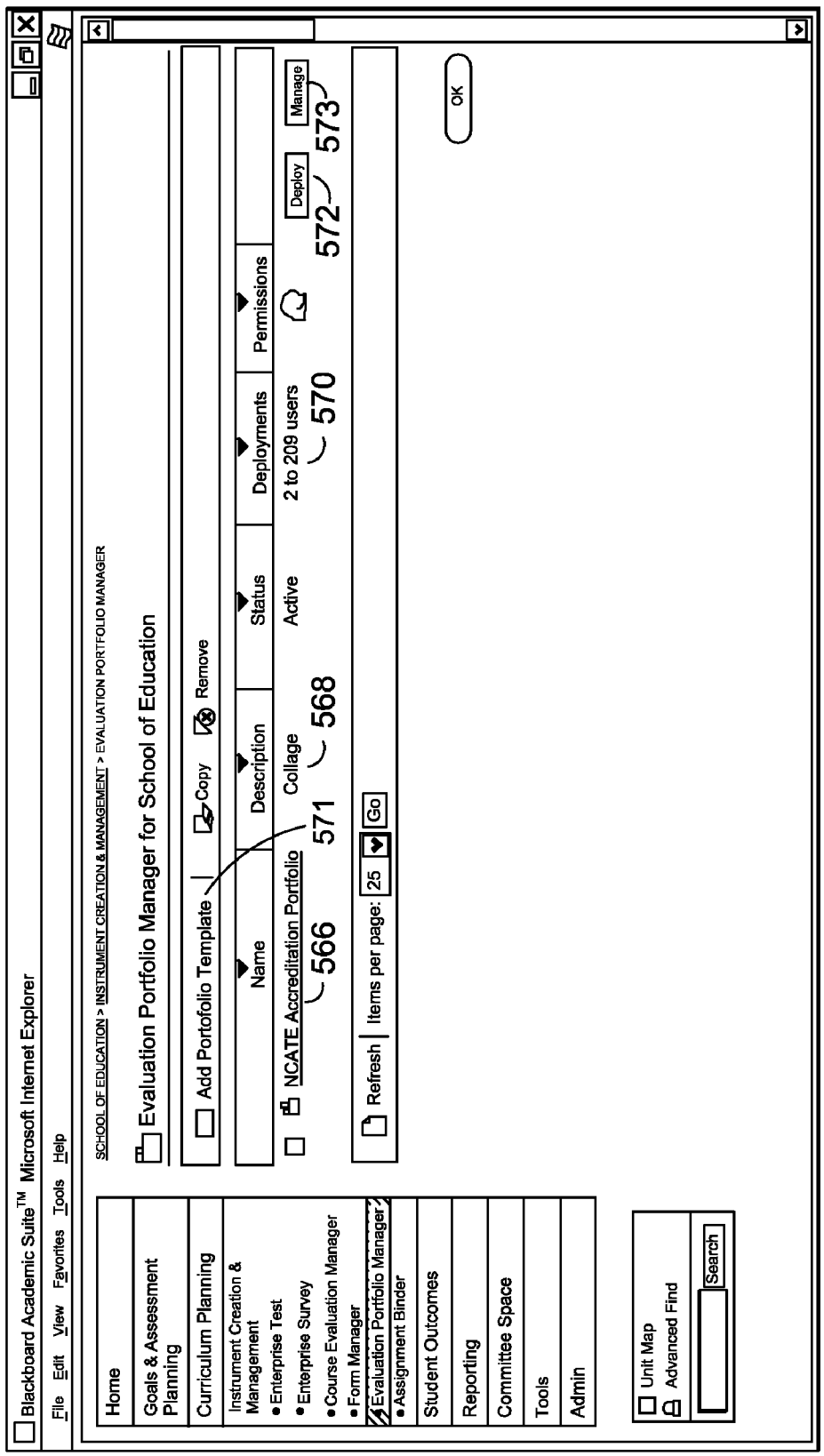
Figure 51:
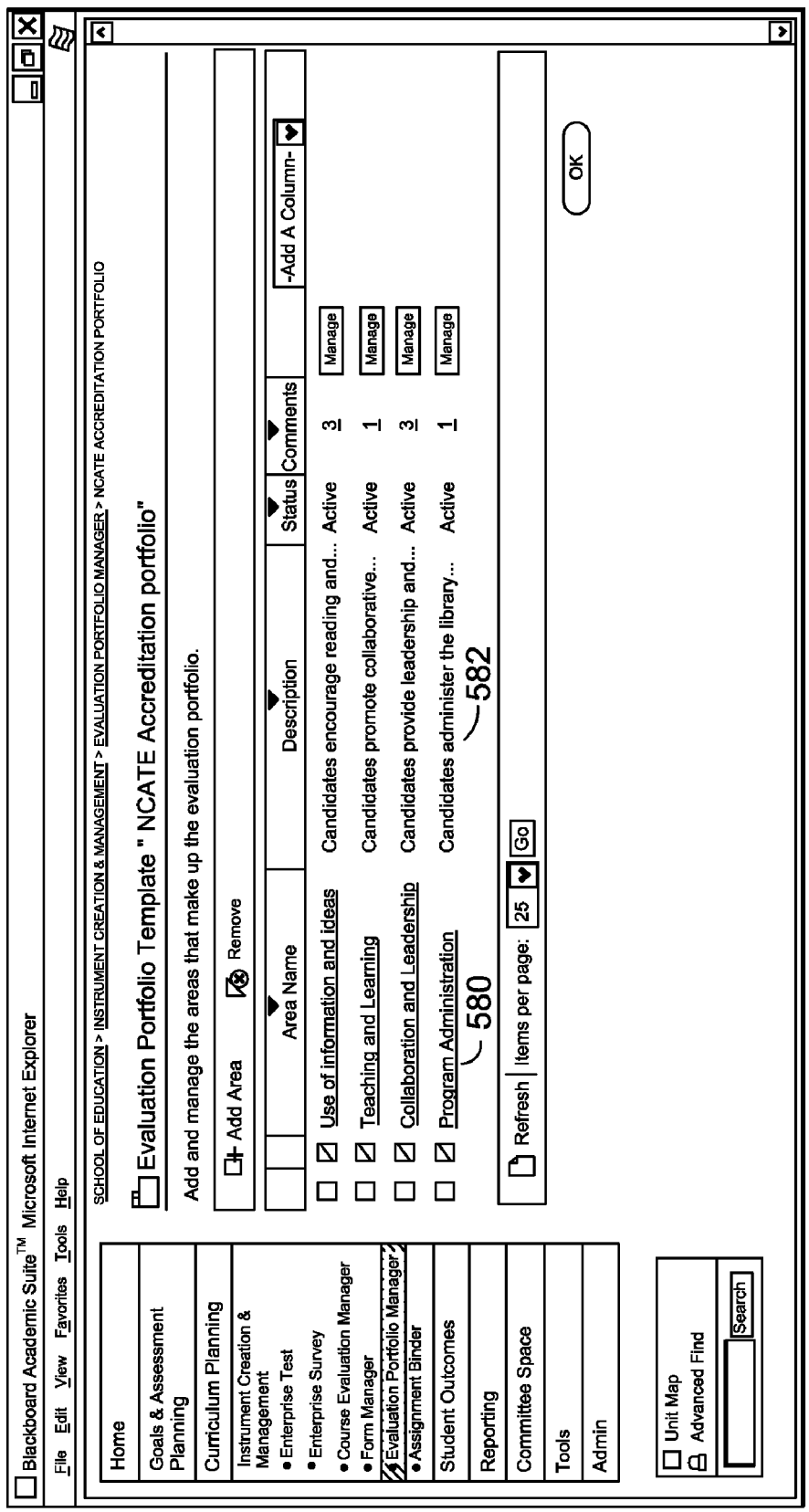

The interface screen of FIG. 5H depicts an exemplary evaluation portfolio manager that lists the available evaluation portfolios. In this example, one evaluation portfolio 566 is listed and is related to NCATE accreditation. The screen further displays attributes of this portfolio such as where it is defined 568, and its deployments 570. From this screen, the user can manage 573 a portfolio, add 571 a new portfolio, or deploy 570 an existing portfolio.

Selecting the "Add" button 571 of the portfolio manager interface will reveal the interface screen of FIG. 5I that shows a template of a portfolio that includes a listing of the areas that are the subject of the evaluation portfolio. This template can then be modified by the user. A portfolio is intended to include artifacts from students that exhibit certain outcomes. For example, artifacts may be papers, tests, surveys, quizzes, collaborative exercise, assignments, etc. These artifacts are submitted by a student (or collected by the faculty) in order to be applied towards one or more of the areas identified within the evaluation portfolio template. In the example portfolio 566, there are four areas of interest for evaluation. A list of these areas 580 and their respective descriptions 582 are shown. By selecting one of the links 580, a more detailed view of the specific properties for that portfolio area can be provided to the user.

This evaluation portfolio is deployed by a user to selected recipients using the "deploy" button 572 shown in FIG. 5H. As described earlier, a list of recipients may be defined or selected for deployment that varies according a number of criteria. Once the evaluation portfolios are deployed to students within the academic system 116 (see FIG. 1), these students can submit artifacts related to the different areas. Thus, the students to which the evaluation portfolio is deployed each complete the evaluation portfolio. Completing the portfolio is accomplished by adding artifacts to the portfolio. As a result, the assessment system 102 collects artifacts from a number of students related to the evaluation areas 580 of the evaluation portfolio. Because, the artifacts can include identifying and other meta-data, robust filtering and searching of the submitted and stored artifacts are possible. For example, random samples of submitted artifacts may be selected for an area or, alternatively, only artifacts from female students that live off-campus may be selected.

When defining the evaluation portfolio, the user may also be given the opportunity to define the artifacts that should be collected for each of the areas. Thus, by selecting one of the areas 580, the user may be provided with an artifact definition template that specifies attributes of the artifact (e.g., the scoring system, the fields, and the date). One example area in a portfolio may be to show that a student nurse can perform an intramuscular delivery of medicine. The artifact for documenting this area may require the name of the managing clinical nurse, a statement that the student was observed performing the injection, the name of the hospital, and the date of the observation. Another area in a portfolio may relate to satisfying a creative writing requirement. The artifact to apply to this area may include a paper that was scored according to a particular rubric. Thus, the artifacts themselves may vary greatly depending on the area 580 within an evaluation portfolio. Accordingly, the present assessment system 102 allows a user to define templates for the different types of artifacts and then, subsequently, when creating an evaluation portfolio, allows the selection of these templates to identify an artifact when describing an area within the evaluation portfolio, such as that in FIG. 5I.

Figure 5J:
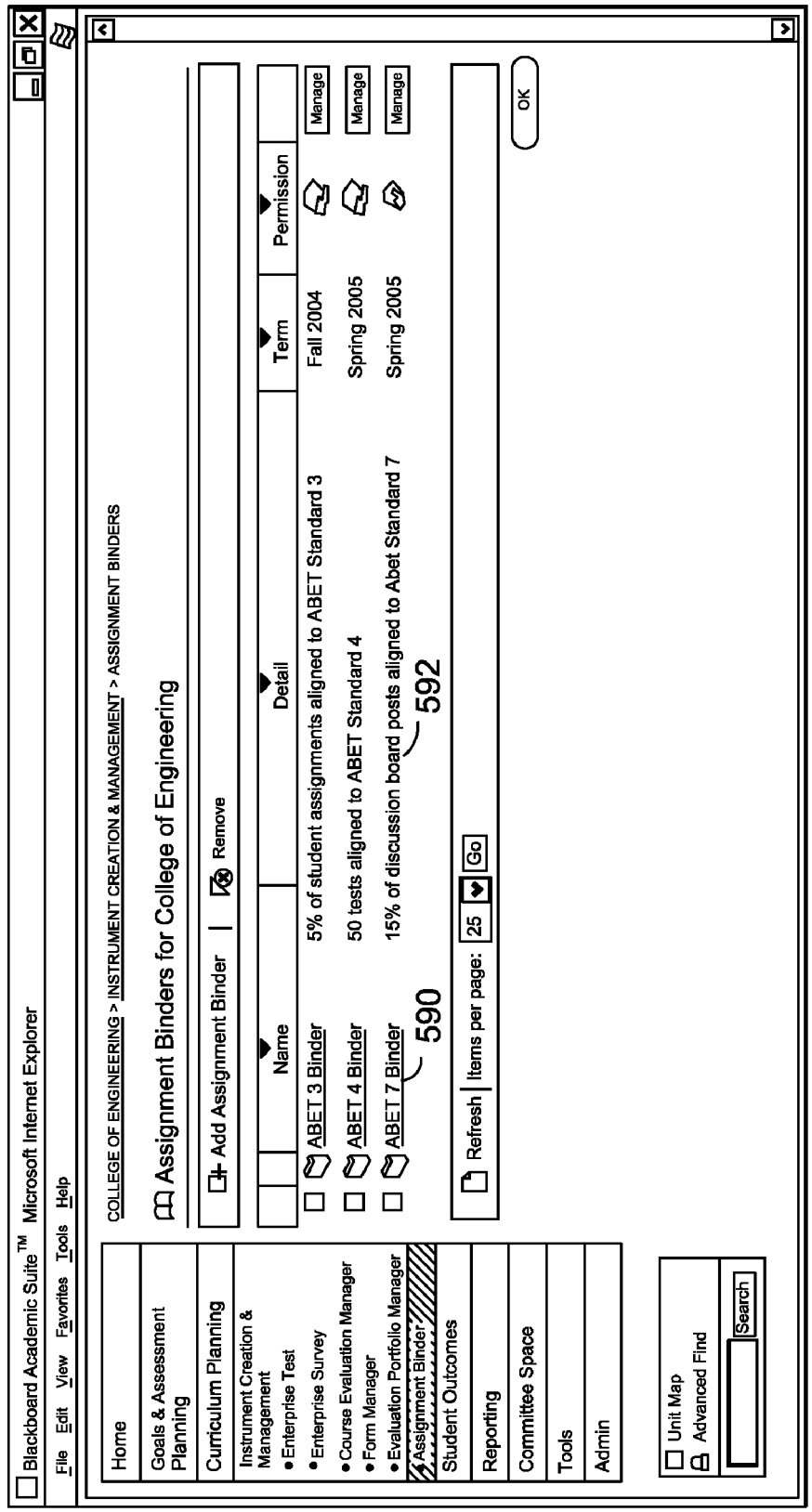

A concept that is somewhat similar to a portfolio is that of an assignment binder. An assignment binder typically pertains to a particular accreditation program and collects artifacts related to that purpose over the course of one or more terms. The contents of the assignment binder can be used to support a review of a particular program or curriculum. However, unlike a portfolio, an assignment binder simply collects the artifacts without necessarily assigning them to particular areas or measuring them against predetermined rubrics. FIG. 5J depicts an exemplary interface screen for managing assignment binders. As shown, a binder is created within the College of Engineering and includes a name 590 and a description 592. Other attributes of a binder include, for example, the term for which it applies and user access privileges. Through the use of user lists and course lists, the selection of the artifacts to include in the binder can be controlled to provide desired cross-sections of available artifacts. Although an assignment binder may include artifacts from a wide range of students, selective filtering based on user lists, unit lists, or course lists can be used to extract a limited subset of artifacts from students matching particular criteria. Additionally, artifacts can be selectively returned that match a filter, or search criteria, related to the grade of an assignment, or other assignment specific attributes. Thus, different binders may be built, from the same pool of artifacts, by automatically retrieving artifacts matching one or more defined filter criteria. Within the interface of FIG. 5J, more information and the artifacts themselves may be presented to a user through selection of one of the links 590.

The definition of goals and objectives, the creation of rubrics, and the collection of artifacts as described above allow automatic evaluation of a student's performance against program or course objectives. The assessment system 102 and its integration with the other campus systems 114 and the campus academic system 116 simplify sharing of information among the various systems. As a result, the integration of these systems results in the storage of rubrics, artifacts, various objectives, different goals, and a definition of the relationship or association between these different data entities. Using techniques known to one of ordinary skill, this integrated information can be organized and filtered to identify and report various aspects related to the stored data that may be pertinent to assessment within an institution.

Figure 6A:
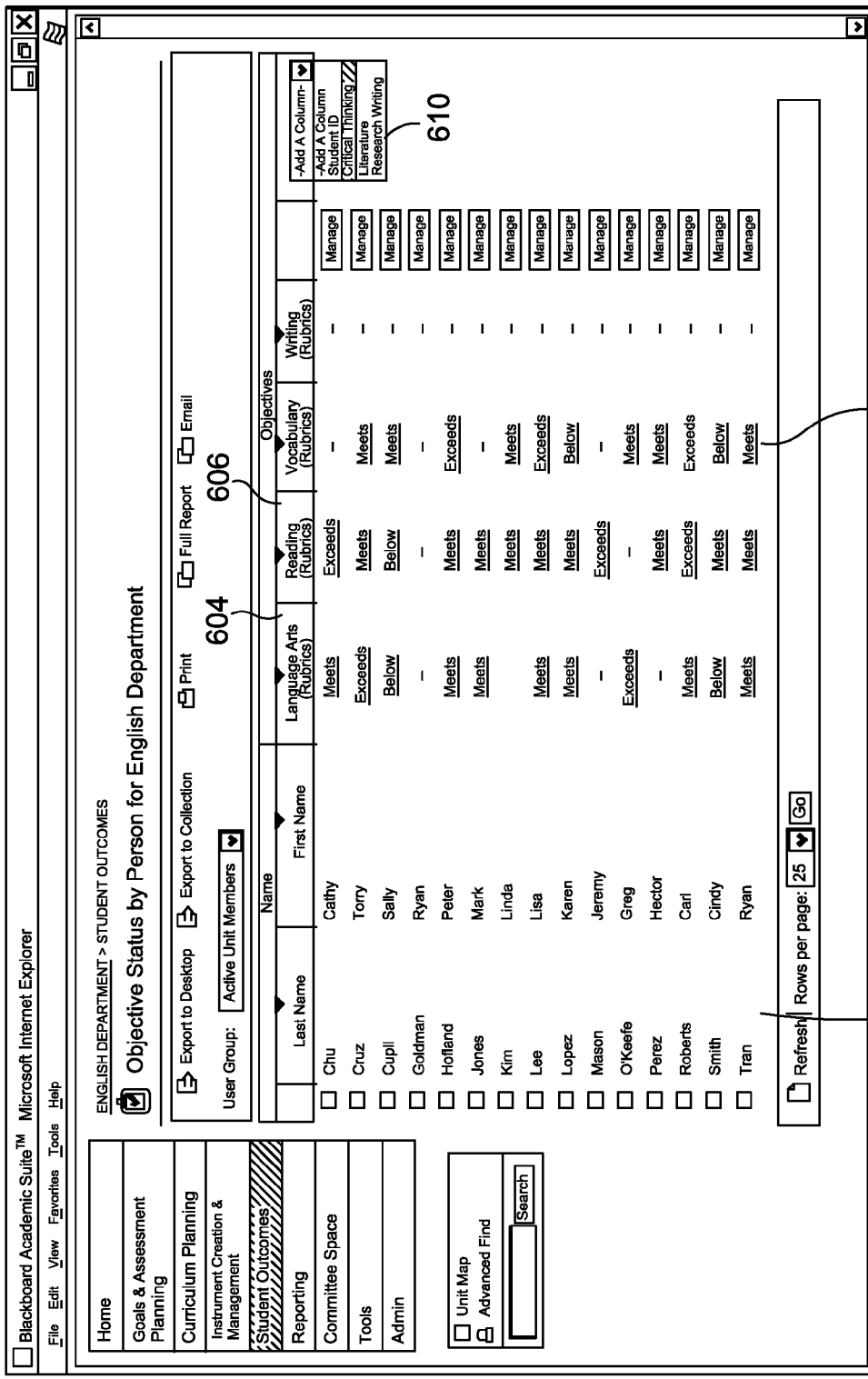
FIG. 6A depicts a screen shot of a user interface that relates to displaying user outcomes in accordance with the principles of the present invention.

For example, a "score-sheet" such as that depicted in FIG. 6A may be built as the result of the integration and flexibility provided by the present assessment system. This table of FIG. 6A includes a list of students 602 and an indication of how they satisfy each objective 604, 606. The indication 608 may be a numerical score or some other qualitative-type score. For example, in the table of FIG. 6A, the indicators include "below", "meets", and "exceeds". These indicators are based on the definition of the rubrics and the scores that are assigned to the artifacts which the students supplied in response to the rubrics. Because the rubrics are aligned with previously defined goals and objectives, these indicators can be automatically determined from these objectives. The table of FIG. 6A also includes a drop down window 610 that allows a user to select other objectives to display (e.g., critical thinking) as columns in the table.

Figure 6B:
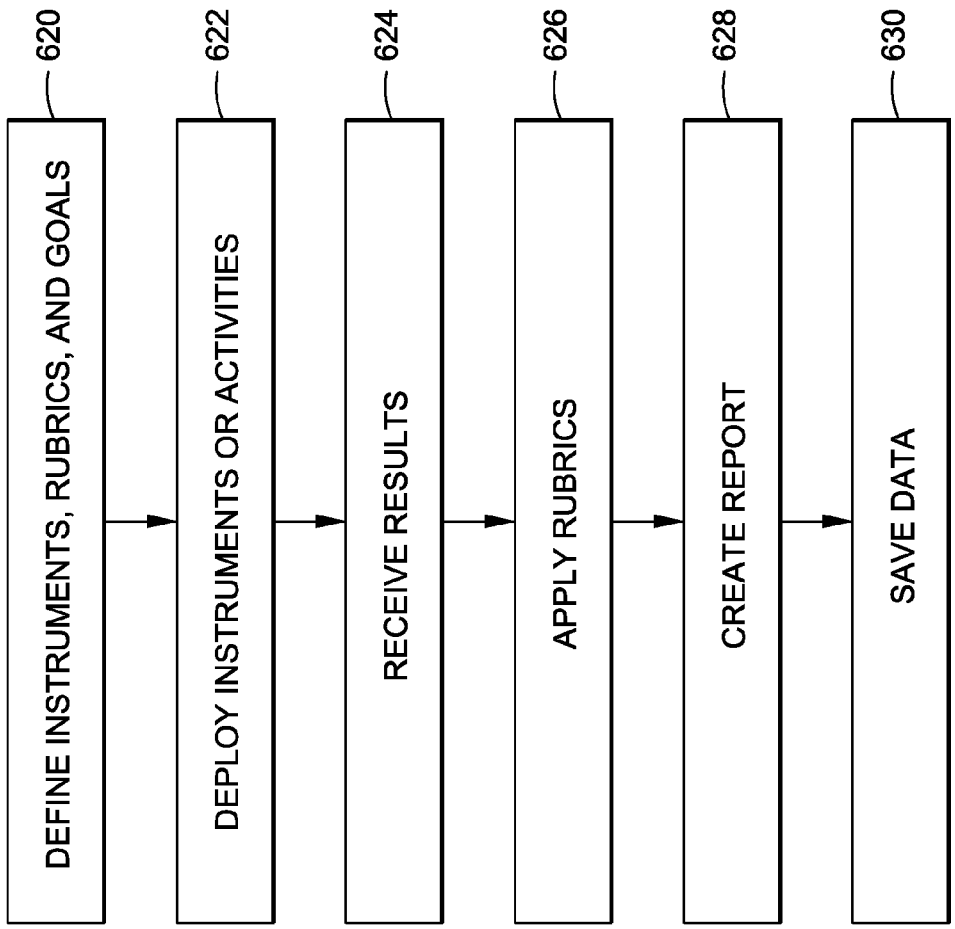
FIG. 6B depicts a flowchart of an exemplary method for generating the contents of the screen shot of FIG. 6A.

FIG. 6B depicts a flowchart of an exemplary method by which the table of FIG. 6A may be generated. In step 620, instruments, rubrics, and goals and objectives are defined as described earlier. As part of the definition process, the instruments are associated with different rubrics and these rubrics are aligned with various goals and objectives. Next, the instruments (e.g., test and quizzes) are deployed, in step 622, to students. Other activities that are aligned with various rubrics may be performed as well.

In response to the deployment of instruments and other activities, results are received from the students, in step 624, by the assessment system. The receipt of results may be through automatic submission by the students through a campus academic system 116 as described earlier or through an instructor who receives the results directly from the students. The rubrics may then be applied to the results, in step 626. Once the rubric is applied, scores can be assigned to the results for each of the defined goals and objectives so that a report can be generated (see FIG. 6A), in step 628. The results and assigned scores along with other data may then be stored, in step 630, so that records of the assessment may be maintained for future reference and analysis.

Reporting

Figure 7A:
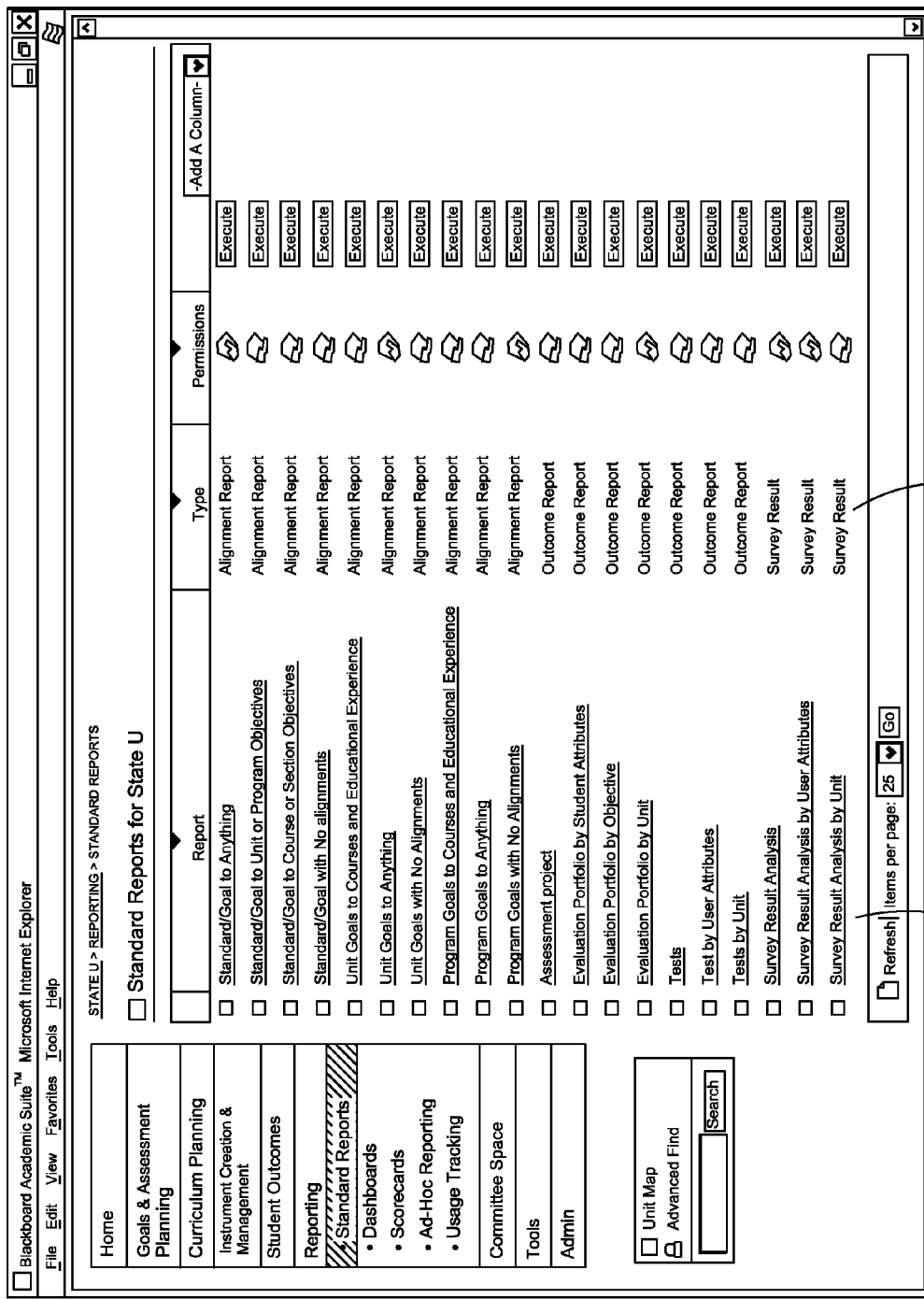

The following figures depict a variety of different reports that may be generated using the assessment tools described herein and the data that is collected as a result of using these assessment tools. One of ordinary skill will recognize that the specific format and contents of each report may vary greatly without departing from the scope of the present invention. However, these reports show the great breadth and depth of the types of data collection, some of which may be automatic, and analysis provided by the assessment techniques and methods described herein. One advantageous benefit of the present system and techniques evidenced within the exemplary reports is the sharing of data from among different level operating units. For example, the data from a number of different course may be "rolled-up" into a report that is generated at a department level and this report may include data that is collected at the course or section level. Thus, a report related to a department goal or objective may include results from artifacts that were submitted at the course level even though there are intervening operating units between the two levels within the model of the institution. This sharing of data between different operating units and different levels of operating units occurs in the other direction as well. For example, when defining and identifying artifacts, instruments, surveys, portfolios, curriculum content, etc. at a lower-level operating unit attributes from higher-level operating units may be automatically inherited without the need to be explicitly defined FIG. 7A depicts a list 702 of report templates that have been pre-defined for use by a user. As new reports are defined, they can be added to the list. In operation, a user would select one of the available templates and then fill out the fields of the template with the particular data for their report. To help in the selection of the report, the list can also include other identifying features such as a description 704 associated with each report template.

Figure 7B:
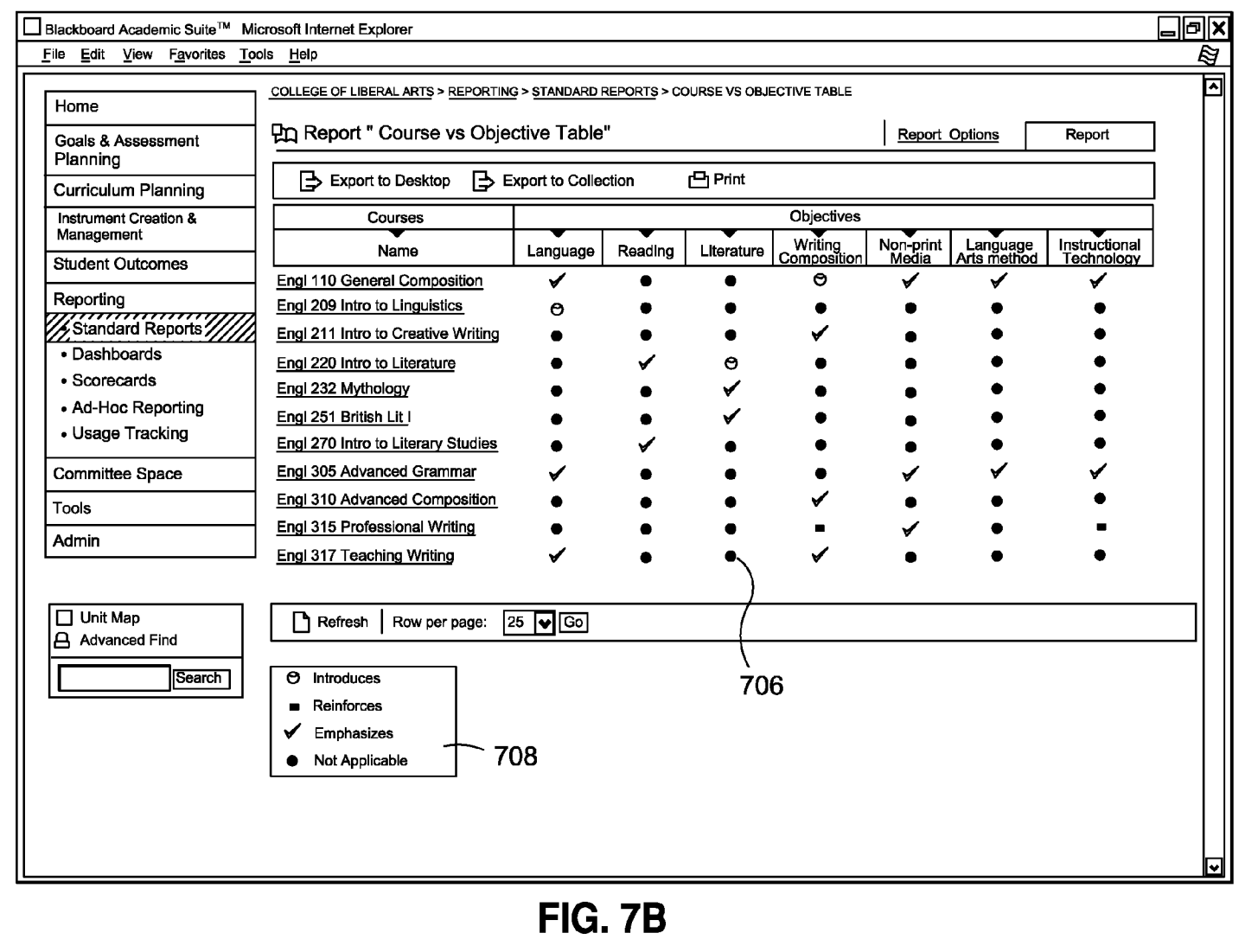

One example report is shown in FIG. 7B (which is a more detailed view FIG. 4C); this report displays a table of "Course vs. Objective". In generating this table, the English Department, for example, may use the template to select some or all of its courses and then select all or some of its department objectives. Because the definition of the courses also included aligning it with certain objectives, this report can be generated to show how each course satisfies each objective. The table includes an indicator 706 at each intersection of an objective and course. This indicator could be quantitative such as a ranked numerical score or it can be qualitative as shown in FIG. 7B. Exemplary qualitative categories are shown in the legend 708 of the table.

FIG. 7C depicts a table that might be useful to the institution which shows, by department, the status of course evaluations. Because the generation and return of course evaluations are automatically and systematically handled by the present assessment system, these statistics are readily available without manual collection and tallying of results by each department. Furthermore, not only is the status of completion revealed in the table but the overall scores 710 of the evaluations can be calculated and displayed as well.

Figure 7D:
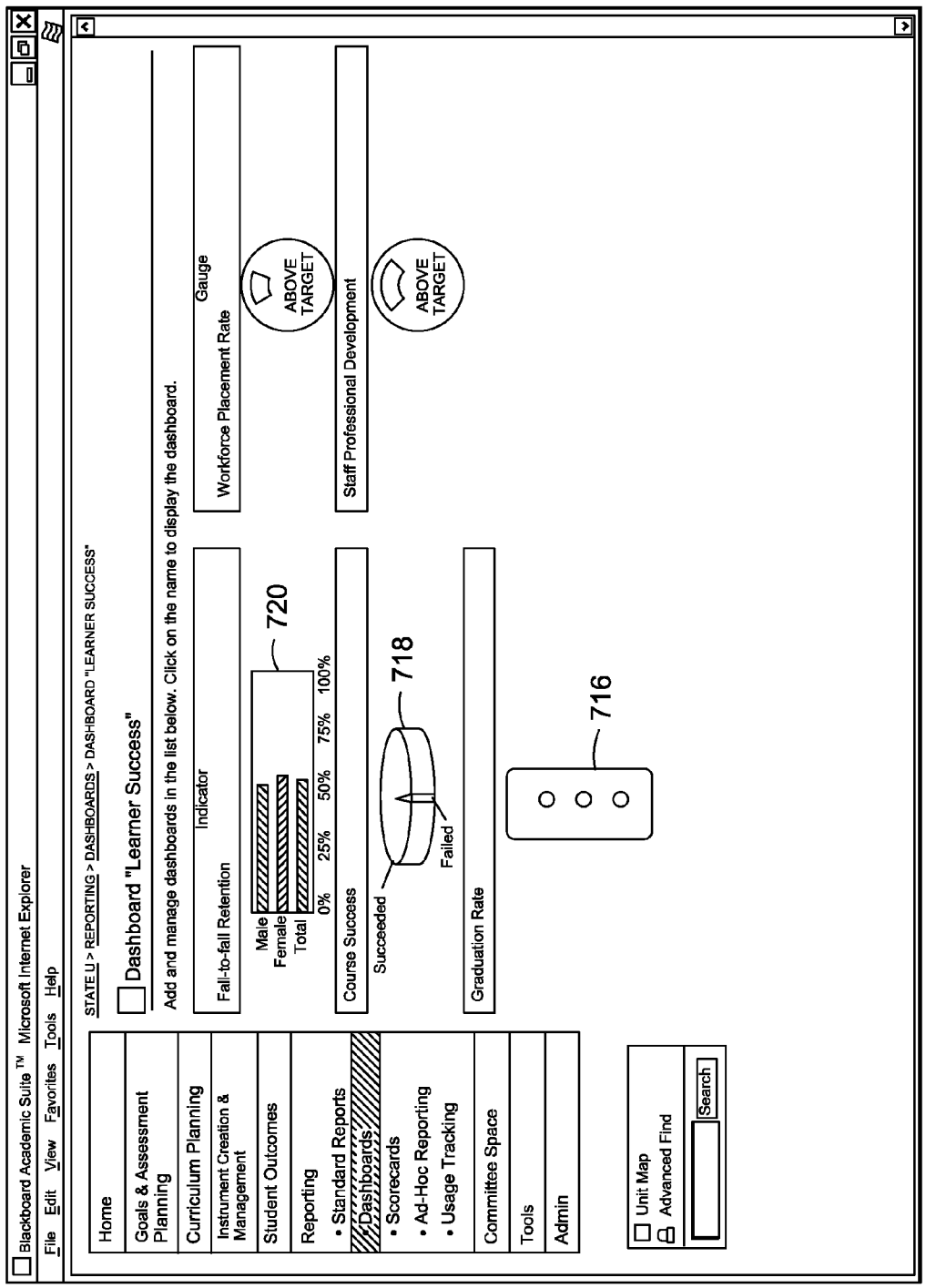
Figure 7E:
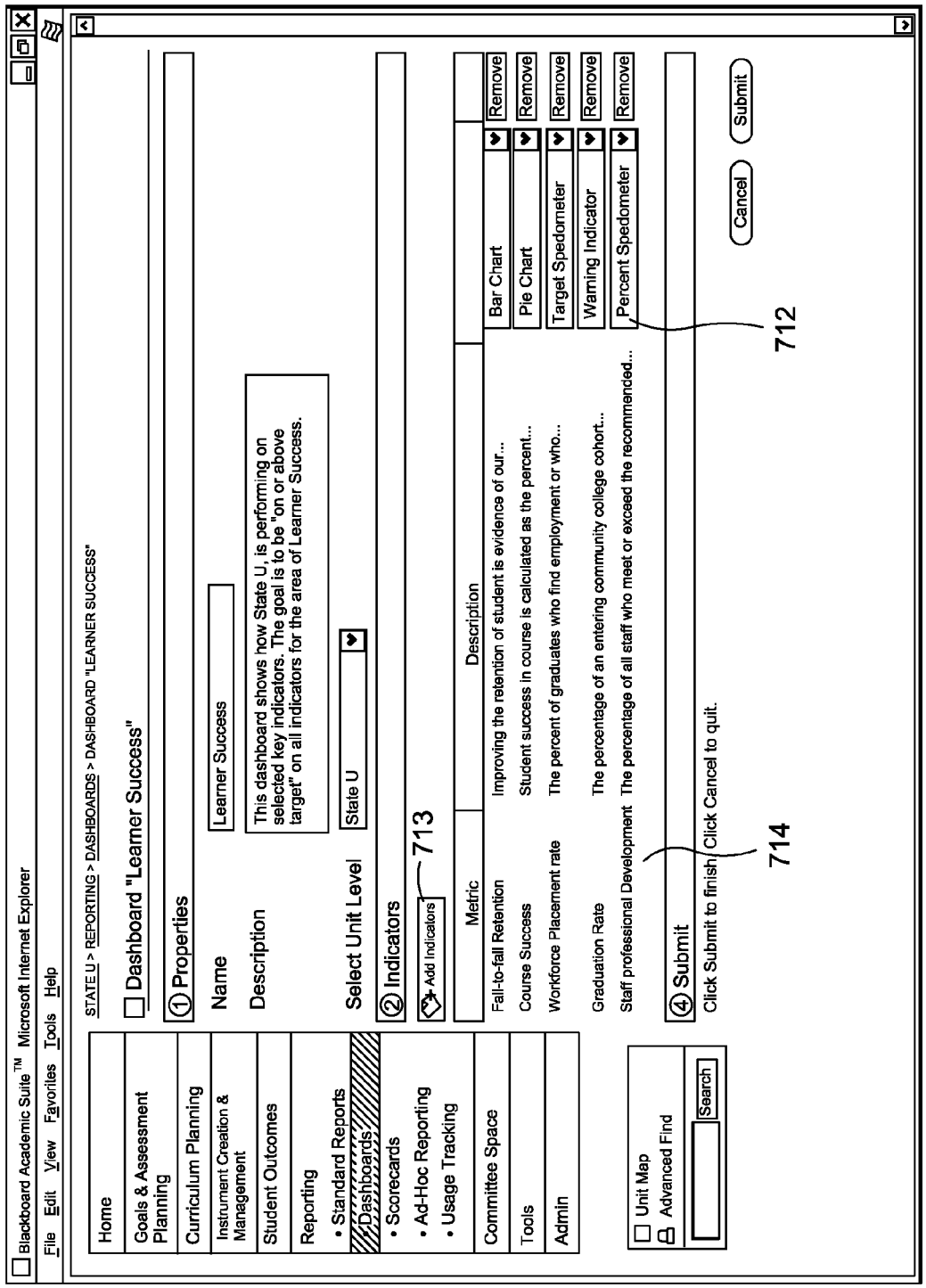

In addition to tabular reports, more graphical report templates are provided as well. FIGS. 7D and 7E depict a dashboard-type report that graphically indicates certain indicators that an institution or other operating unit may be interested in. In a dashboard, certain indicators are defined along with the attributes for that indicator. For example, the "traffic light" indicator 716 of FIG. 7D has three possible states (e.g., read, yellow, green) which are mapped to a particular graduation rate defined by the institution. The data collection described herein provides the raw data for this indicator and the definition of the indicator is used to map the raw data into the "color" of the traffic light. Similarly, a pie chart 718 can be created from raw data to show the percentage of students who passed and failed a course. Similar raw data may be displayed as a bar chart 720 as well. The template definition screen of FIG. 7E depicts one way in which such a dashboard may be created. For example, a user can create a new metric 714 using the "Add" button 713. In the creation process, the user is provided with a selection window 712 that selects the type of indicator associated with the metric.

Figure 7G:
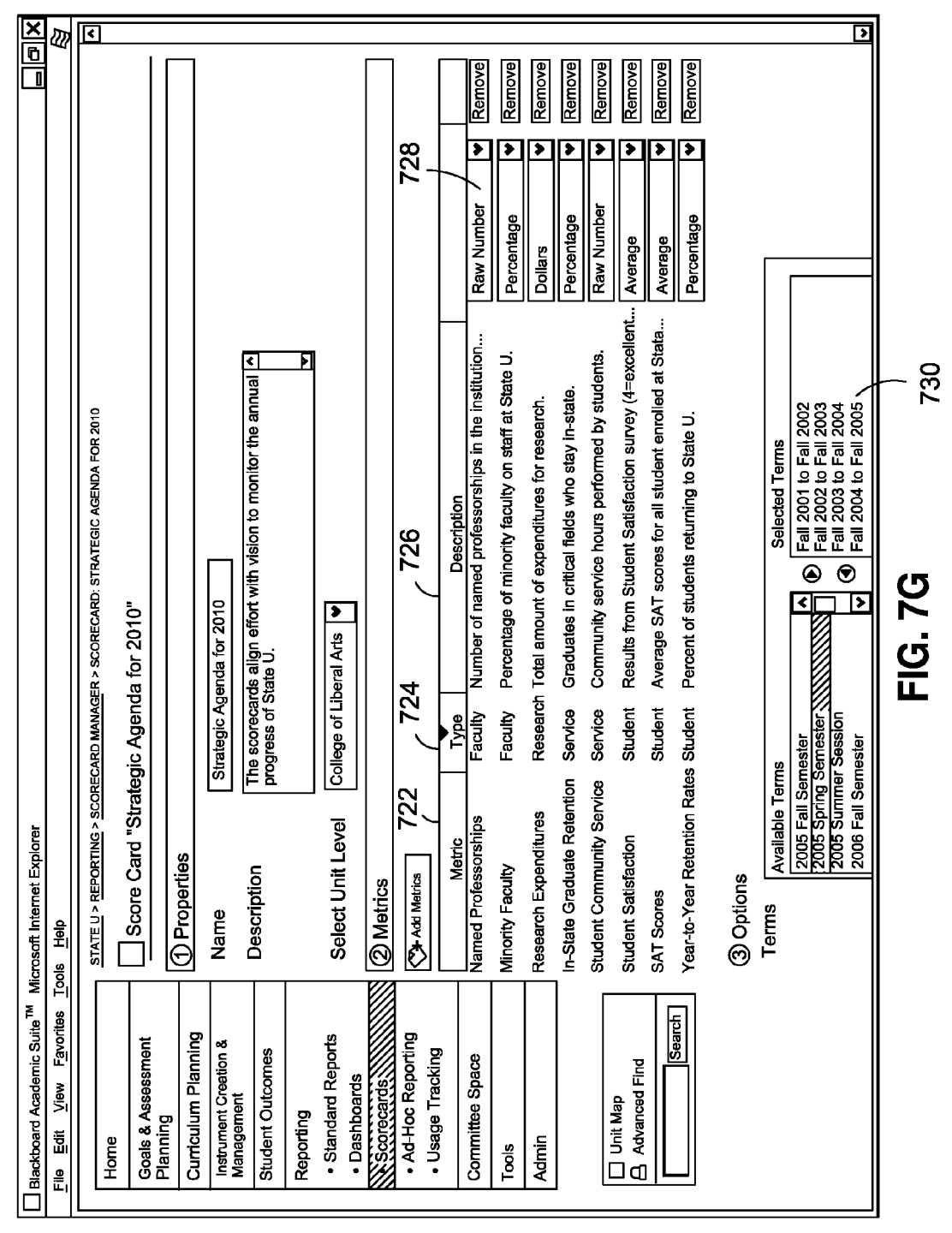

FIG. 7F depicts another type of report that resembles a scorecard. This type of report may be advantageously used to compare results of the same metric over different instances. For example, the scorecard of FIG. 7F shows such statistics as student SAT scores, student satisfaction, the number of minority faculty, etc. However, from an institution perspective, the scorecard provides the values for these metrics for the four most recent terms 720. Thus comparison and tracking of different metrics may be accomplished using a scorecard. FIG. 7G shows the details of using a scorecard template to generate a scorecard such as the one in FIG. 7F.

Using this template, a user can define the metric 722 that is going to be applied and displayed along with the class of individuals 724 to whom it applies. A description 726 is useful for identifying the metric and a selection window 728 allows the user to define the type of data that results from applying the metric. For example, the data may be "dollars", "a percentage", "raw numbers", "an average", etc. Near the bottom of the template of FIG. 7G is a window 730 that allows the user to select the different time frames for which these metrics will be included in the scorecard.

Figure 7H:
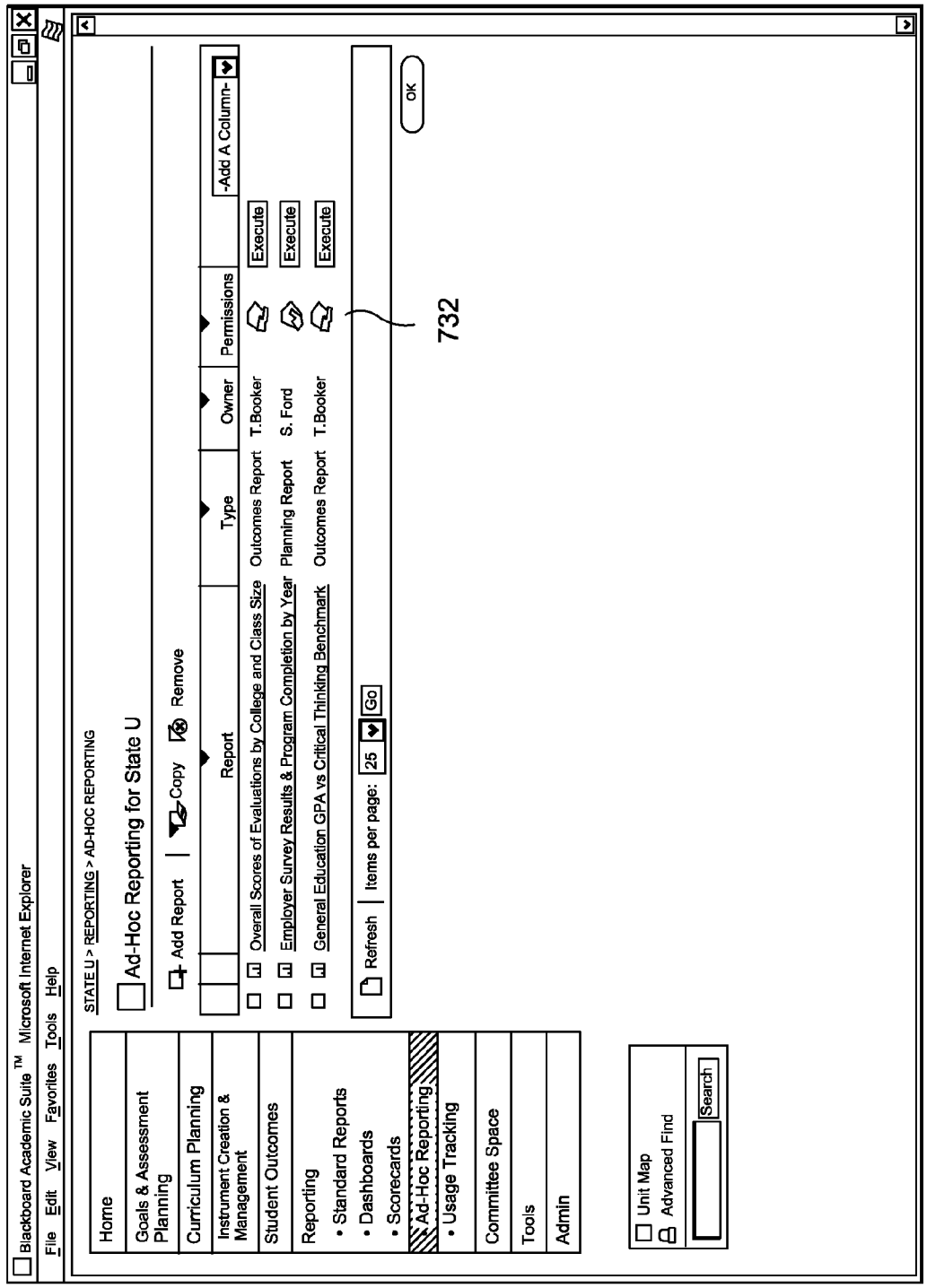
Figure 71:
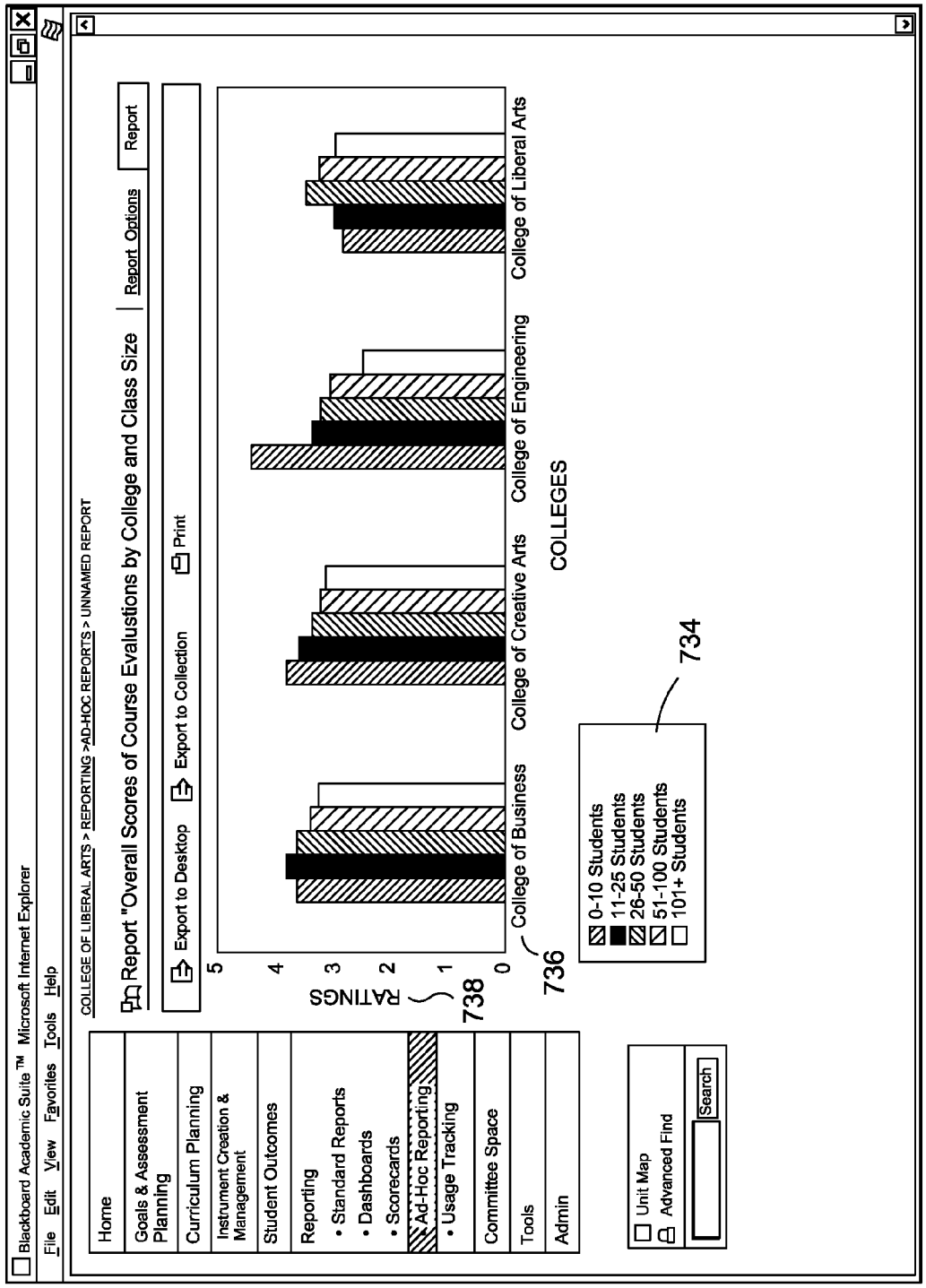

It is useful, once a report has been defined and run, to be able to save the report for future reference. As shown in FIG. 7H, the assessment system 102 described herein provides that capability. When storing the reports, it may be advantageous to allow the user to set permissions 732 for the report such that certain classes of users may be prevented from accessing the report or, alternatively, to specify a wide group of user roles that may access the report so as to ensure its widest dissemination.

FIG. 7I depicts a relatively simple bar chart; however, its contents reveal the great breadth of data collection and reporting capability provided by the assessment system 102 described herein. At the institution, one level of operating units may be "the college". The different colleges 736 may include the business college, the engineering college, etc. Within each college are courses and each of these courses have course evaluations that are deployed and collected and given a rating 738. Each course also has a particular number of seats or students and this data may be stored in a third-party campus information system maintained by the institution or it may be stored within the present assessment system. As a result, the bar graphs of FIG. 7I allow a reporting of data such that the institution can discover the average course evaluation ratings within each different college as a function of class size. The legend 734 depicts an exemplary breakdown of class sizes.

Figure 7J:
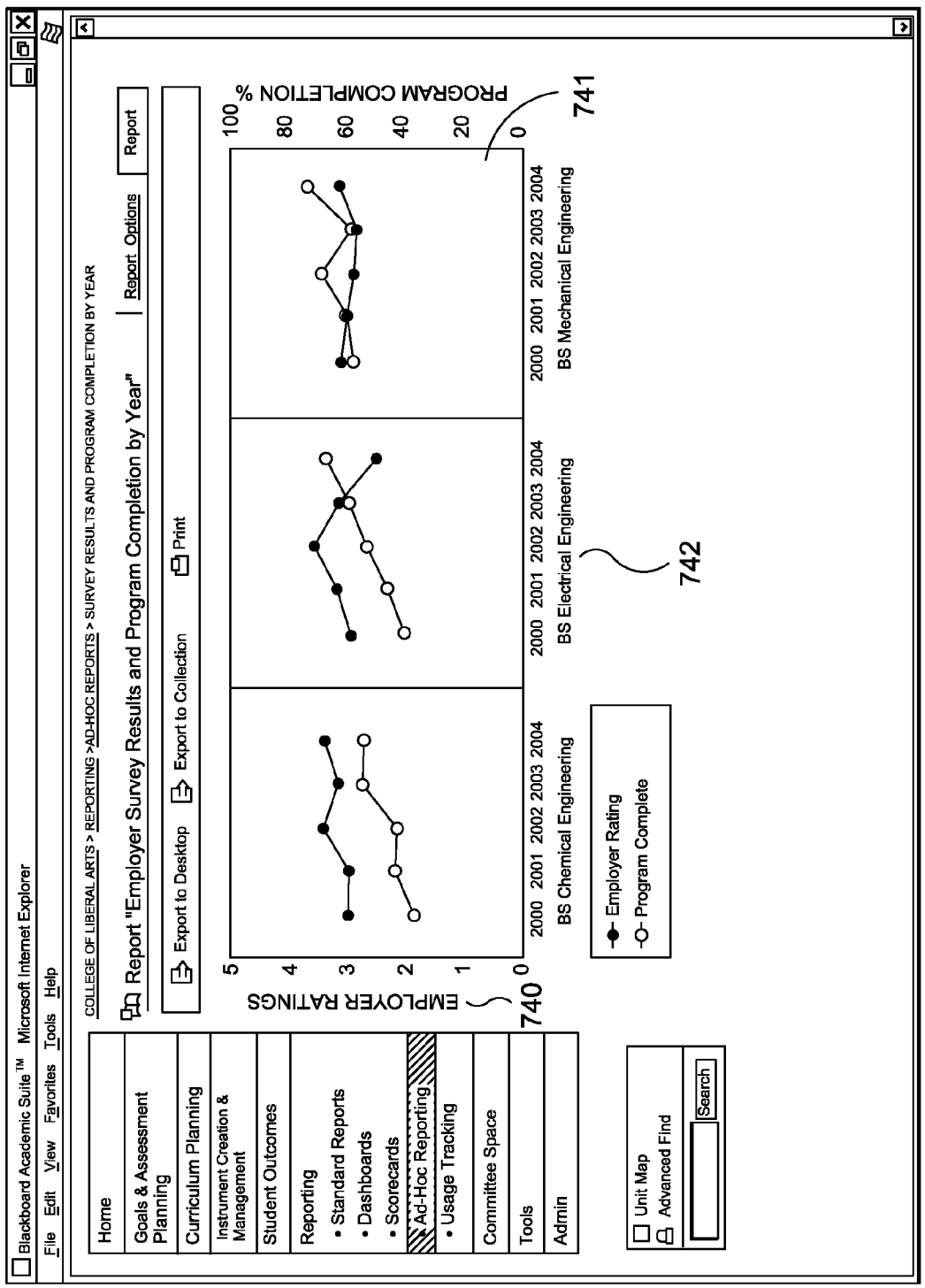

FIG. 7J depicts another type of graph 741 that can be used to display data. In this instance the data is from an off-campus survey that collected ratings 740 from employers of recent graduates. Additionally, the graphs are broken down by different programs 742 within the college of engineering. Thus, as an operating unit, the college of engineering can analyze data according to sub-units defined previously.

Figure 7K:
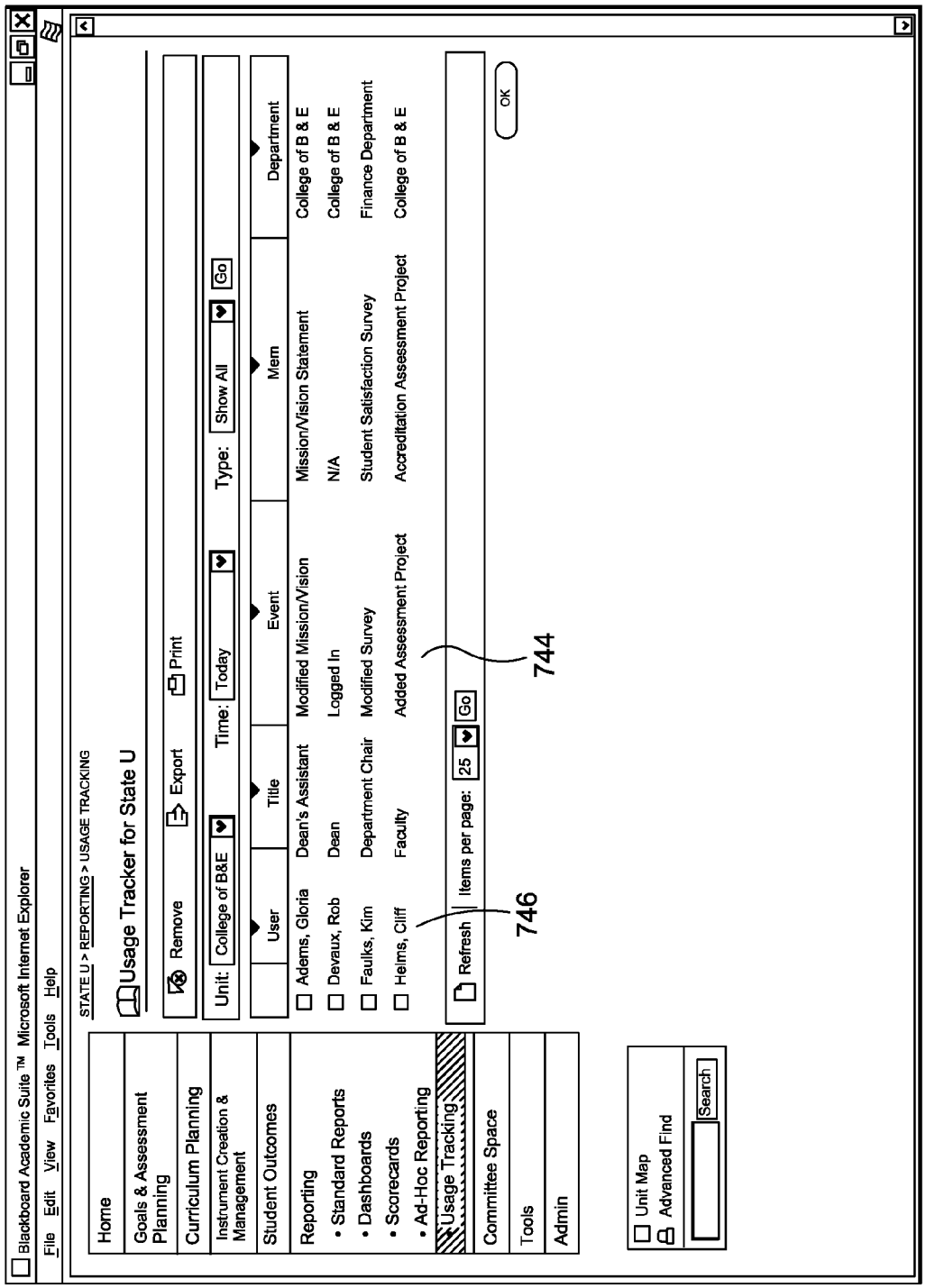

For purposes of auditing and other monitoring functions, the assessment system 102 can track activities of users within the system in order to know what documents they have accessed and modified. Thus, the table of FIG. 7K can be created that shows recent events 744 within the assessment system 102 that are associated with one or more users 746. This data may be filtered so as to create a report that is based on time, based on a particular user, based on a class of users, etc.

Other Tools

There are a number of additional administrative type functions that simplify the management of various assessment projects and initiatives. These functions are not required by the assessment system 102 described herein but facilitate its operation and provide advantages to automating the processes described herein.

Figure 8A:
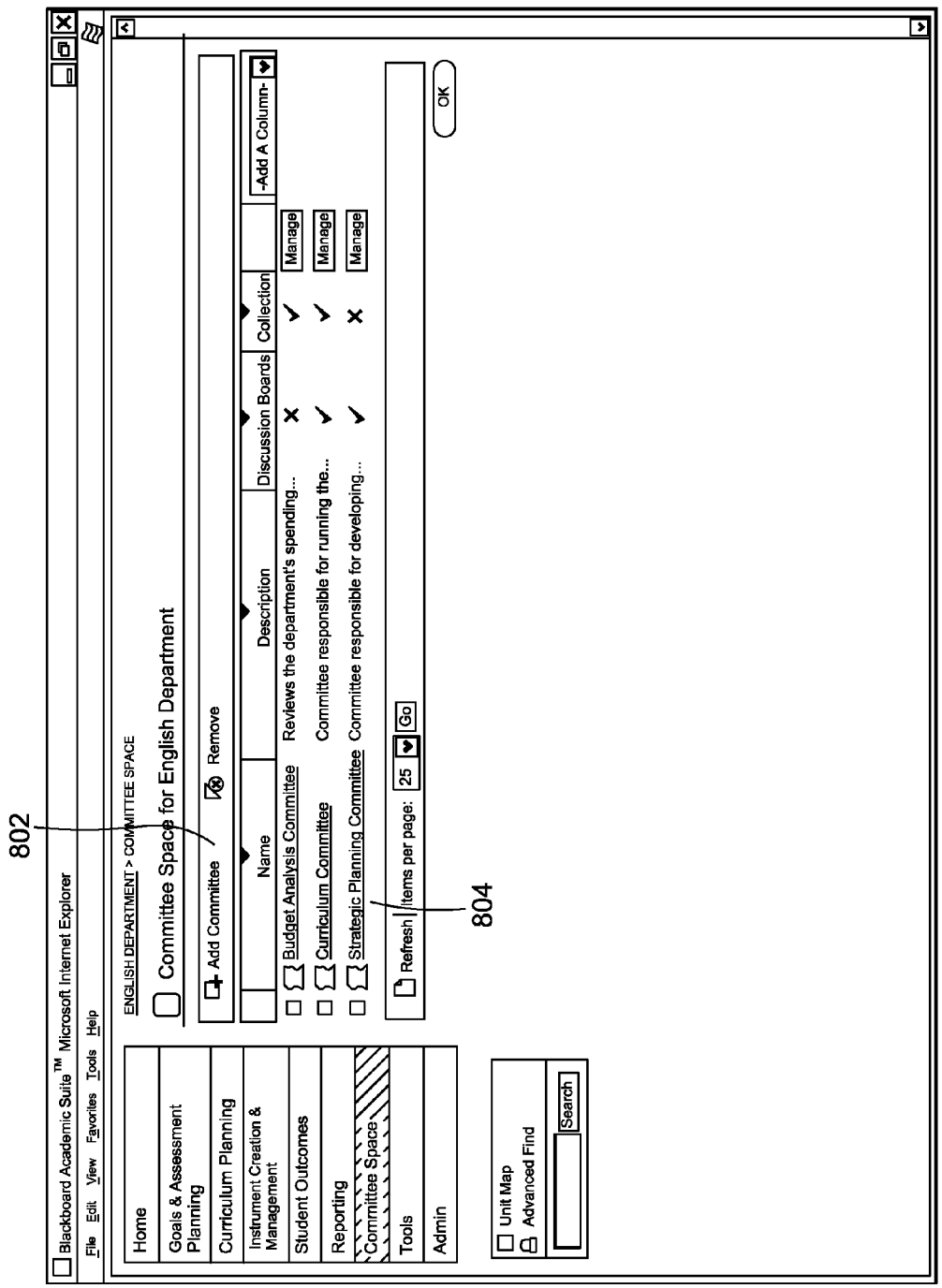

For example, users can be grouped into committees in order to simplify assigning roles and access privileges. Templates and other documents, when created, may have access privileges assigned based on which committee may access them, approve them, modify them, etc. By associating staff and faculty into different defined committees, the access privileges remain consistent even though faculty and staff can change. Additionally, upon creation, a committee can be provided with its own discussion board area, its own shared calendar, its own e-mail contact list, as well as its own storage repository for the documents it needs and generates. The interface screen of FIG. 8A depicts a tool useful for listing existing committees 804 and adding 802 new committees.

Figure 8B:
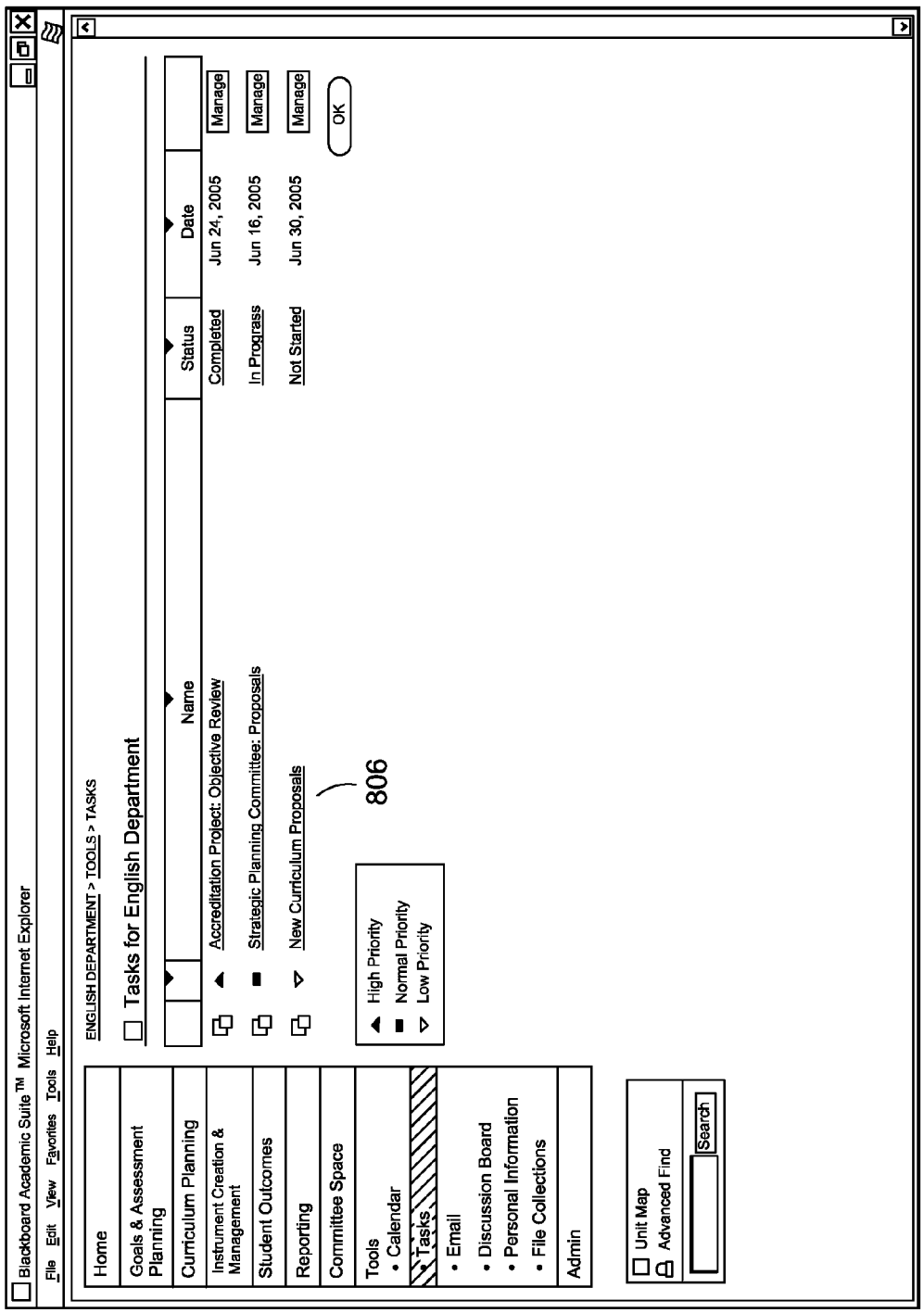

FIG. 8B depicts a task manager function which allows an operating unit to identify tasks 804 and track their status. FIG. 8C depicts some of the detailed information that may be collected about a student or faculty. This information may be manually entered or populated from another system such as an SIS of the institution. Information such as gender, ethnicity, financial aid, native language, SAT scores, etc. may be collected. As a result, the user lists described earlier can be finely defined to include only a desired subset of students when deploying instruments or reporting results and other data. Some of the fields shown in FIG. 8C may be static while others are dynamic. Thus, as data changes (e.g., the students GPA), this data may be automatically pulled from the SIS when needed. The assessment system 102 can access the SIS system in at least two different ways. A snapshot of the SIS can be made that the assessment system 102 stores and uses for its purposes or the SIS system can be dynamically accessed each time data from it is needed.

Figure 8D:
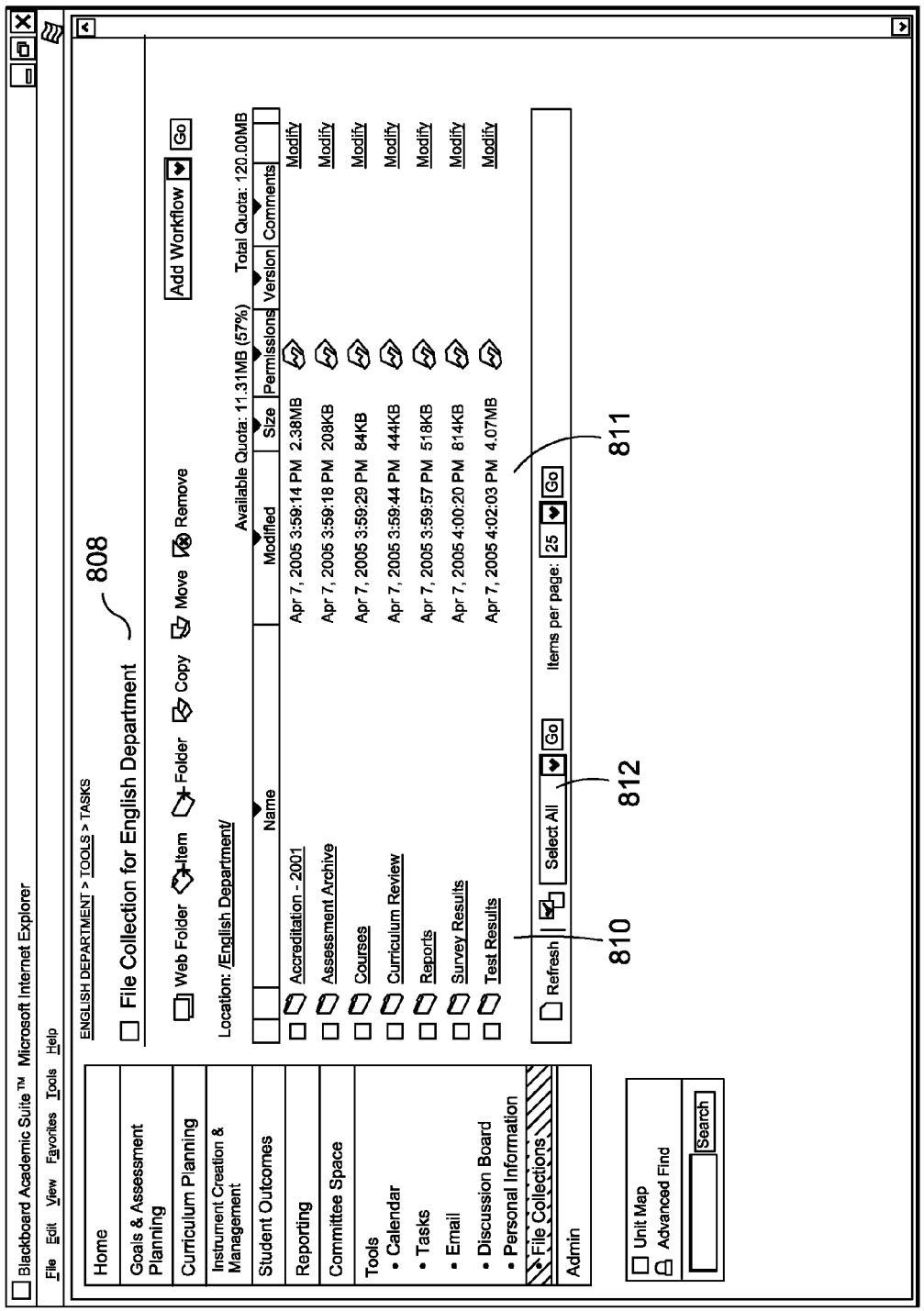

Because of the automatic and systematic collections of data described herein, there will be a large number of files generated and stored. Organization of these files can be dependent on operating units, assessment projects, programs, courses, instrument type, etc. FIG. 8D depicts an exemplary file manager that may be used to utilize the files within the system for the English Department 808. Within the manager window, a list of file collections 810 can be provided along with associated attributes 811. To help locate file collections, a drop down window 812 may be provided to allow the user to apply certain filters so that only desired file collections are displayed.

Figure 8E:
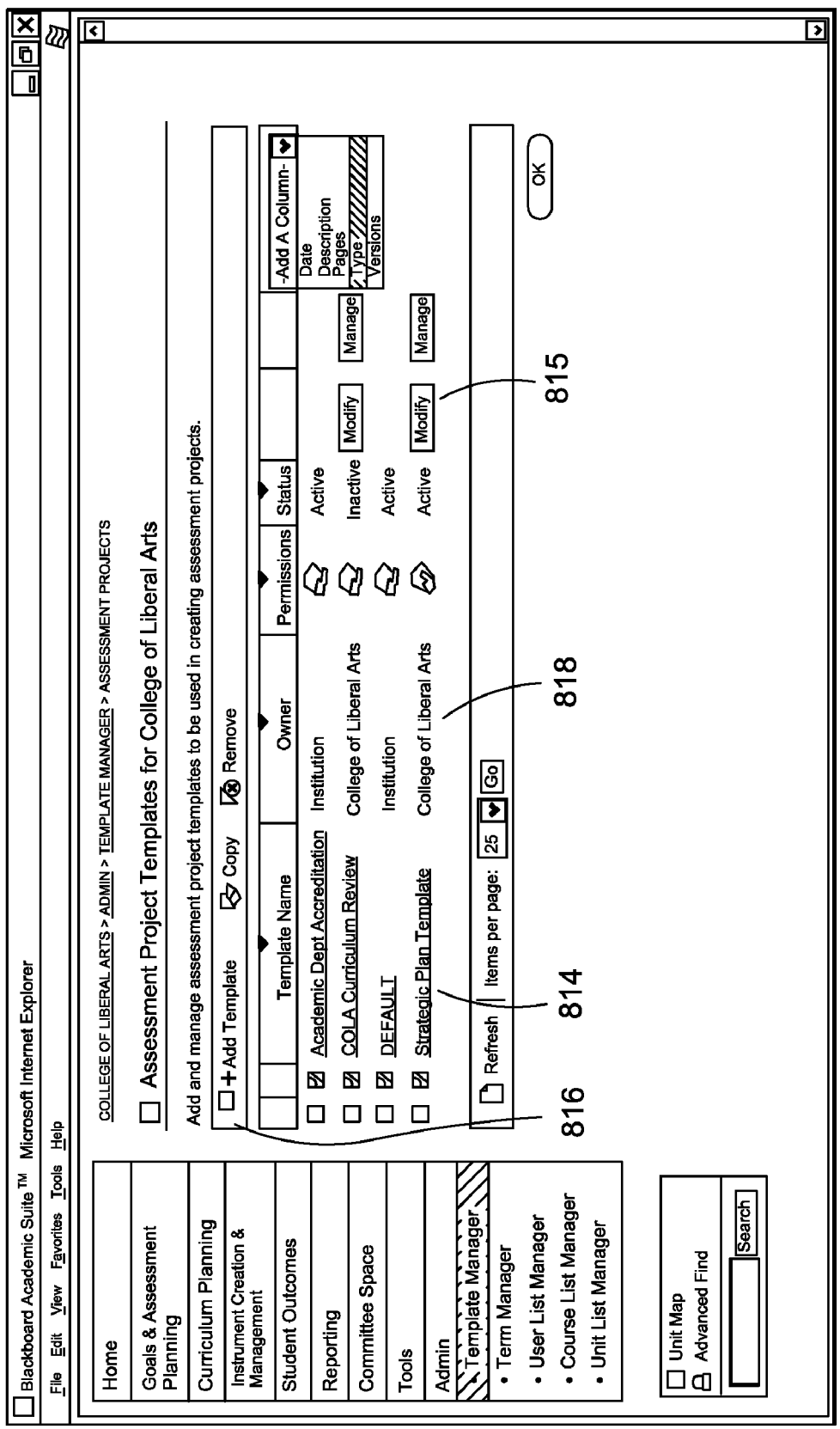

FIGS. 8E-8H depict a template manager that allows operating units to define the templates that will be used in assessment projects and to list existing templates 814. Using this manager, a user can modify 815 an existing template or add 816 a new template. One attribute of a template is the owner 818 of the template which reflects the operating unit that created the template. As shown in FIG. 8E, an owner may be an operating unit hierarchically above the present operating unit. Accordingly, the user of the "college of Liberal Arts", for example, can start with a template provided by "the Institution" and add college-specific revisions. In this way, the institution can have complete or flexible control over the contents of assessment project templates to ensure some level of consistency across the different sub-operating units but also allow customization.

Figure 8F:
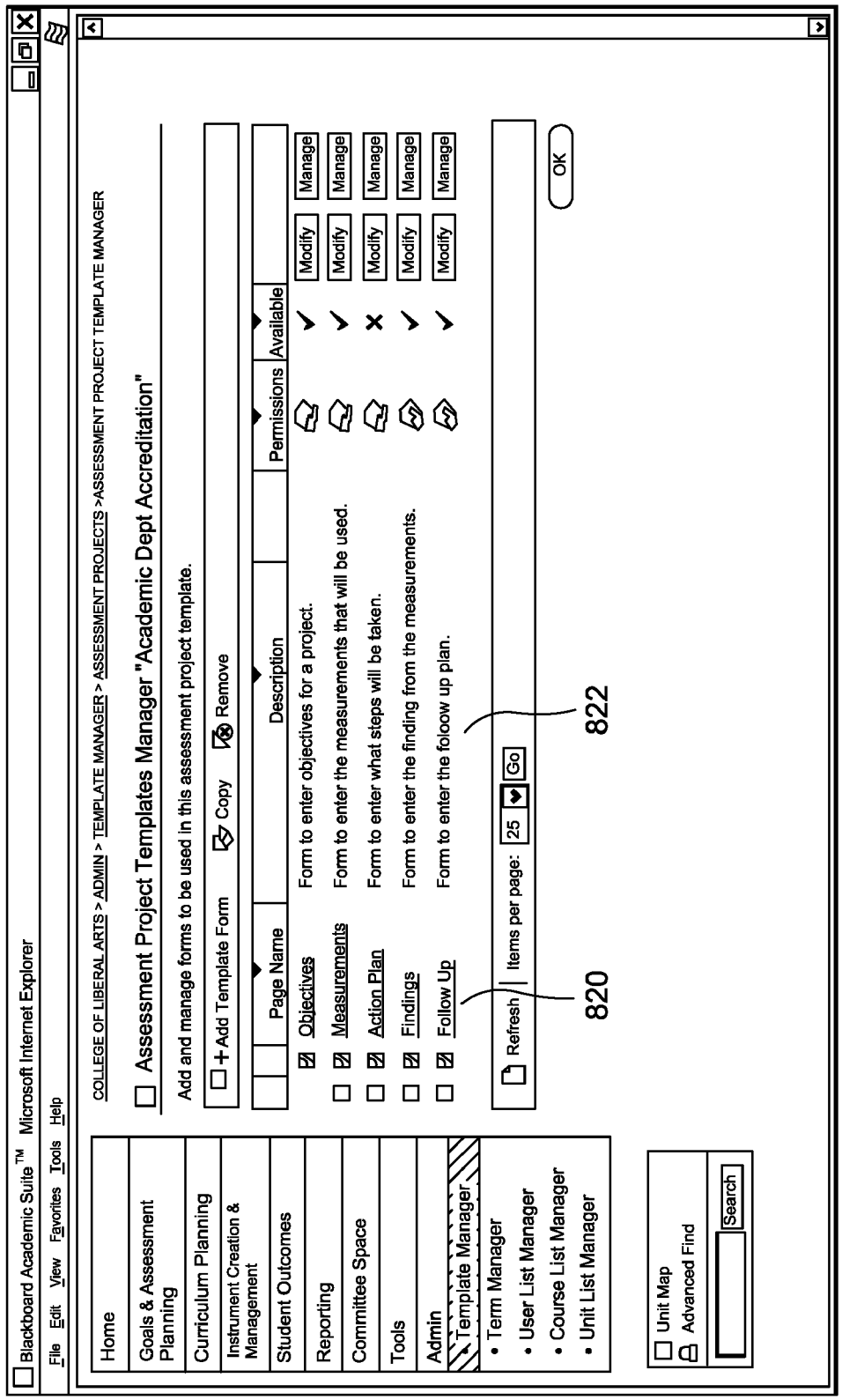
Figure 8G:
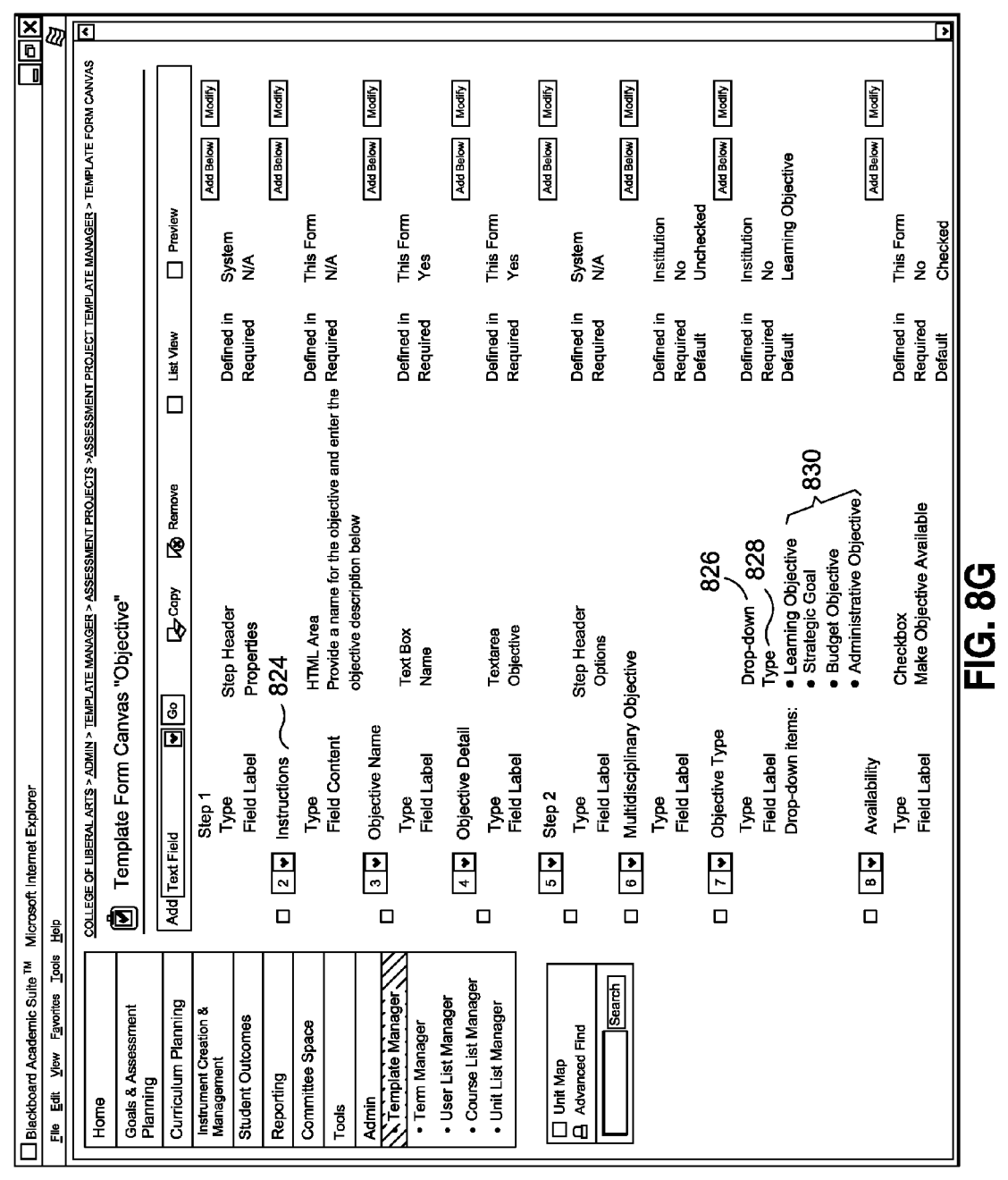
Figure 8H:
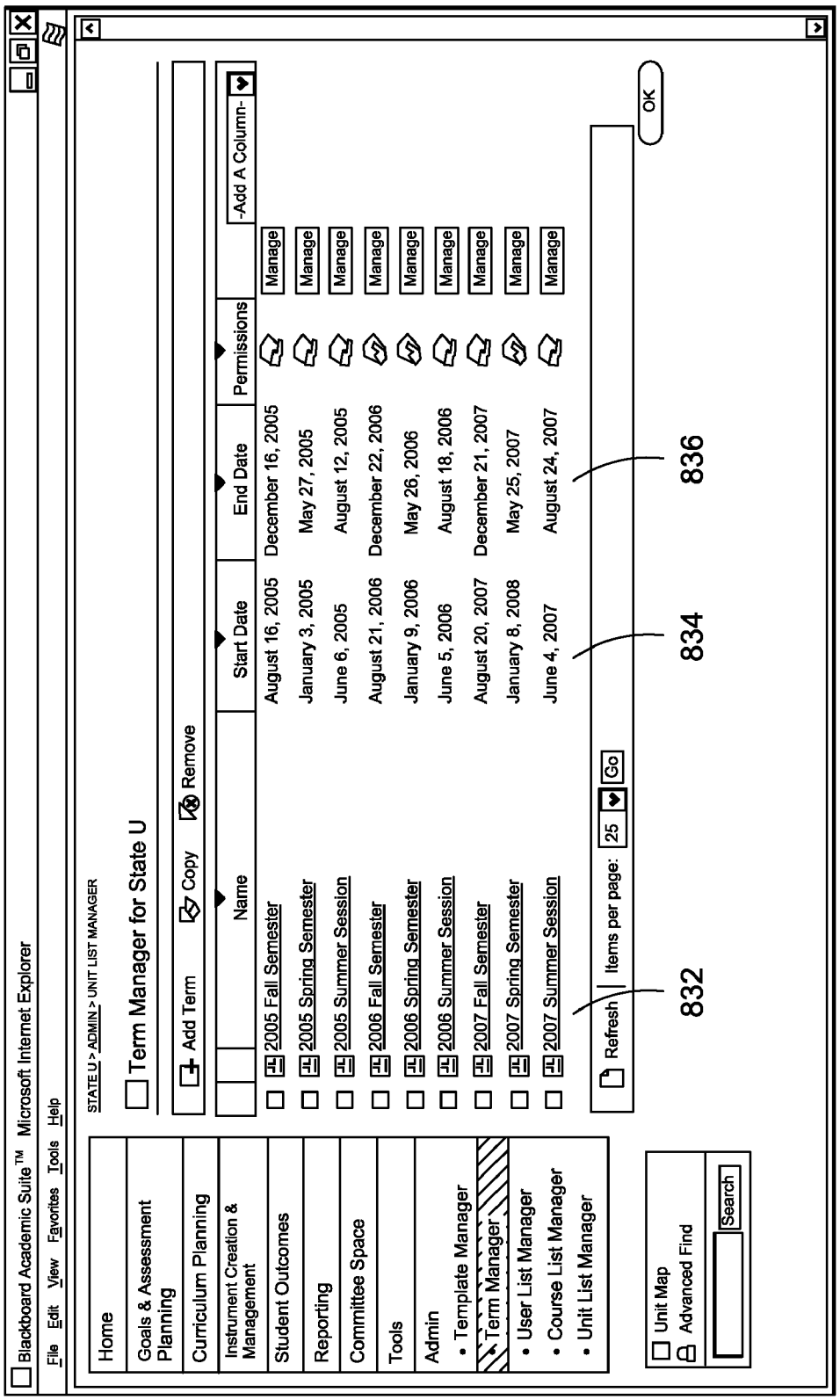

FIG. 8F depicts a interface screen that allows creation of an assessment project template. Using this interface screen, the user can specify what forms 820 are to be included in a template and view a description 822 of each form. For example, returning briefly to FIG. 3G, the names in the column 820 correspond to the form names that are along the top tabs 252-262. As shown, however, the exact form names may vary as well as the number of forms defined within a template. Exemplary forms shown in FIG. 8F include:

Objectives: The objectives for the assessment project

Measurements: The measurements that will be used to measure the objective (e.g., test, survey, portfolio)

Action Plan: The ordered steps to be taken within the Assessment Project

Findings: The findings resulting from the measurements

Follow-up: The steps for a follow-up plan, if any.

The user is presented with a way to define these forms to handle each data collection process. Thus, when a user initiates the start of a new assessment project, the templates that are provided to the user are those templates and forms that are defined in this process. One of ordinary skill will recognize that other or additional forms may be used as well to define an assessment project template without departing from the scope of the present invention.

FIG. 8G depicts an exemplary form definition interface for the "Objectives" form. A similar form definition interface is also provided for the other forms identified as well. The interface screen of FIG. 8G allows a user to add fields 824 to the form which define the way the form is presented when displayed for a user to use when defining a new assessment project. The interface screen of FIG. 8G shows how the details of the form's fields are defined and specified. For example, field 7 is provided with a user configurable "type" 826, and "label" 828. Additionally, the user defines (for this particular field), the "drop-down items" 830 from which the user can select. The specific fields and their attributes are not critical to an understanding of the present assessment system 102 as one of ordinary skill will recognize there are many functionally equivalent ways to allow users to organize and define templates and the forms and fields that make up a template. However, the results are advantageously depicted in FIG. 3G where the particular fields of FIG. 8G result in the template screen that was seen earlier in FIG. 3G.

Within an institution, there may be many different operating units, some of which have different terms. For example, the medical school, the law school, and the engineering department may all have different term lengths and days. Thus, instruments or portfolios that must be completed by the end of a term or the middle of a term may have different due dates for different operating units. A term manager is therefore provided that allows a user to define different terms. In the interface screen of FIG. 8H, the user is presented with a way to specify a term name 832 and assign to it a start date 834 and an end date 836.

One advantageous function described previously related to user lists and their use when deploying instruments and portfolios. In particular, a user list is a multi-faceted concept that refers to both its definition and its members. Thus, a user list may be defined as "all male juniors in the College of Engineering" and the members which satisfy that definition are also referred to as the "user list". Referring back to FIG. 8C, a variety of user demographic information is collected and maintained by the assessment system. This information can be employed to define very specific subsets of students by presenting the fields of FIG. 8C to a user as selectable filters which the user can configure to define the desired members for a particular user list.

Once the user list is defined, the user has the option of making it a static list or a dynamic list. If it is a static list, then the user can apply the definition at a particular date to select the members of the user list. When some other process references this user list, then only those members within the original list will apply (e.g., only those members will receive a particular course evaluation). If it is a dynamic list, then the selected members are determined each time the user list is referenced. In other words, a survey deployed to a particular dynamic user list may be sent to different members if sent on two different dates.

Figure 8I:
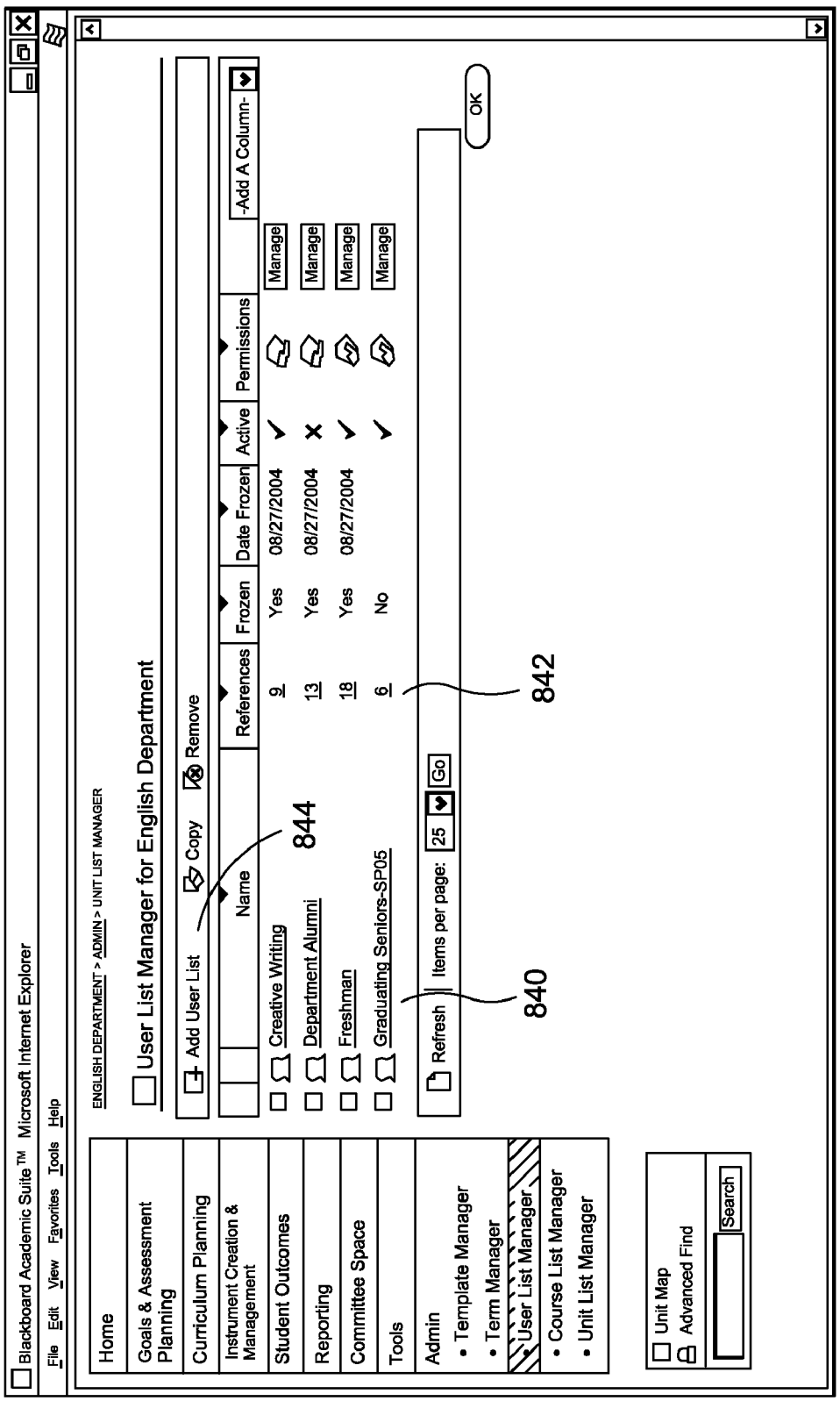

The user manager interface screen of FIG. 8I provides a way for a user to maintain, define, and select different user lists. Using an "Add" button 844, a user is presented a new definition screen which allows them to configure the filters for selecting the desired subset of users. Once defined, this user list can be named and stored so that it is available in the list of FIG. 8I. This list provides an identification 840 of available user lists along with a number 842 of the members within the user list.

Figure 8J:
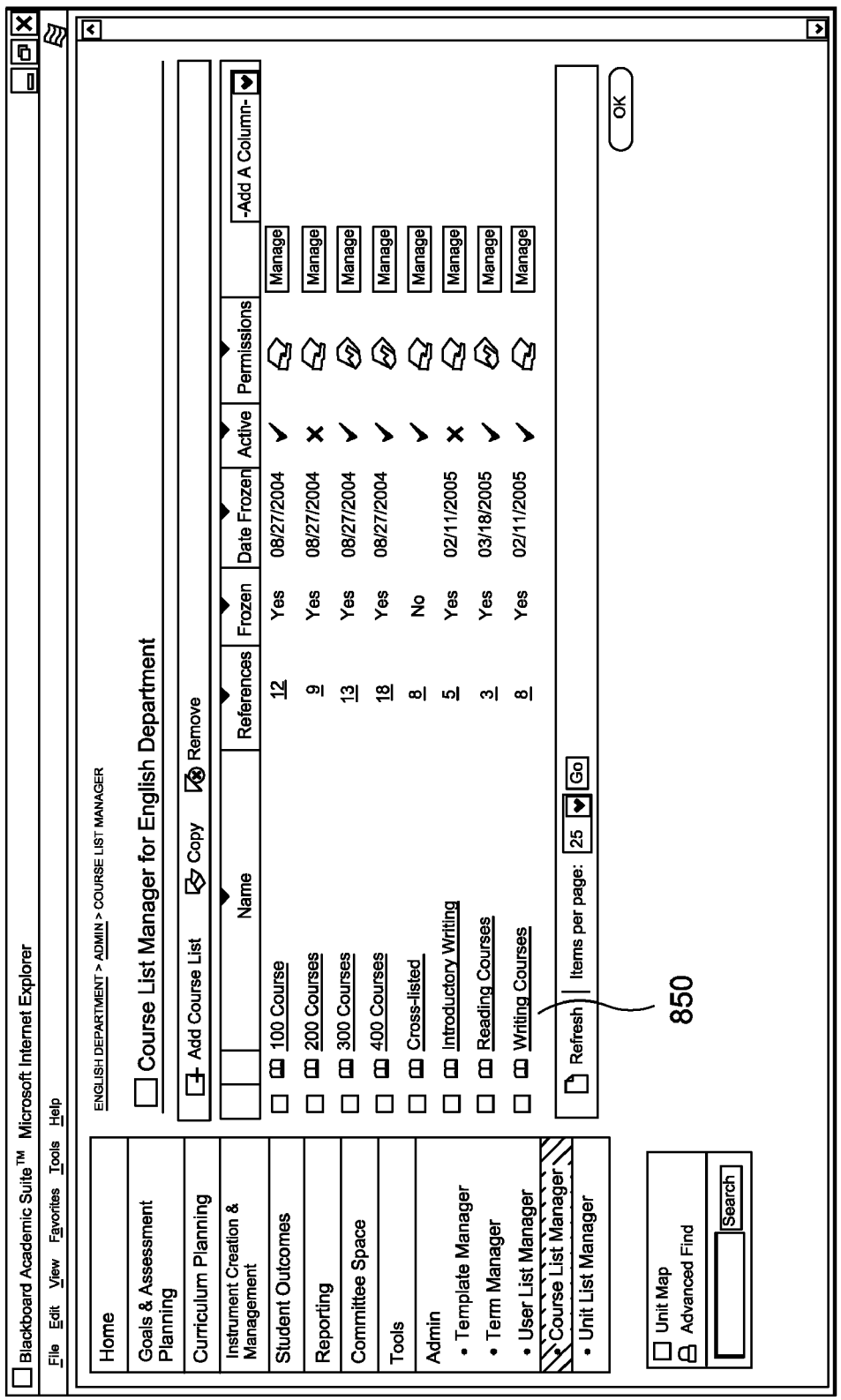

Similar to a user list, the assessment system 102 also provides the user with a way to selectively define course lists. A course list includes those courses that match a specified set of criteria. The attributes of a course (to which the criteria are applied) may be specified and stored within the assessment system 102 or be imported from another campus computer system such as an online catalog or similar database. The breadth of different course lists that can be created is limited only by the possible number of permutations allowed by the different attributes used to describe a course. Thus, very finely defined course lists may be created to allow selective deployment of portfolios, course evaluations, and other surveys. The course list manager interface screen of FIG. 8J depicts an exemplary way for a user to be presented with existing course lists and to define a new course list. Although not shown, creating a new course list involves a user being presented with an interface that allows defining the attributes and their values which must be satisfied to be a member of that particular course list. Once defined, then a dynamic or static course list can be created and stored.

Figure 8K:
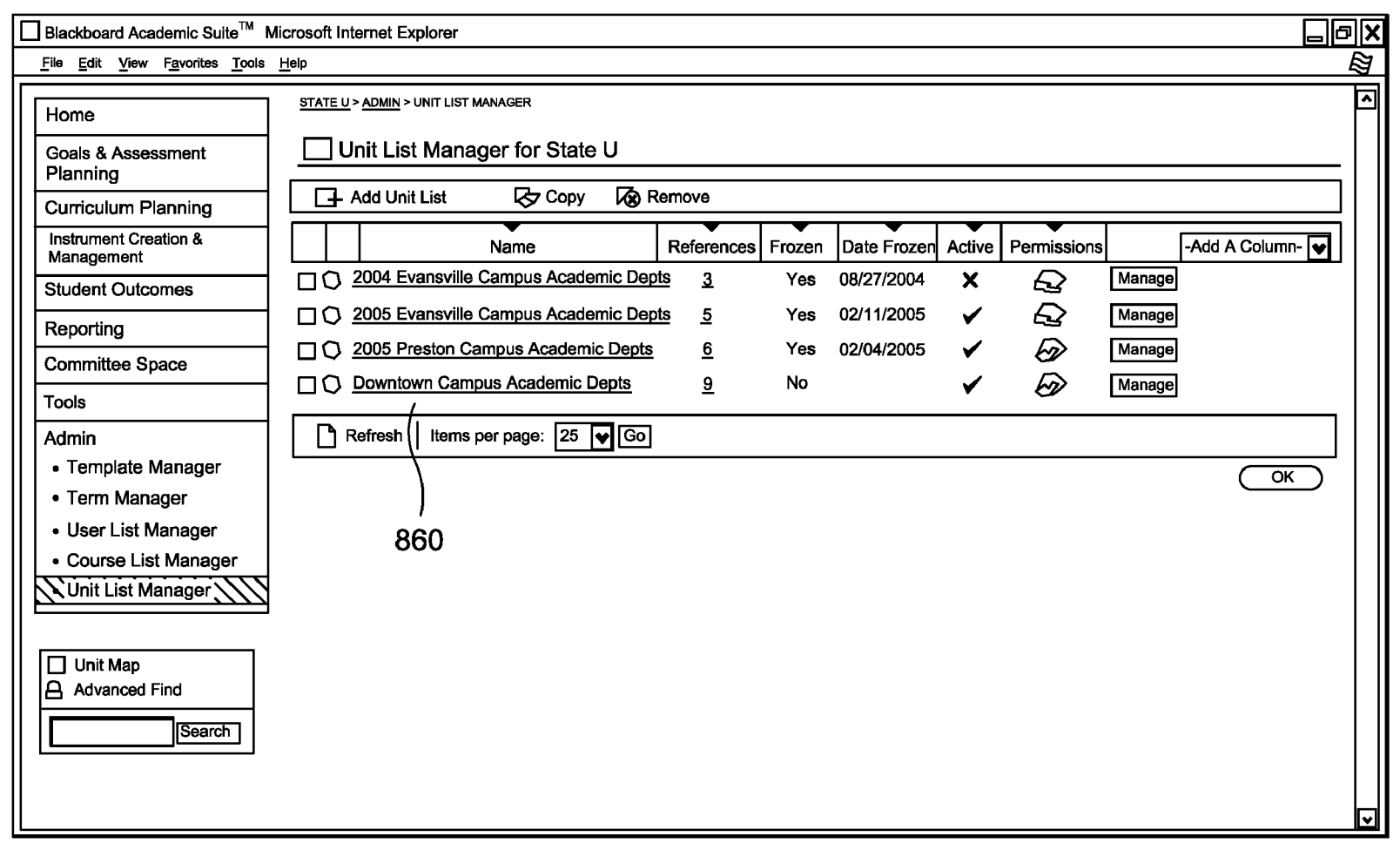

Because operating units may be hierarchically arranged, it is possible to take advantage of that organization to simplify the deployment of certain instruments/survey and to perform certain reporting. For example, in an institution made of multiple campuses, each with multiple colleges, it is possible to ensure the same survey is deployed to all colleges of a campus simply by specifying the campuses without the need to specify each individual college. This functionality is provided by allowing the user to define unit lists. A unit list is simply those operating units that meet particular criteria. The interface screen of FIG. 8K depicts a unit list manager tool that displays defined unit lists 860. Selecting one of those lists 860 will display the names of the operating units within that unit list. Using the screen of FIG. 8K, the user may also elect to define a new unit list as well.

Figure 8L:
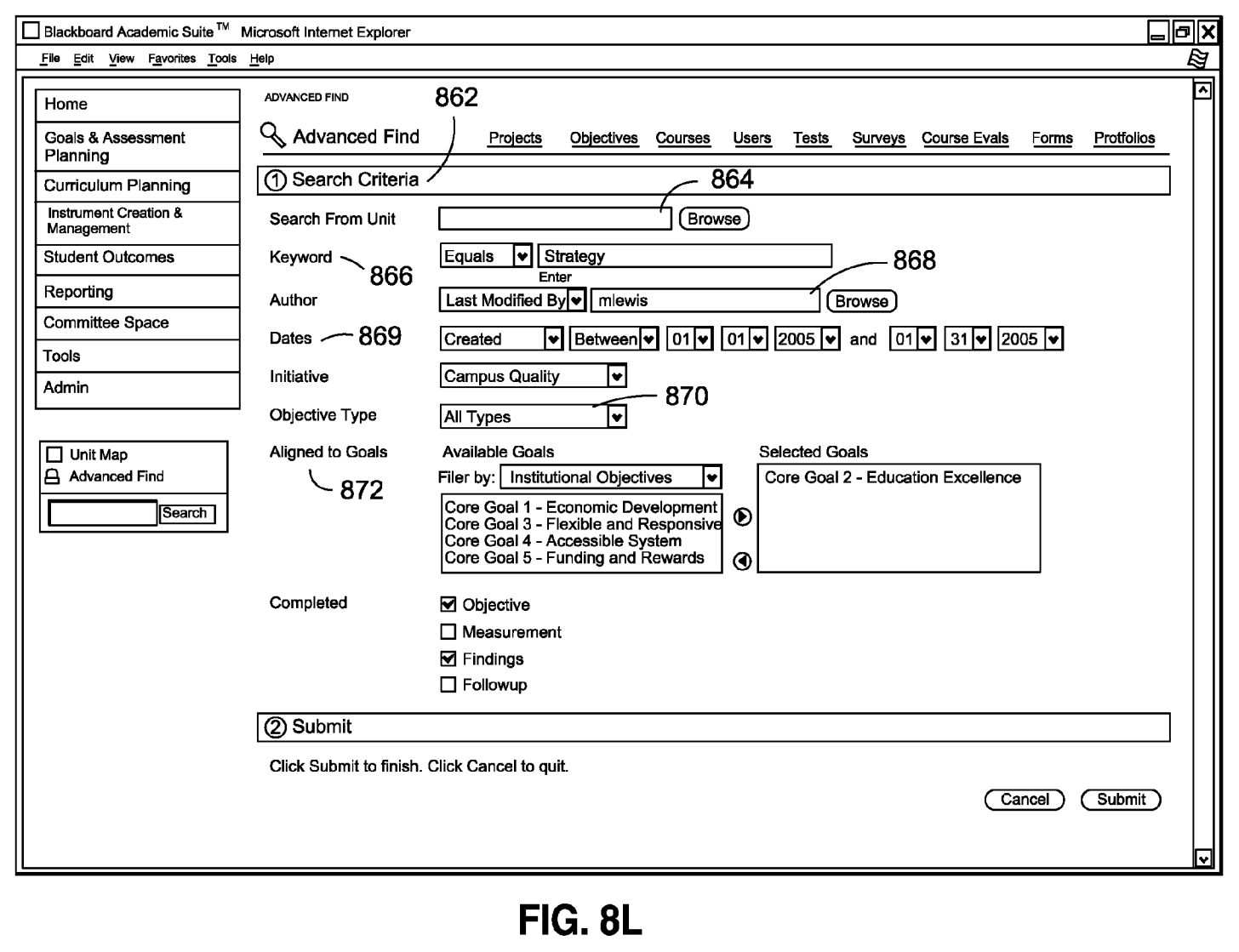

By automating the process of defining and collecting information related to assessment projects, a vast data warehouse can be generated that provides many different views of the assessment process. Searching through that data warehouse using selectable criteria allows a user to create a view of the data that may be useful for a variety of different purposes. One of ordinary skill will recognize that there are numerous ways to categorize and store data to aid in searching and locating pertinent information. The search interface screen of FIG. 8L is merely one exemplary way in which a view of the data can be defined and retrieved from within the assessment system 102 described herein. Using this screen, the user can select from a multitude of search criteria 862. This search criteria can include, for example, unit names 864, keywords, 866, author 868, dates 869, objectives 870, aligned goals 872, etc.

Assessment System and Academic System

Figure 9A:
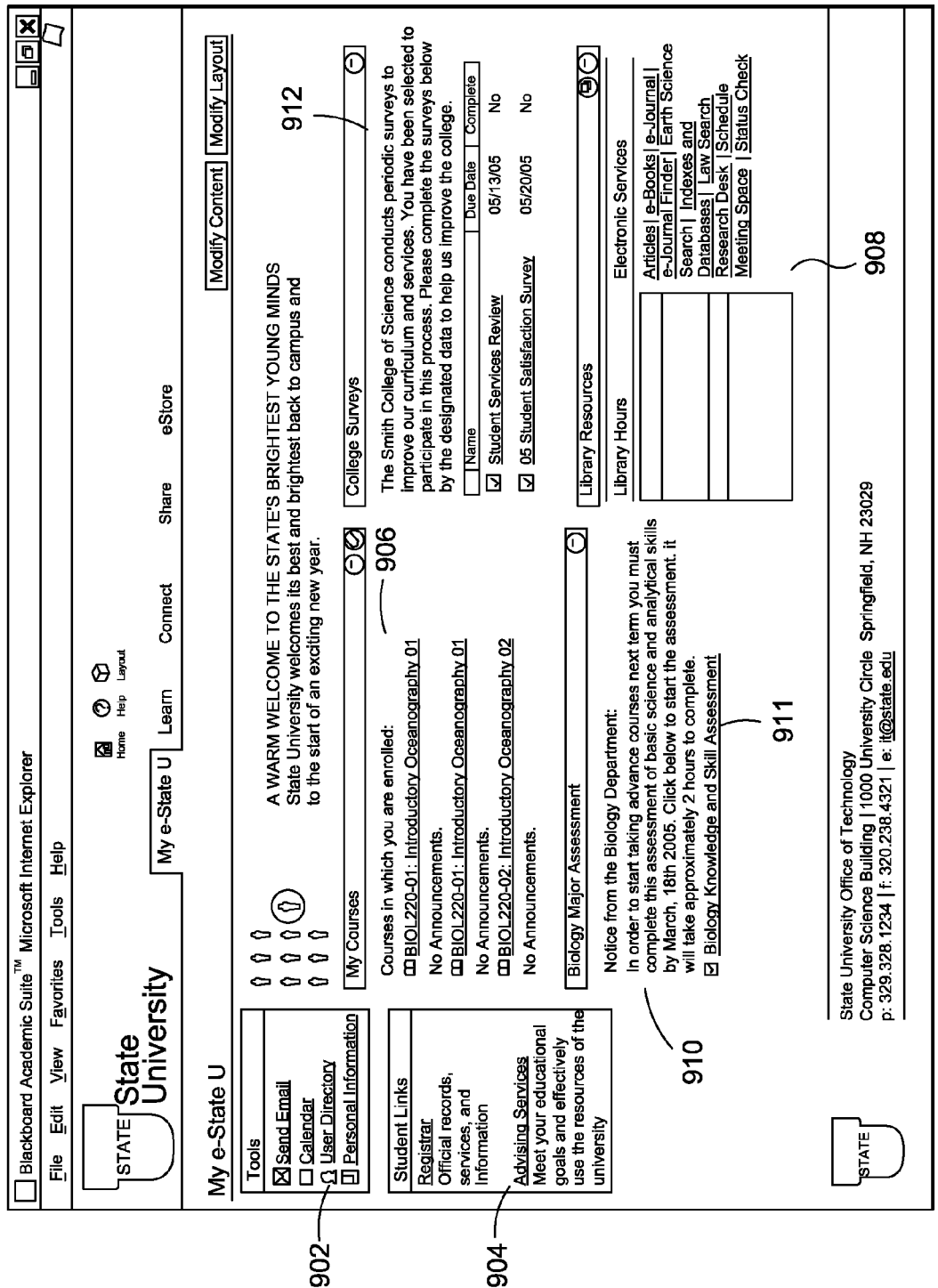
FIGS. 9A-9D depict a series of screen shots of a user interface of an on-line learning/academic system with which an assessment system can be integrated in accordance with the principles of the present invention.

The previously-described functionality of the assessment system 102 has been focused on the assessment system in isolation from many of the other systems available within the institution or organization. However, as briefly mentioned with respect to FIG. 1, a number of other systems may exist within the institution that may advantageously be integrated with the present assessment system. As mentioned earlier, the assessment system 102 described herein can operate in conjunction with an academic system as described in the previously incorporated patent and patent applications. This Internet-based learning system is also called the academic system 116 (See FIG. 1) in that it provides a virtual, on-line community for students. FIG. 9A depicts an exemplary screen that a user may encounter when logged into the academic system 116.

In FIG. 9A the user is provided with electronic tools 902 such as e-mail, calendar, and a directory. The academic system 116 also allows the user to connect to external campus computer systems using links 904 such as the Registrar's office or the Advising office. Of particular use to a student, the "My Courses" tab 906 allows the user to drill down into the courses for which they are enrolled to see course assignments, lecture notes, external resources, discussion boards etc. Additionally, system wide announcements can be provided in a window 908.

Specific to the assessment system functionality, two modules 910 and 912 are displayed on the user's interface page 900. The module 910 describes an assessment exercise that a student must complete by a certain date. It includes a link 911 that the user can select to be taken to the assessment exercise. The implementation of the exercise may be on some other computer system that receives and records the user's responses. These responses and scores are automatically provided to the assessment system 102 and associated with that particular user for that particular assessment exercise. The other module 912 relates to one or more surveys that the user is to complete. Similar to the assessment exercise, the student selects and then completes the survey with the results automatically returned to the assessment system.

The modules 910, 912 refer to instruments that are defined by a user of the assessment system 102 using the techniques previously described. The user of the assessment system 102 also employs the user list or course list (or both) to select the group of students to receive the respective instruments and then deploys the instruments. Once deployed, the assessment system 102 sends notification to the academic system to locate those students selected to receive the instrument. Within the academic system, a notation is made within the records associated with the implicated students regarding the newly available instrument. When the students next log in to the system, their respective home pages are rendered and the included notation results in a display of the appropriate modules 910, 912. An alternative deployment method would be to add a new instrument within the course area of a particular course. Thus when a student drills down to that course, the course page will be rendered and it will display a link to any new instruments.

Figure 9B:

Faculty members also use the academic system 116 and may be interested in assessment projects within their department or involving the student population that they interact with. For example, window 920 of FIG. 9B provides, for the faculty member, links to information on unit forms, surveys, course evaluations, results, tests, etc. Window 922 relates to a particular assessment project (e.g., "2006 Undergraduate Degree Review") and provides links to information such as the objectives and findings collected so far with respect to this project. Access to this information is provided through appropriate communications interfaces between the assessment system 102 and the academic system. Furthermore, user roles and identities can be used to ensure information is presented to only those users having the required access privileges.

As mentioned, within the course-specific areas that a student may access from their virtual space within the academic system, a student has access to a variety of information pertaining to that course such as assignments, reading lists, discussion boards, lecture notes, etc. With the connection to the assessment system 102 in place, the student may now also be provided with a listing of the goals and objectives aligned to each course. Additionally, by drilling down into each lesson within the course, the student can see what are the objectives of today's or some other day's lesson. Additionally, objectives and goals can be aligned to individual content items within the course. For example, a particular discussion board topic may be presented to satisfy a particular course or department objective. This alignment can be specified by the instructor and displayed within the course area visible to the student.

Figure 9C:
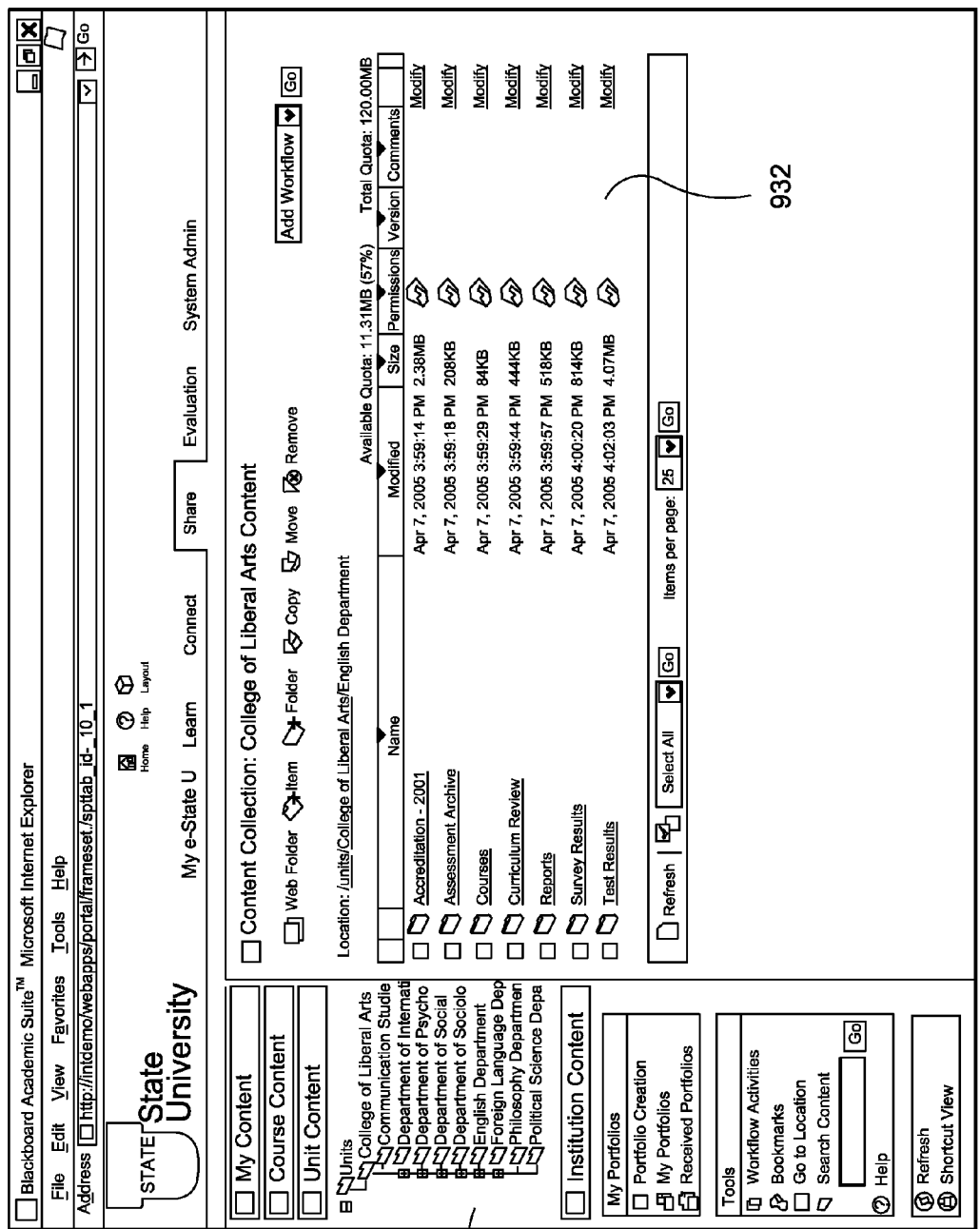
Figure 9D:
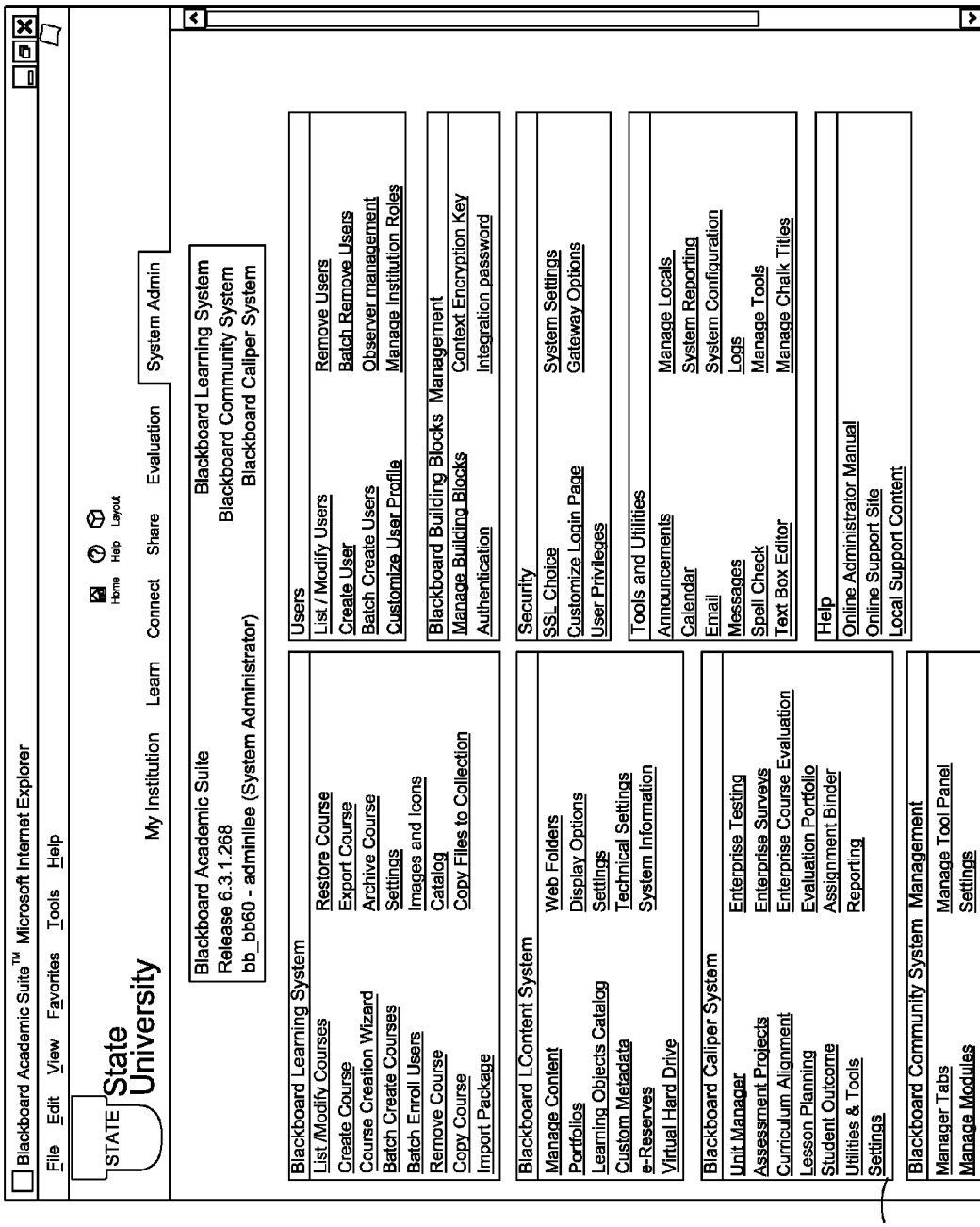

The academic system 116 includes both a content management system and an administrative system. The assessment system 102 described previously can advantageously utilize this functionality already provided by the academic system. For example, the assessment-related content may be organized by operating unit and managed and accessed using the shared content window of the academic system. FIG. 9C shows the shared content window 929 that includes a unit content tab 930. The unit content tab 930 can include hierarchically arranged content within the unit as shown. Selection of specific content from the content tab 930 will display the associated file collections within a sub-window 932. From there, the file hierarchy can be traversed. The display of content in FIG. 9C may be logical in nature and does not necessarily reflect the actual hierarchical arrangement of files as stored within the underlying file system. The window 933 of FIG. 9D depicts an administrative screen of the academic system 116. Rather than having a separate administrative function for the assessment system, it can be provided through a section 934 of the window 933. As shown, an administrator can manage functions related to assessment projects, curriculum planning, lesson planning, testing, surveys, reporting etc. While not necessary, the integration of the assessment system 102 with the academic system 116 simplifies sharing of user roles, content, course attributes and also simplifies deploying instruments and collecting responses. All these activities can still be accomplished with diverse, separate systems but are advantageously simplified the tighter the two systems are integrated.

Template Driven

In the above-described assessment system 102, the use of templates has been highlighted as an advantageous technique for defining and collecting the data to be used in assessment projects. For example, at the institutional level a template is provided which guides the user into providing strategic goals and mission and vision statements. When an assessment project is begun, the user is presented with templates that allow objectives to be identified, measurements to be defined, and action plans to be specified. When the identified objectives are to be defined, a template is provided to guide the user through this process and to align them with higher level goals and objectives. At the unit level, templates are provided to define portfolios, instruments, programs and program objectives. While at the course level, other appropriate templates are presented to a user to help develop lesson plans, instruments and course and content objectives. In each instance, the lower level objectives and outcomes can be aligned with higher-level objectives and goals. As a result, a template driven system is provided that defines objectives at least at three different hierarchical levels and allows automatic alignment of the objectives throughout the three levels. Of course, more levels are possible as well, because the present assessment system provides operating units with the freedom to model their organization an a flexible manner.

Workflow

The different phases of an assessment project can be considered as events within the assessment system 102. As such, a workflow system may be included to monitor and facilitate an assessment project. For example, certain re-occurring assessment projects may be tied to the start or end of a term. Thus, a calendar function within a workflow process can initiate a creation of an appropriate assessment project template and forwarding it to the initial user responsible for managing the project. For such a project, as well as those manually initiated, the subsequent steps of the assessment project may be handled by a workflow process. The task plan described earlier can include with each task the identity of the responsible parties and the disposition of the project after completion of each task. For example, once an exemplary assessment project reaches the stage where all of a department's objectives have been defined, then a subsequent step, for example, may be to create a curriculum map for that department. Through use of a workflow process this automatic stepping through the task plan may be accomplished. Some workflow steps may merely include sending e-mails to committee members regarding the status of some phase of an assessment project. Another benefit of implementing a workflow system is that parts of the assessment project may have its access privileges automatically modified at each step of the task plan. For example, once a set of program objectives are agreed upon by the committee, then these objectives become read-only and no one has permission to modify them Thus, because of the automatic and systematic collection of assessment-related information and tasks available within the assessment system 102 described herein, an automatic workflow capability may be included to further automate and monitor an institution's assessment initiatives.

Export and Import

Assessment projects, and portions thereof, are data entities in and of themselves. For example, an English Department can create an assessment project that relates to how its courses align with its objectives. The creation of such a project includes a definition of objectives and goals, an organization of operating units, a definition of courses, and an identification of course objectives. Inherent in this data is how all the objectives from the different hierarchical levels align with one another. If further detail is desired, each course can include information on course contents and instruments deployed within each course. Another assessment project may be related to how a department prepared for a particular accreditation review. This might include evaluation portfolios, surveys, and other components. In each of these cases, other institutions may benefit from copying those assessment plans. Thus, portions of an assessment project (or the entire project) may be copied within the institution for use by various programs and departments while such functionality may also occur across different institutions as well.

Thus, the presently described assessment system 102 can export an assessment project or only portions of an assessment project as a data entity that can be transferred to another institution having its own assessment system. One example of a portion of an assessment project that may be exported, or imported, may be a series of templates related to National Council for Accreditation of Teacher Education (NCATE) accreditation. At that second institution, then, the assessment system can import the data entity and have a pre-populated assessment plan to use or to modify. At a smaller level, a publisher of a course or program of courses can define the objectives met by its courses and their respective content as well as the instruments and, possibly, portfolios that might accompany such a program of courses. This information may be imported into the assessment system at a department or program level at the institution to avoid developing the same material on their own from scratch.

Within such imported or exported data there may be references to third-party standards. If a user imports a project that includes a reference to, for example, an objective of the standard (e.g., analytical reasoning), that user will most likely desire to know exactly what that standard says about that objective. Thus, importing and exporting data within the assessment system 102 provides the additional functionality to include external standards. This functionality may also extend to exporting and importing instruments related to measuring or evaluating these standards as well.

One result of having such import and export functionality included within the present assessment system is that repositories of assessment project-related data entities may be created. Thus, assessment projects, templates, instruments and other data may be exported to and stored in a repository that is accessible by other users via a network or other computer system. Such a repository of information may include different levels of anonymity. For example, an institution may want to export to the repository information about the incoming freshman class' SAT scores, high-school GPA, and student age that was collected during a particular assessment project. This information can then be used by other institutions for comparison and analysis. In such an example, the first institution may want to have their identity associated with the data but also insure that the individual student information is anonymous. In a second example, the institution itself may want to remain anonymous in interacting with the repository. In this case, the institution may provide one or more aspects of an assessment project to the repository which can then provide a comparison against a benchmark or other standard. In this way, the repository provides the institution with feedback regarding the assessment project (e.g., whether or not the students performance on a battery of tests were below, at, or above a nationwide average). Alternatively, the institution can access the repository and import different benchmarks and other standards to perform their own comparison and analysis. Because virtually any aspect of an assessment project may be exported to the repository, institutions can exchange and compare various instruments, rubrics, surveys, templates, reports, as well as results collected in performing the assessment project. Furthermore, this repository may also include non-assessment related information and data as well such as, for example, course content and individual academic portfolios.

Multi-Institution

Not only can the assessment plans and portions of the assessment plans (e.g., the objectives, the courses) be exported and shared, the results and findings can be shared as well. Accordingly, a multi-college consortium, for example, can request and receive findings from its members and then report on the findings from the overall perspective. If the members of the consortium utilize substantially similar assessment projects and initiatives, then the collected data and findings will be consistent in nature and format and will allow them to be simply amalgamated and analyzed.

A number of variations to the specific behaviors and steps described in the above examples may be made without departing from the scope of the present invention. The various illustrative logical blocks, modules, circuits, elements, and/or components described in connection with the embodiments disclosed herein may be implemented or performed with a general purpose processor, an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A computer-implemented method for performing assessment within a multi-level institution, the method comprising:
   a programmable computer configured to perform the steps of:
      storing, by a computer, a model of a plurality of organizational levels of the institution, wherein each organizational level includes at least one respective, associated node;
      receiving a selection of a node associated with at least one organizational level of the plurality of organizational levels of the institution;
      presenting to a user at least one customizable assessment project associated with the at least one organizational level of the plurality of organizational levels of the institution,
      wherein the at least one customizable assessment project comprises a plurality of forms that are defined by an editable template, wherein each of the plurality of forms has a predefined relationship, in a vertical hierarchy, with the remaining plurality of forms, and wherein at least two forms, from the plurality of forms, have different levels in the vertical hierarchy; and
      completing the at least one customizable assessment project based, at least in part, on first input received from the user,
      wherein an addition of a first form, to the plurality of forms, at a level in the vertical hierarchy causes a generation of a second form, to the plurality of forms, at a sublevel to the level in the vertical hierarchy, wherein the added second form is associated with the added first form, and
      wherein the added second form comprises at least one field that is aligned with at least one field from the added first form.

2. The computer-implemented method of claim 1, further comprising the steps of:
   receiving second input from another user; and
   generating the editable template based on the received second input.

3. The computer-implemented method of claim 2, wherein contents of the editable template are based on the at least one organizational level associated with the selected node associated with the at least one customizable assessment project.

4. The computer-implemented method of claim 2, wherein the another user and the user are one and the same.

5. The computer-implemented method of claim 2, wherein the plurality of forms includes at least one objective form.

6. The computer-implemented method of claim 5, wherein the at least one objective form comprises a plurality of different objective forms.

7. The computer-implemented method of claim 5, wherein a set of activity forms is associated with the at least one objective form.

8. The computer-implemented method of claim 7, wherein the set of activity forms comprises one or more different activity forms.

9. The computer-implemented method of claim 7, wherein membership in the set of activity forms is based on the at least one organizational level associated with the selected node associated with the at least one customizable assessment project.

10. The computer-implemented method of claim 7, wherein contents of each activity form within the set of activity forms are based on the at least one organizational level associated with the selected node associated with the at least one customizable assessment project.

11. The computer-implemented method of claim 1, further comprising the step of:
   presenting to the user a list of one or more available editable templates;
   wherein the editable template is selected from one of the available editable templates.

12. The computer-implemented method of claim 11, wherein the at least one customizable assessment project is based on the selected one editable template.

13. The computer-implemented method of claim 12, wherein the at least one customizable assessment project includes at least one objective, said at least one objective being based, at least in part, on the input received from the user.

14. The computer-implemented method of claim 13, wherein the at least one objective comprises two or more objectives.

15. The computer-implemented method of claim 13, wherein the at least one customizable assessment project includes one or more activities related to the at least one objective, said one or more activities being based, at least in part, on the input received from the user.

16. The computer-implemented method of claim 15, wherein the plurality of forms includes a plurality of objective forms and a respective set of activity forms associated with each of the respective objective forms.

17. The computer-implemented method of claim 16, further comprising the step of:
   presenting to the user the respective sets of activity forms.

18. The computer-implemented method of claim 17, further comprising the step of:
   modifying contents of each of the activity forms within the respective sets of activity forms, based, at least in part, on the input of the user.

19. The computer-implemented method of claim 13, wherein the plurality of forms includes at least one respective objective form corresponding to each of the at least one objective related to the at least one customizable assessment project.

20. The computer-implemented method of claim 19, further comprising the step of:
   creating each of the at least one objective within its corresponding objective form.

21. The computer-implemented method of claim 19, further comprising the step of:
   selecting for any of the at least one objective form its corresponding objective from among a plurality of available, existing objectives.

22. The computer-implemented method of claim 1, wherein the at least one customizable assessment project comprises a plurality of different customizable assessment projects for that node concurrently available to the user.

23. The computer-implemented method of claim 1, further comprising the steps of:
   storing the completed at least one customizable assessment project as an editable project; and
   presenting to the user a list of available editable projects.

24. The computer-implemented method of claim 23, further comprising the steps of:
   receiving other input from a subsequent user;
   beginning a different customizable assessment project by selecting a particular editable project from among the list, based on the other input from the subsequent user; and
   completing the different customizable assessment project.

25. The computer-implemented method of claim 1, wherein the institution comprises at least three organizational levels including multiple levels of operating units.

26. The computer-implemented method of claim 25, wherein the at least three organizational levels further comprise a programs level, a course level, and a section level.

27. The computer-implemented method of claim 1, further comprising the steps of:
   receiving other input from another user identifying one or more respective attributes associated with each of a plurality of nodes to be modeled; and
   creating a respective, editable template for each of the plurality of nodes, based on the other input.

28. The computer-implemented method of claim 27, wherein the one or more respective attributes for a particular node are based on one of an organizational level of that node, a type of operating unit of that node, a type of operating unit hierarchically above that node; and whether that particular node is a program, course or section.

29. The computer-implemented method of claim 27, further comprising the steps of:
   receiving additional input from a third user selecting one of the plurality of nodes;
   presenting the user with the respective, editable template for the selected one node; and
   defining a model element for the selected one node by completing the respective editable, template based, at least in part, on the additional input from the third user.

30. A system for performing assessment within a multi-level institution, the system comprising:
   a computer-based model of a plurality of organizational levels of the institution, wherein each organizational level includes at least one respective, associated node; and
   a programmable computer, having access to the computer-based model, and configured to:
      a) receive first input indicative of a particular node associated with at least one organizational level of the plurality of organizational levels of the institution;
      b) present to a user at least one customizable assessment project associated with the at least one organizational level of the plurality of organizational levels of the institution, wherein the at least one customizable assessment project comprises a plurality of forms that are defined by an editable template, wherein each of the plurality of forms has a predefined relationship, in a vertical hierarchy, with the remaining plurality of forms, and wherein at least two forms, from the plurality of forms, have different levels in the vertical hierarchy; and
      c) complete the at least one customizable assessment project based, at least in part, on second input received from the user,
   wherein an addition of a first form, to the plurality of forms, at a level in the vertical hierarchy causes a generation of a second form, to the plurality of forms, at a sublevel to the level in the vertical hierarchy, wherein the added second form is associated with the added first form, and
   wherein the added second form comprises at least one field that is aligned with at least one field from the added first form.

31. The system of claim 30, wherein the programmable computer is further configured to:
   receive other input from another user; and
   generate the editable template based on the received other input.

32. The system of claim 31, wherein contents of the editable template are based on a the at least one organizational level associated with the particular node associated with the at least one customizable assessment project.

33. The system of claim 31, wherein the another user and the user are one and the same.

34. The system of claim 31, wherein the plurality of forms includes at least one objective form.

35. The system of claim 34, wherein the at least one objective form comprises a plurality of different objective forms.

36. The system of claim 34, wherein a set of activity forms is associated with the at least one objective form.

37. The system of claim 36, wherein the set of activity forms comprises one or more different activity forms.

38. The system of claim 36, wherein membership in the set of activity forms is based on the at least one organizational level associated with the particular node associated with the at least one customizable assessment project.

39. The system of claim 36, wherein contents of each activity form within the set of activity forms are based on the at least one organizational level associated with the particular node associated with the at least one customizable assessment project.

40. The system of claim 30, wherein the programmable computer is further configured to:
   present to the user a list of one or more available editable templates;
   wherein the editable template is selected from one of the available editable templates.

41. The system of claim 40, wherein the customizable assessment project is based on the selected one editable template.

42. The system of claim 41, wherein the at least one customizable assessment project includes at least one objective, said at least one objective being based, at least in part, on the second input received from the user.

43. The system of claim 42, wherein the at least one objective comprises two or more objectives.

44. The system of claim 42, wherein the at least one customizable assessment project includes one or more activities related to the at least one objective, said one or more activities being based, at least in part, on the second input received from the user.

45. The system of claim 44, wherein the plurality of forms includes a plurality of objective forms and a respective set of activity forms associated with each of the respective objective forms.

46. The system of claim 45, wherein the programmable computer is further configured to:
   present to the user the respective sets of activity forms.

47. The system of claim 46, wherein the programmable computer is further configured to:
   modify contents of each activity form within the respective sets of activity forms, based, at least in part, on the second input of the user.

48. The system of claim 42, wherein the plurality of forms includes at least one respective objective form corresponding to each of the at least one objective related to the at least one customizable assessment project.

49. The system of claim 48, wherein the programmable computer is further configured to:
   create each of the at least one objective within its corresponding objective form.

50. The system of claim 48, wherein the programmable computer is further configured to:
   select for any of the at least one objective form its corresponding objective from among a plurality of available, existing objectives.

51. The system of claim 30, wherein the at least one customizable assessment project comprises a plurality of different customizable assessment projects for that node concurrently available to the user.

52. The system of claim 30, wherein the programmable computer is further configured to:
   store the completed at least one customizable assessment project as an editable project; and
   present to the user a list of available editable projects.

53. The system of claim 52, wherein the programmable computer is further configured to:
   receive other input from a subsequent user;
   begin a different customizable assessment project by selecting a particular
   editable project from among the list, based on the other input from the subsequent user; and
   complete the different customizable assessment project.

54. The system of claim 30, wherein the institution comprises at least three organizational levels including multiple levels of operating units.

55. The system of claim 34, wherein the at least three organizational levels further comprise a programs level, a course level, and a section level.

56. The system of claim 30, wherein the programmable computer is further configured to:
   receive other input from another user identifying one or more respective attributes associated with each of a plurality of nodes to be modeled; and
   create a respective, editable template for each of the plurality of nodes, based on the other input.

57. The system of claim 27, wherein the one or more respective attributes for a particular node are based on one of an organizational level of that node, a type of operating unit of that node, a type of operating unit hierarchically above that node; and whether that particular node is a program, course or section.

58. The system of claim 56, wherein the programmable computer is further configured to:
   receive additional input from a third user selecting one of the plurality of nodes;
   present the user with the respective, editable template for the selected one node; and
   define a model element for the selected one node by completing the respective editable, template based, at least in part, on the additional input from the third user.

59. Computer readable media containing programming instructions for performing assessment within a multi-level institution that upon execution thereof, causes one or more computer processors to perform the steps of:
   storing a model of a plurality of organizational levels of the institution, wherein each organizational level includes at least one respective, associated node;
   receiving a selection of a node associated with at least one organizational level of the plurality of organizational levels of the institution;
   presenting to a user at least one customizable assessment project associated with-the at least one organizational level of the plurality of organizational levels of the institution,
   wherein the at least one customizable assessment project comprises a plurality of forms that are defined by an editable template, wherein each of the plurality of forms has a predefined relationship, in a vertical hierarchy, with the remaining plurality of forms, and wherein at least two forms, from the plurality of forms, have different levels in the vertical hierarchy; and
   completing the at least one customizable assessment project based, at least in part, on first input received from the user,
   wherein an addition of a first form, to the plurality of forms, at a level in the vertical hierarchy causes a generation of a second form, to the plurality of forms, at a sublevel to the level in the vertical hierarchy, wherein the added second form is associated with the added first form, and
   wherein the added second form comprises at least one field that is aligned with at least one field from the added first form.

60. The computer-implemented method of claim 1, wherein the first form comprises an objective form and the second form comprises an activity form.

* * * * *